United States Patent
Livesey

[15] 3,701,991
[45] Oct. 31, 1972

[54] ELECTRONIC CONTROLS FOR ALPHANUMERIC PRINTER

[72] Inventor: Richard Dennis Livesey, Pointe Claire, Quebec, Canada

[73] Assignee: Robert Morse Corporation Limited, West Montreal, Quebec, Canada

[22] Filed: May 28, 1970

[21] Appl. No.: 41,429

[52] U.S. Cl. ..........................346/9, 101/93 C, 177/4, 346/98
[51] Int. Cl. ..........................................G01g 23/38
[58] Field of Search .346/9, 98; 101/93 RC; 318/466, 318/470; 178/34; 177/2, 4, 5

[56] References Cited

UNITED STATES PATENTS

| | | | |
|---|---|---|---|
| 2,459,821 | 1/1949 | Kozma et al. | 178/34 |
| 2,847,505 | 8/1958 | Kratt et al. | 178/34 |
| 3,044,563 | 7/1962 | Gumpertz et al. | 177/3 |
| 3,399,753 | 9/1968 | Revelle | 197/49 |

*Primary Examiner*—Joseph W. Hartary
*Attorney*—Strauch, Nolan, Neale, Nies & Kurz

[57] ABSTRACT

The recording system of this invention comprises a plurality of data sources respectively supplying the weight of a weighed out load and additional information usually associated with the weighed load. The data information from these sources is stored in coded form or data words in separate storage units until a read-out and print command is selectively produced, at which time the stored information is read out by a logic circuit and printed by a line type printing machine. The printing machine has a plurality of motor driven alpha-numeric printing wheels, and there is a corresponding plurality of counters in the logic circuit. Each data word read out from storage is loaded into one counter, and the counters then count down to zero or some other reference value. During the countdown, clock pulses are conducted to operate the printing wheel motors, thereby advancing the print wheels. When each counter reaches zero or other reference value, the passage of clock pulses for driving the associated print wheel motor is inhibited, thus stopping advancement of the associated printing wheel at its proper printing position. The logic circuit further provides for the printing of a plurality of lines with the same set of printing wheels by reading out the stored information sequentially according to the lines of print and by re-positioning the printing wheels after each line of print.

22 Claims, 31 Drawing Figures

INVENTOR

RICHARD DENNIS LIVESEY

BY Strauch, Nolan, Neale, Nies & Kurz

ATTORNEYS

PATENTED OCT 31 1972 3,701,991

SHEET 02 OF 22

INVENTOR

RICHARD DENNIS LIVESEY

BY Strauch, Nolan, Neale, Nies & Kurz

ATTORNEYS

CLOCKWISE

| IBM CODE | | BCD CODE 10 8 4 2 1 |
|---|---|---|
| 11 | BLANK | 0 0 0 0 0 |
| 1 | 1 | 0 0 0 0 1 |
| 2 | 2 | 0 0 0 1 0 |
| 3 | 3 | 0 0 0 1 1 |
| 4 | 4 | 0 0 1 0 0 |
| 5 | 5 | 0 0 1 0 1 |
| 6 | 6 | 0 0 1 1 0 |
| 7 | 7 | 0 0 1 1 1 |
| 8 | 8 | 0 1 0 0 0 |
| 9 | 9 | 0 1 0 0 1 |
| 0 | 0 | 1 0 0 0 0 |
| 7-11 | P | 1 0 0 0 1 |
| 0-1 | / | 1 0 0 1 0 |
| 8-3 | · | 1 0 0 1 1 |
| 4-11 | M | 1 0 0 1 0 |
| 0-4 | U | 1 0 1 0 1 |
| 8-11 | Q | 1 0 1 1 0 |
| 0-5 | V | 1 0 1 1 1 |
| 0-7 | X | 1 1 0 0 0 |
| 0-9 | Z | 1 1 0 0 1 |

TABLE A

COUNTER-CLOCKWISE

| IBM CODE | | BCD CODE 10 8 4 2 1 |
|---|---|---|
| 11 | BLANK | 0 0 0 0 0 |
| 1-12 | A | 0 0 0 0 1 |
| 0-2 | S | 0 0 0 1 0 |
| 4-12 | D | 0 0 0 1 1 |
| 6-12 | F | 0 0 1 0 0 |
| 7-12 | G | 0 0 1 0 1 |
| 3-11 | L | 0 0 1 1 0 |
| 3-12 | C | 0 0 1 1 1 |
| 1-11 | J | 0 1 0 0 0 |
| 8-12 | H | 0 1 0 0 1 |
| 6-11 | O | 1 0 0 0 0 |
| 3-0 | T | 1 0 0 0 1 |
| 9-11 | R | 1 0 0 1 0 |
| 5-11 | N | 1 0 0 1 1 |
| 9-12 | I | 1 0 0 1 0 |
| 5-12 | E | 1 0 1 0 1 |
| 2-12 | B | 1 0 1 1 0 |
| 2-11 | K | 1 0 1 1 1 |
| 6-0 | W | 1 1 0 0 0 |
| 8 0 | Y | 1 1 0 0 1 |

TABLE B

INVENTOR

RICHARD DENNIS LIVESEY

BY Strauch, Nolan, Neale, Nies & Kurz
ATTORNEYS

INVENTOR

RICHARD DENNIS LIVESEY

BY Fraud, Nolan, Neale, Nies & Kurz
ATTORNEYS

INVENTOR
RICHARD DENNIS LIVESEY
BY Strauch, Nolan, Neale, Nies & Kurz
ATTORNEYS

INVENTOR
RICHARD DENNIS LIVESEY

Strauch, Nolan, Neale, Nies & Kurz
ATTORNEYS

INVENTOR

RICHARD DENNIS LIVESEY

BY Strauch, Nolan, Neale, Nies & Kurz

ATTORNEYS

INVENTOR

RICHARD DENNIS LIVESEY

Strauch, Nolan, Neale, Nies & Kurz

ATTORNEYS

INVENTOR

RICHARD DENNIS LIVESEY

BY Strauch, Nolan, Neale, Nies & Kurz

ATTORNEYS

INVENTOR

RICHARD DENNIS LIVESEY

BY Strauch, Nolan, Neale, Nies & Kurz
ATTORNEYS

INVENTOR
RICHARD DENNIS LIVESEY

ATTORNEYS

INVENTOR
RICHARD DENNIS LIVESEY

BY Strauch, Nolan, Neale, Nies & Kurz
ATTORNEYS

INVENTOR
RICHARD DENNIS LIVESEY

BY Strauch, Nolan, Neale, Nies & Kurz
ATTORNEYS

INVENTOR

RICHARD DENNIS LIVESEY

BY Strauch, Nolan, Neale, Nies & Kurz
ATTORNEYS

INVENTOR
RICHARD DENNIS LIVESEY

BY Strauch, Nolan, Neale, Nies & Kurz
ATTORNEYS

INVENTOR
RICHARD DENNIS LIVESEY

BY Strauch, Nolan, Neale, Nies & Kurz
ATTORNEYS

INVENTOR
RICHARD DENNIS LIVESEY
BY Strauch, Nolan, Neale, Nies & Kurz
ATTORNEYS

*INVENTOR.*

RICHARD DENNIS LIVESEY

*BY*

Strauch, Nolan, Neale, Nies & Kurz

ATTORNEYS

INVENTOR.
BY RICHARD DENNIS LIVESEY

Strauch, Nolan, Neale, Nies & Kurz
ATTORNEYS

INVENTOR.
RICHARD DENNIS LIVESEY
BY
Strauch, Nolan, Neale, Nies & Kurz
ATTORNEYS INVENTOR.
RICHARD DENNIS LIVESEY
BY
Strauch, Nolan, Neale, Nies & Kurz
ATTORNEYS

ELECTRONIC CONTROLS FOR ALPHANUMERIC PRINTER

FIELD OF INVENTION

This invention relates to recording systems and more particularly to systems for recording the weight of a weighed load as well as other information usually associated with the weighed load.

BACKGROUND

Prior recording systems for printing the weight of a weighed-out load have proved to be insufficient in one way or the other for meeting current and newly arising industrial requirements. For instance, the shortcomings of many commercially available weight recording systems include relative slow speed printing operations, no provision for printing information other than weight information, and no provision for printing multiple lines of print.

One example of current requirements arises in connection with the paper mill industry and is the need for rapidly printing the weight of a weighed-out paper roll or other paper product as well as other associated information on a label or the like which is then applied to the weighed roll in preparation for shipment to a customer. It is desirable sometimes that the labels include such information as the purchaser's name and address, the destination of the roll, and other data pertaining to the size, color, type and/or grade of the paper. In the past this information was customarily converted into a coded numerical format and stenciled by hand on the label owing to the above-mentioned shortcomings of prior commercially available weight-recording printers.

SUMMARY AND OBJECTS OF INVENTION

The present invention in fulfilling the above-mentioned industrial requirements and other needs provides a novel high speed, efficiently organized information-recording system which is capable of accepting information from a plurality of data sources and rapidly printing both numbers and letters of the alphabet as well as other characters in multiple lines of print. Thus, with the recording system of this invention the weight information supplied by one source and associated information from another source may be printed on the same label or recording sheet with the same printer.

In summary, the data recording system of this invention generally comprises (a) a plurality of data sources for respectively containing the weight of a weighed load and other information preferably in the form of suitable coded data words, (b) a printer having a plurality of motor driven alpha-numeric printing wheels, (c) a logic circuit for reading out the information in the data sources and for setting up the printing wheels to print the read-out information, and (d) a control circuit for controlling the read-out of information by the logic circuit and for correlating the operation of the printer with the operation of the logic circuit. In the embodiment described herein the data sources provide for the storage of the information in bistable devices. Operation of the system is initiated by a single command signal which is produced when information is inserted into one of the sources.

Each printing wheel has printing type for printing both numbers and letters of the alphabet as well as other symbols (such as, for example, punctuation signs) so as to enable the same set of printing wheels to be utilized in printing both the weight of a weighed-out load and other information such the name and address of the purchaser of the weighed load and the destination of the weighed load.

According to this invention read-out and printing of both of the above-mentioned types of information is accomplished in response to above-mentioned command signal so that the only work needed to print a record of the information is to put the load on the scale and to insert the additional information into the proper source.

According to a further feature of this invention, the logic circuit mentioned above has a countdown counter for each printing wheel. Each data word representing the character to be printed out by a given printing wheel is loaded into one counter, and the counters are then operated to count down to zero or some other reference level. During the countdown, clock pulses are conducted by enabling signals to operate the printing wheel motors, thereby advancing the printing wheels toward their printing positions. When each counter reaches the zero or other reference level, passage of the motor-driving clock pulses are inhibited, thus stopping the printing wheel at its proper printing position.

The logic circuit of this invention further provides for the printing of multiple lines of print by reading out the stored information sequentially according to the lines of print and by re-positioning the printing wheels after each line of print.

According to another important feature of this invention the print wheels are initially positioned to locate a blank home space (i.e., a reference space having no printing type for printing a character) at a platen printing position. The print wheel control circuit is operative to rotate each print wheel in a predetermined direction for printing out a pre-selected character. After the character is printed, the print wheel control circuit automatically reverses rotation of each print wheel to return it to a position where its blank home space is again located at the platen printing position in preparation for another printing cycle.

In conjunction with the foregoing feature, the print wheel control circuit of this invention is also operative to set each print wheel to its printing position by automatically selecting the direction of rotation which requires rotation through the shortest angle to reach the position for printing out the desired character. For example, assume that the type for the letter B is located 90° in a clockwise direction from the blank home space, the print wheel control circuit will automatically be conditioned to rotate the wheel in a counterclockwise direction for printing the letter instead of a clockwise direction. If, on the other hand, the letter was located 90° in a counterclockwise direction from the blank home space, the print wheel will be set to its printing position by being rotated in a clockwise direction. Thus the time required for setting and resetting the print wheels in this invention is significantly reduced as compared with conventional printers in which the print wheels are driven only in a single direction.

The bi-directional drive for the print wheels in this invention is further advantageously utilized by judicially positioning the printing type on the wheels so that the most frequently used characters are nearest to the blank home space. For example, assume that the letter A will be the most frequently printer character. The type for the letter A is then positioned adjacent or close to the home position so that the angle through which the wheel is required to rotate to print the letter A is relatively small. By reversing the direction of the print wheel to reset it after the letter A is printed, it is evident that only the same small angle will be traversed.

With the foregoing in mind, one major object of this invention is to provide for a novel recording system for rapidly and conveniently printing out different types of information, such as the weight of a weighed-out load and other information that may be associated with the weighed load.

According to another important object of this invention, a novel recording system is provided for automatically printing a plurality of lines of print with the same set of printing wheels in response to a single selectively produced command signal.

Another object of this invention is to provide for a novel recording system in which each printing wheel is employed to print both numbers and letters for printing out a record of information supplied by one or more sources.

Other objects of this invention will appear as the description proceeds in connection with the appended claims and the below-described drawings.

DETAILED DESCRIPTION

Figure 1:
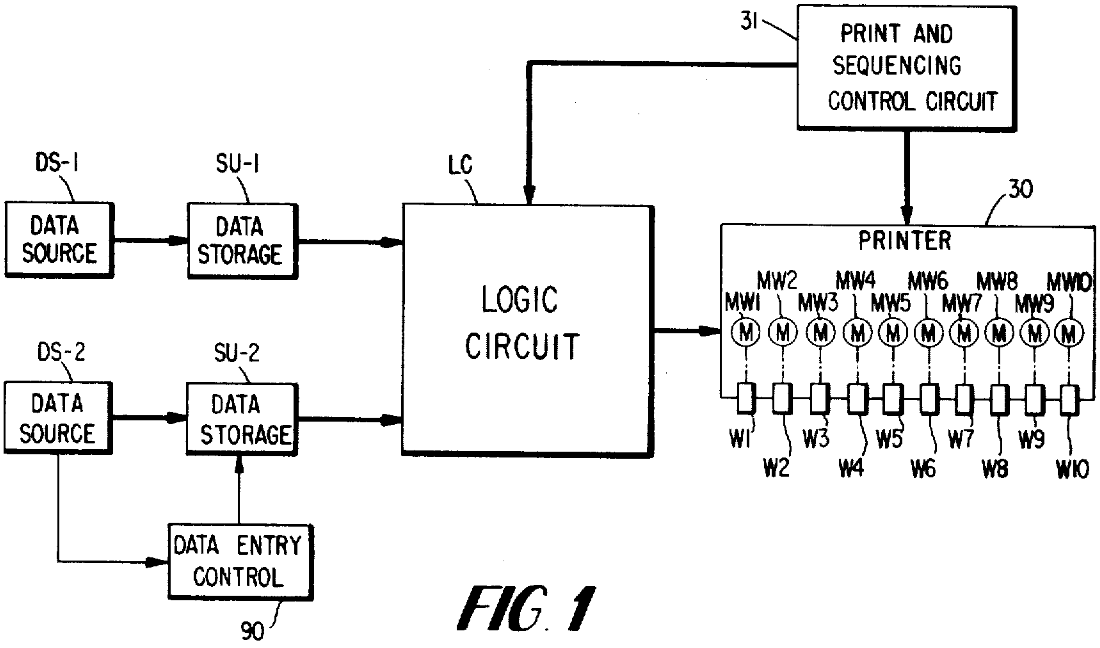
FIG. 1 schematically illustrates the basic diagram of the recording system according to a preferred embodiment of this invention.

Referring to FIG. 1, the data recording system of this invention generally comprises a plurality of data sources DS-1 and DS-2 for supplying data words in the form of coded data bits, a corresponding plurality of data storage units SU-1 and SU-2 for storing the data words supplied by data sources DS-1 and DS-2 respectively, a logic circuit LC for reading out the data words stored in units SU-1 and SU-2, a printer 30 for printing the data words read out by circuit LC, and a print and sequencing control circuit 31 for controlling the readout of data words by circuit LC and for correlating operation of printer 30 with the operation of circuit LC.

Figure 2:
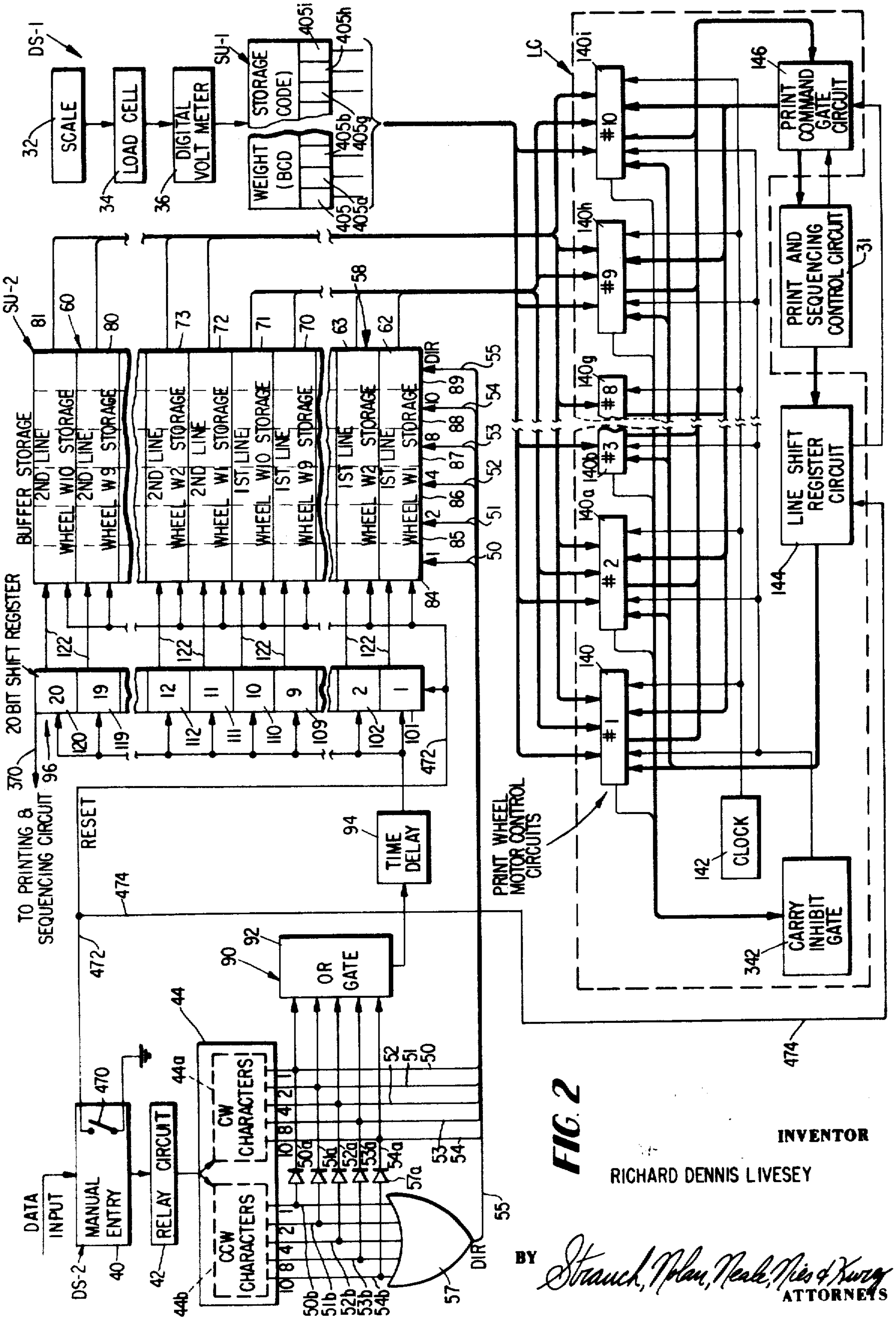
FIG. 2 is a schematic diagram of the logic circuit shown in FIG. 1.

According to this invention, source DS-1 supplies weight information or, more particularly, the weight of a load placed on a suitable scale 32 (See FIG. 2). Source DS-2 provides other data associated with the load weighed by scale 32 such as, for example, the name and address of the purchaser of the weighed load and the destination of the load.

Printer 30, as shown in FIG. 1, has a series of alphanumeric printing wheels W1, W2, W3, W4, W5, W6, W7, W8, W9 and W10 for printing both numbers and letters of the alphabet, as well as other symbols such as punctuation signs. Printer 30 is thus capable of printing the type of information furnished by sources DS-1 and DS-2 on labels, sheets, cards, tags and the like. The printed matter may be applied to the weighed-out load or otherwise utilized to provide a record of the weight of the weighed load in addition to the other information supplied by source DS-2. It will be appreciated that the number of printing wheels employed in printer 30 may be varied depending upon the information to be printed to provide a record of the input data.

One application of this invention is in paper mills where the paper may be packed in rolls and shipped to a destination designated by the purchaser. The paper rolls are customarily weighed to determine, among other things, the price of the roll and the cost of shipment. With the recording system of this invention, all of the desired information is rapidly printed on a label by a single printer in response to a single, selectively produced command signal, and the printed label is then applied to the weighed-out paper roll preparatory to shipment.

Figure 3:
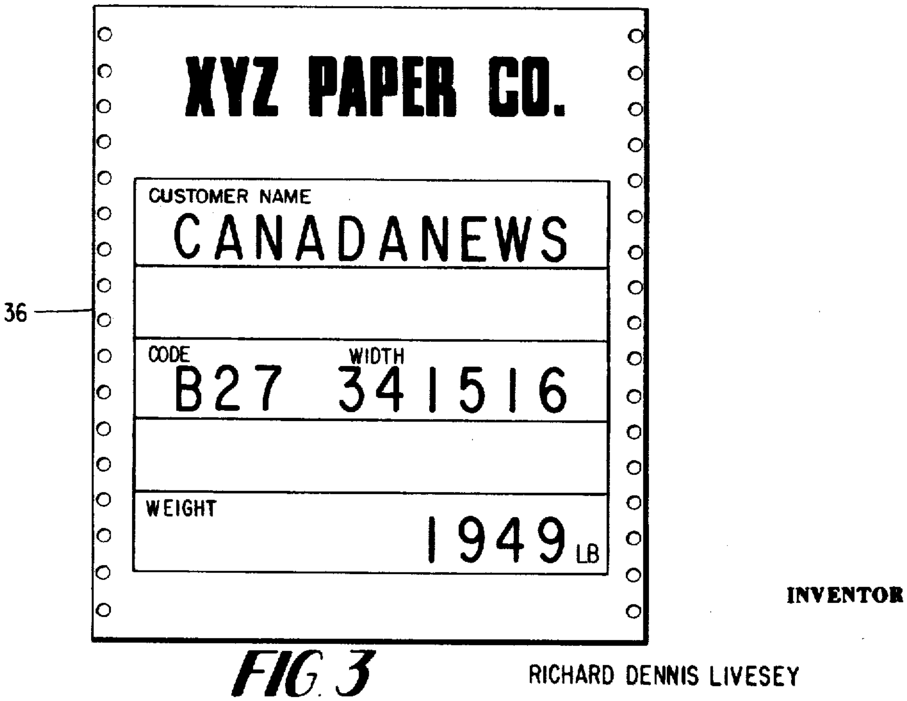
FIG. 3 illustrates a typical label that the recording system of this invention is capable of printing.

For paper rolls, the information supplied by source DS-2 may be the purchaser's name, the purchaser's address, the destination of the paper roll, the size of the paper, the type, grade, and/or color of the paper and the tare weight of the roll. The information supplied by source DS-1 will be the weight of the paper roll that is weighed on scale 32. A typical label is indicated at 36 in FIG. 3.

With the logic and control circuitry of this invention, the data stored in units SU-1 and SU-2 may advantageously be printed in two or more lines using the same set of printing wheels, namely wheels W1–W10, to print each line. In general, this is accomplished by reading out the stored information sequentially according to the lines of print to be printed and by re-positioning printing wheels W1–W10 after each line is printed so as to properly set the wheels for the next line of print. Thus, the lines of print will be printed sequentially, and the characters in each line will be printed simultaneously.

Figures 4, 5:
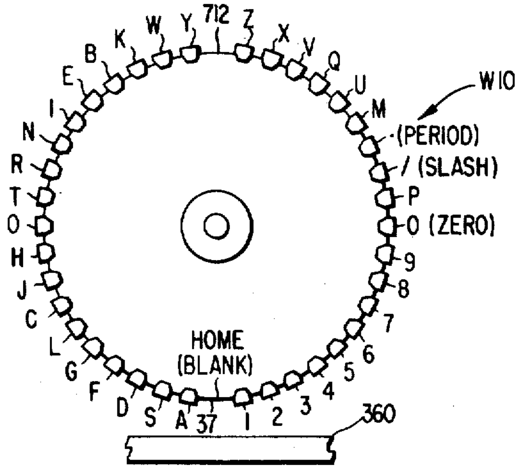
FIG. 4 is a partially diagrammatic side view of one of the printing wheels shown in FIG. 1.
FIG. 5 illustrates two tables containing the five-bit BCD code used in this invention, as well as a standard IBM code.

As shown in FIG. 4, each printing wheel has printing type for printing the numberals 0, 1, 2, 3, 4, 5, 6, 7, 8, and 9, all of the letters in the alphabet, and punctuation signs or symbols such as a period and a slash. In this embodiment, each of the printing wheels W1–W10 has 40 printing positions. One printing position on each wheel is not used, and one position is blank to serve as a home position. One suitable arrangement of the printing type is shown in FIG. 4 where the printing type is arranged in the following order going counterclockwise from the home position or the blank home space of the wheel: 1, 2, 3, 4, 5, 6, 7, 8, 9, 0, P, /, ., M, U, Q, V, X, Z, Y, W, K, B, E, I, N, R, T, O, H, J, C, L, G, F, D, S, and A. It will be appreciated that the number of printing positions, the number and character of the printing type, and the order of the printing type may be varied as desired.

As will be described in greater detail later on, printer 30 comprises a vertically displaceable platen 360 (FIG. 18) disposed horizontally below wheels W1–W10. When platen 360 is raised a line of print will be printed out on a label or the like. The characters that will be printed are those which face vertically downwardly along a vertical axis normally intersecting the rotational axes of the print wheels. This position will be referred to as the platen printing position in the subsequent description. Frequently reference will be made to the blank home space (indicated at 37, in FIG. 4) as being at the platen printing position as shown in FIG. 4. For the sake of brevity, however, this printing wheel position will sometimes be simply referred to as the "home position" of the printing wheel. Thus the printing wheel in FIG. 4, is shown at its "home position."

Each of the data sources DS-1 and DS-2 preferably comprises any suitable source of data represented in multibit binary word form. For the binary bits or digits, it will be assumed for purposes of this description that the logic levels are +5 volts for a binary 1 or a high and ground or 0 volts for a binary 0 or a low. For the sake of brevity, it is sometimes stated in this description that a binary 1 or a binary 0 is supplied or obtained instead of stating that a 5-volt signal (i.e., the presence of a signal) or 0 volts (i.e., the absence of a signal) is furnished or derived.

Because of its known advantages, a five-bit binary coded decimal (BCD) number system is utilized in this invention, although it will be appreciated that other codes may be employed. The bits or binaries are labeled 10, 8, 4, 2, 1 in the drawings, and five-bit BCD code employs five bits to represent each decimal digit, letter of the alphabet, or other symbol. One suitable application of this code is shown in tables A and B of FIG. 5. In each table the BCD code is shown in the right-hand column, and the characters represented by the BCD code are listed in the center column of each table. As shown, each coded, multibit binary number or data word represents two characters, one in table A and one in table B. This will be explained later on.

Referring now to FIG. 2, data source DS-1 comprises scale 32, one or more load cells 34, and a digital volt meter 36. Load cell 34 is operatively connected to the platform of scale 32 in a conventional manner to produce an analog signal voltage whose amplitude is proportional to the weight of the load placed on the scale platform. Volt meter 36 may be of any suitable form for converting the input analog signal into a BCD output.

The BCD output of volt meter 36 is loaded into the weight storage unit SU-1. Weight storage unit SU-1 comprises any suitable circuit such as an array of electro-mechanical storage relays for at least temporarily storing the output of volt meter 36 in the BCD format shown in table A. Since the weight of 10 in the data words for each of the numbers 1 through 9 has been arbitrarily selected to be a binary 0 (See FIG. 5, table A), the relay storage circuit for unit SU-1 requires only four relays for each decade of the multi-digit number representing the weight of the load placed on the scale platform. It will be appreciated that when the weight information from scale 32 is loaded into storage unit SU-1, storage unit SU-1 also may be regarded as being a source of data to be read out by logic circuit LC.

One printing wheel will be assigned to each four-relay decade in storage unit SU-1, and each four-relay decade will have four parallel outputs in BCD format. Thus, it is clear that unit SU-1 has four parallel outputs (one for each relay) for each four-relay decade and provides a binary 1 or a binary 0 at each output according to the BCD code shown in table A.

To simplify this description, it will be assumed that there are as many four-relay decades in unit SU-1 as there are printing wheels in printer 30. Thus, the printing wheel control circuits to be described in detail later on will be the same for each printing wheel. In practice, however, all 10 of the printing wheels are normally not required for printing the weight information supplied by unit SU-1. Instead, only three to six printing wheels are usually needed to print out the desired weight information.

With continued reference to FIG. 2, source DS-2 has five parallel binary outputs respectively corresponding to the five bit positions in the 10, 8, 4, 2, 1 BCD code. Thus, source DS-1 provides a binary 1 or a binary 0 at each of these five outputs to represent the character entered at the input side of the source. In parallel with the five outputs mentioned above, source DS-2 has a further binary output which is referred to as the direction control and which provides a binary 1 or a binary 0 to determine whether the binary values on the first five outputs are to represent a character in table A or table B. This sixth binary output also provides the control for advancing counter wheels W1–W10 in either a clockwise or a counterclockwise direction in a manner to be described in detail later on.

Source DS-2 may be equipped to receive data in any suitable manner. For example, a manual data entry device 40 may be a conventional IBM pushbutton unit consisting of a series of normally open pushbuttons having a diode matrix to provide an output in terms of the standard IBM code shown in the left-hand columns of tables A and B.

If the output of the manual entry device 40 is in terms of a code other than the five-bit BCD code shown in tables A and B, then suitable relay input and interface circuits 42 and 44 are necessary for converting the output of device 40 into the five-bit BCD format shown in tables A and B. Relays in circuit 42 are operated by the coded output signals of device 40, and the relay conditions are transferred into the interface circuit 42 which may be an AND gate matrix of suitable form to convert the IBM code in the left-hand columns of tables A and B into the BCD code shown in the right-hand columns of tables A and B.

It will be appreciated that if the data entered into source DS-2 is initially in the BCD code shown in the right-hand columns of tables A and B, then circuits 42 and 44 are not required.

The pushbutton type of manual entry device mentioned above will have as many pushbuttons or keys as there are characters on one of the print wheels W1–W10 and one additional pushbutton which is used for reset or clearing purposes in a manner to be explained later on. Since there are 38 characters and one home position on each of the print wheels in this embodiment, then the pushbutton type of manual entry device will have at least 40 pushbuttons and consequently 40 key outputs.

As shown in FIG. 2, the logic in circuit 44 is divided into two sections **44*a* and 44*b*, and the logic is such that the data words in Table A will be applied to the output terminals of section 44*a*, while the data words in Table B will be applied to the output terminals of section 44*b*. The bits forming the five-bit BCD code and provided at the output section 44*a*, are transmitted in parallel (i.e., along as many conductors as there are bits) to storage unit SU-2. Thus, five parallel register lines indicated at 50, 51, 52, 53, and 54 are provided for transferring each data word to unit SU-2. Lines 50–54 are respectively connected to the 1, 2, 4, 8, and 10 output terminals of section 44*a***.

The 1, 2, 4, 8, and 10 output terminals of section **44*b*, are connected in parallel to lines 50–54 by lines 50*a*, 51*a*, 52*a*, 53*a*, and 54*a* respectively. Thus, the data word at the output terminals of section 44*b* will also be transmitted by lines 50–54** to unit SU-2.

The output terminals of section **44*b*, are also connected in parallel to an OR gate 57 by lines 50*b*, 51*b*, 52*b*, 53*b*, and 54*b*. Gate 57 supplies the previously mentioned direction control bit. The output of gate 57 is connected by a separate register line 55** to unit SU-2. Thus entry of information into unit SU-2 is in parallel.

If a data word is supplied at the output of section **44*b*, a binary 1 will be provided on line 55 since all of the data words in Table B have at least one binary 1. However, if the data word is supplied by section 44*a*, then there will be a zero potential at the output terminals of section 44*b*, and the output of gate 57 will therefore be a binary 0. This logic therefore supplies the desired direction control information for distinguishing the data words in Table A from those in Table B and for determining the direction in which the print wheels will be rotated. Diodes 57*a* are contained in lines 50*a*–50*a* to prevent 5-volt signals at the output terminals of section 44*a* from being transmitted to the input side of gate 57**.

In place of the type of manual data entry device mentioned above, it will be appreciated that other forms of data entry devices may be employed such as, for example, punch cards or tapes which may be inserted into a reader for reading out the information on the card or tape.

Unit SU-2 is of the conventional buffer storage type and is divided into as many decks as there are lines of print for the information supplied by source DS-2. In this embodiment, the information supplied by source DS-2 may be printed in two lines. Consequently, unit SU-2 has two decks indicated at 58 and 60 respectively, with each deck being sub-divided into as many registers or sub-units as there are printing wheels. Thus, 10 registers 62, 63, 64, 65, 66, 67, 68, 69, 70, and 71 are provided in deck 58 and a corresponding number of registers 72, 73, 74, 75, 76, 77, 78, 79, 80, and 81 are provided in deck 60. It will be noted that a third line of print is reserved for the weight information supplied by source DS-1.

Each of the registers 62–81 has five flip-flop circuits or stages 84, 85, 86, 87, and 88 for storing one data word (i.e., five data bits or one bit per stage) supplied by source DS-2 as well as a sixth flip-flop stage 89 for storing the associated direction control bit which is also supplied by source DS-2. Thus, unit SU-2 is capable of storing up to two lines of print and up to 10 data words in each line of print.

Figure 6:
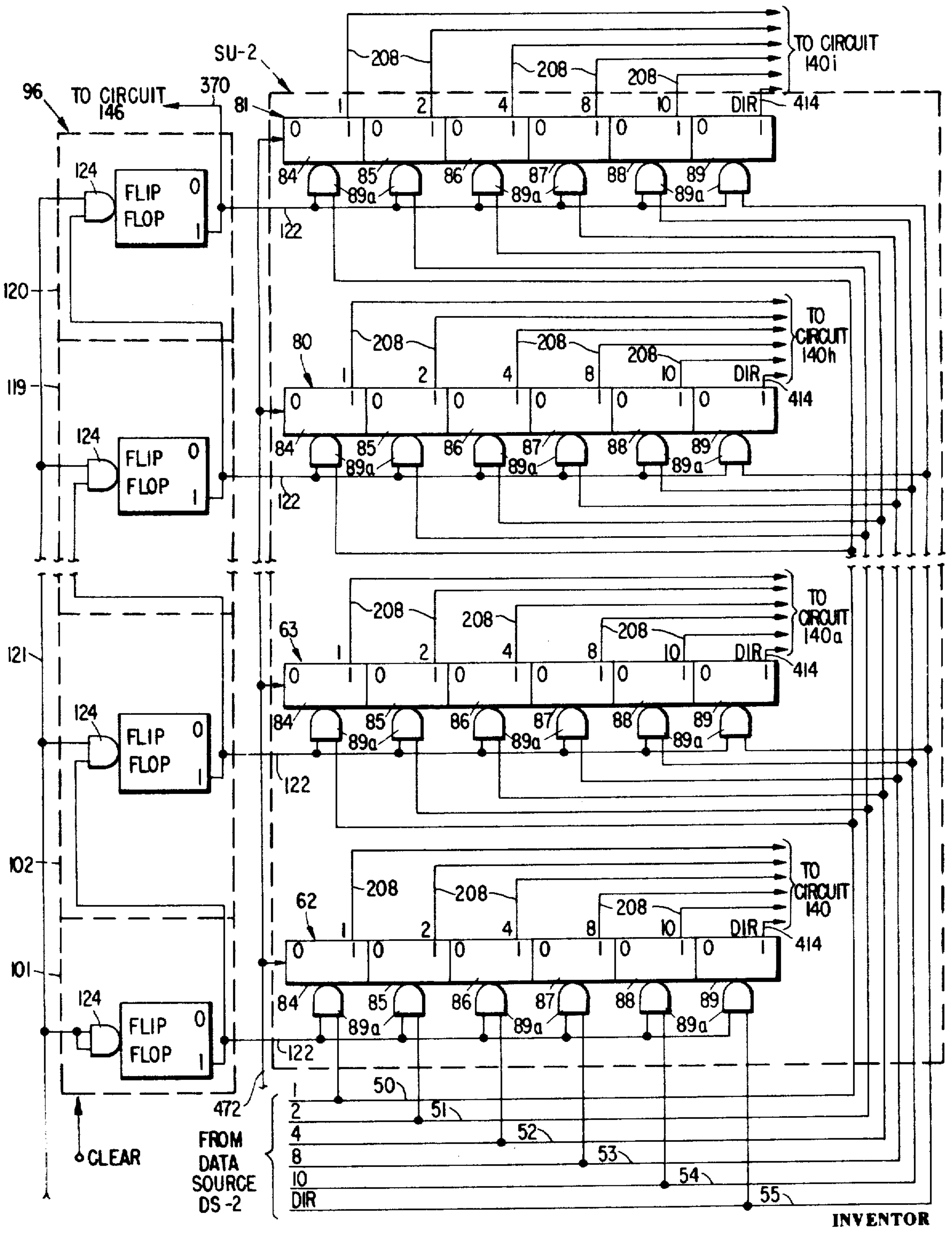
FIG. 6 is a circuit diagram of portions of the shift register and buffer storage register shown in FIG. 2.

Each of the stages in registers 62–81 is provided with an information read-in, diode-capacitor-diode (DCD) type AND gate indicated at **89*a* in FIG. 6**. This type of gate is conventional and will be explained in greater detail later on.

As best shown in FIG. 6, register line 50 is connected to the read-in AND gate input terminals of all of the stages 84 in registers 62–81, register line 51 is connected to the read-in AND gate input terminals of all of the stages 85 in registers 62–81, register line 52 is connected to the read-in AND gate input terminals of all stages 86 in registers 62–81, register line 53 is connected to the read-in AND gate input terminals of all of the stages 87 in registers 62–81, register line 54 is connected to the read-in AND gate input terminals of all of the stages 88 in registers 62–81, and line 55 is connected to the read-in AND gate input terminals of all of the stages 89 in registers 62–81. None of the information, however, will be read into registers 62–81 until a transfer or read-in pulse is applied to the read-in AND gates **89*a*** of the registers.

Data information supplied by source DS-2 is read into storage unit SU-2 under the control of a data entry control circuit 90 (FIG. 1). Circuit 90, as shown in FIG. 2, comprises an OR gate circuit 92, a time delay one shot circuit 94, and a 20 bit shift register 96.

The OR gate circuit 92 has five inputs respectively connected to register lines 50–55 with the result that when a binary 1 is supplied to at least one of the register lines 50–55, gate circuit 92 will be enabled to supply a 5-volt signal to circuit 94. Since the BCD code shown in tables A and B has at least one binary 1 for each of the characters represented by the code, circuit is enabled whenever a pushbutton for one of the characters in device 40 is depressed.

Circuit 94 is of suitable conventional form for producing a single output pulse of limited duration a short predetermined time after a 5-volt signal is applied to its input by circuit 92. The output pulse produced by circuit 94 is simultaneously applied to all of the 20 flip-flop circuits or stages of shift register 96.

Shift register 96 is of conventional form, and the 20 flip-flop stages are respectively indicated at 101, 102, 103, 104, 105, 106, 107, 108, 109, 110, 111, 112, 113, 114, 115, 116, 117, 118, 119, and 120 in FIG. 2. Register 96 may be made up by cascading five four-stage shift registers of the type shown on page 99 in the 1968 Edition of the handbook published by the Digital Equipment Corporation of Maynard, Mass. and entitled "The Digital Logic Handbook." Each of the stages 101–120 is conventionally provided with a read-in AND gate 124 (See FIG. 6). As best shown in FIG. 6, the read-in AND gate input terminals of stages 102–120 are each connected to the 1 output terminal of the preceding stage. Both read-in AND gate input terminals of stage 101 are connected to the output of circuit 94 by a line 121. Line 121 is also connected to one input terminal of each of the remaining AND gates 124 in register 96 as shown.

Operation of shift register 96 is well known. Assuming that all of the stages 101–120 are cleared to a zero state (i.e., a binary 0 on the 1 output terminals of stages 101–120), the first pulse from circuit 94 will switch stage 101 to the 1 state, thereby providing a binary 1 at the 1 output terminal of stage 101. The remaining stages 102–120 will remain in their zero states (i.e., a binary 0 on their 1 output terminals) for none of the AND gates 124 of these remaining stages were enabled at the time the first pulse was received from circuit 94.

When a binary 1 is provided at the 1 output terminal of stage 101, the AND gate of stage 102 will be enabled, or, in short, gate 124 of stage 102 will be conditioned to conduct the next pulse from circuit 94. The next pulse therefore switches the flip-flop to provide a binary 1 on the 1 output terminal of stage 102. Gate 124 of stage 103 will now be enabled in preparation for the third pulse from circuit 94. In this fashion, the count will be advanced through register 96, with each pulse from circuit 94 providing a binary 1 on the 1 output terminal of each succeeding stage. The turned-on stages will remain in their 1 states until register 96 is cleared by applying zero potential to a line 472.

Still referring to FIGS. 2 and 6, the 1 output terminals of shift register stages 101–120 are connected in parallel by read-in lines 122 to registers 62–82 respectively. More specifically, the 1 output terminal of stage 101 is connected to the input AND gates **89*a* for all of the stages in register 62, the 1 output terminal of stage 102 is connected to the input AND gates 89*a* for all of the stages in register 63, the 1 output terminal of stage 103 is connected to the input AND gates 89*a* for all of the stages in register 64, the 1 output terminal of stage 104 is connected to the input AND gates 89*a* for all of the stages in register 65, the 1 output terminal of stage 105 is connected to the input AND gates 89*a* for all of the stages in register 66, the 1 output terminal of stage 106 is connected to the input AND gates 89*a* for all of the stages in register 67, the 1 output terminal of stage 107 is connected to the input AND gates 89*a* for all of the stages in register 68, the 1 output terminal of stage 108 is connected to the input AND gates 89*a* for all of the stages in register 69, the 1 output terminal of stage 109 is connected to the input AND gates 89*a* for all of the stages in register 70, the 1 output terminal of stage 110 is connected to the input AND gates 89*a* for all of the stages in register 71, the 1 output terminal of stage 111 is connected to the input AND gates 89*a* for all of the stages in register 72, the 1 output terminal of stage 112 is connected to the input AND gates 89*a* for all of the stages in register 73, the 1 output terminal of stage 113 is connected to the input AND gates 89*a* for all of the stages in register 74, the 1 output terminal of stage 114 is connected to the input AND gates 89*a* for all of the stages in register 75, the 1 output terminal of stage 115 is connected to the input AND gates 89*a* for all of the stages in register 76, the 1 output terminal of stage 116 is connected to the input AND gates 89*a* for all of the stages in register 77, the 1 output terminal of stage 117 is connected to the input AND gates 89*a* for all of the stages in register 78, the 1 output terminal of stage 118 is connected to the input AND gates 89*a* for all of the stages in register 79, the 1 output terminal of stage 119 is connected to the input AND gates 89*a* for all of the stages in register 80, and the 1 output terminal of stage 120 is connected to the input AND gates for all of the stages in register 81**.

A binary 1 on any one of the read-in lines 122 will enable those input AND gates **89*a* of the buffer storage unit register that are connected to the read-in line to conduct the data information on lines 50–55. As a result, the data information on register lines 50–55 will be read into the storage stages 84–89**.

Gates **89*a*** may be of the type shown on page 138 of the previously identified Digital Logic Handbook.

When a binary 1 to be read into storage is applied to such a gate, a positive going pulse will appear at the output of the gate to switch the associated flip-flop stage to the 1 state when a read-in signal is applied to the associated read-in line 122. The charge condition on a capacitor in gate 89*a* will disable the gate after the information is read in so that further information will not be conducted until the buffer storage register is cleared.

Assume, for example, that the first character selected to be printed in the first line of print is the letter P. The manual entry pushbutton (of device 40) corresponding to the letter P is depressed with the result that bits or binaries 1, 0, 0, 0, and 1 (See Table A) will be provided on register lines 50, 51, 52, 53, 54 respectively. Also, a binary 0 will be provided on line 55 to distinguish the data word 10001 from the letter T (See Table B). Gate circuit 92 will therefore be enabled to conduct a signal to the delay one-shot circuit 94. Circuit 94, after a short time delay to ensure that the selected data word 10001 and the direction control binary 1 are ready to be loaded into unit SU-2, supplies a pulse which is applied to the input AND gates 124 of all of the shift register stages 101–120.

Assuming that shift register 96 has been initially reset so that all of the stages are in the 0 state, the flip-flop of stage 101 will be switched by the first pulse from circuit 94 to provide a binary and the 1 output terminal of stage 101. The binary value at each of the 1 output terminals of the remaining stages 102–120 will be a 0. As a result only the input AND gates 89*a* of the buffer storage register 62 will be conditioned to transfer the data bits on lines 50–55. The data word 10001 will consequently be read into stages 84–88 of register 62, and the direction control binary 0 will be read into stage 89 of register 62. Thus, the bits 1, 0, 0, 0, 1, and 0 will respectively be stored in stages 84–89 of register 62.

When the data entry pushbutton corresponding to the letter P is released, it is clear that the binary values corresponding to the letter P and its associated direction control will be removed from lines 50–55 with the result that each of the register lines 50–55 will again be provided with a binary 0. Gates 89*a*, being of the DCD type, will become disabled to prevent another data word from being read into register 62.

Assume now that it is desired that the letter A be printed next. The proper pushbutton in device 40 is depressed to provide the bits 1, 0, 0, 0, and 0 on lines 50–54 respectively. Since the letter A is in table B containing characters going counterclockwise from the home position, a binary 1 will be provided on register line 55. It is understood of course that in place of device 40 and circuits 42 and 44 the bits may directly be applied to lines 50 and 50*b*–54*b* simply by operation of on-off switches. In other words, there will be one such switch for each of the lines 50–54 and 50*b*–54*b*.

Owing to the binary 1 on line 50, circuit 92 is enabled to conduct a 5-volt signal to circuit 94, and again after a short time delay, circuit 94 produces its second pulse which is applied to the stages of shift register 96. As a result, a binary 1 will be provided at the 1 out put terminal of stage 102. The input AND gates of buffer storage register 63 will therefore be conditioned to read in the data word 00001 and the direction control binary 1 into the stages of register 63.

From the foregoing, it is clear that characters to be printed are serially entered into data source DS-2, and the BCD representations of the entered characters are successively read one at a time into storage unit SU-2. The bits of each data word are transferred and entered in parallel into unit SU-2. Each register of unit SU-2 stores one five-bit data word and one directional control binary bit.

The direction control bit (on register line 55), as will become more apparent later, furnishes the information for driving each of the printing wheels W1–W10 in one direction or the other. Thus, by relating the direction control information to the positions of characters shown in FIG. 4, the angle through which each printing wheel must be rotated to print any one of the characters shown in FIGS. 4 and 5 will not exceed approximately 171°. As compared with unidirectional printing wheels (i.e., printing wheels that can be advanced to printing positions only in one predetermined direction) the time for bi-directionally setting up or positioning wheels W1-W10 is significantly reduced.

It also will be appreciated from the description thus far that information is serially entered into data source DS-2 (i.e., one character after the other), and that shift register 96 routes the information from data source DS-2 into the different registers 101–120 of storage unit SU-2.

As shown in FIG. 2, logic circuit LC comprises 10 data read-out and print wheel motor control circuits 140, 140*a*, 140*b*, 140*c*, 140*d*, 140*e*, 140*f*, 140*g*, 140*h*, and 140*i* respectively for operating the 10 reversible, drive motors for wheels W1–W10. In other words, there will be one such read-out and print wheel motor control circuit for each printing wheel in printer 30. The 10 printing wheel drive motors are of the stepping type and are respectively indicated at MW1, MW2, MW3, MW4, MW5, MW6, MW7, MW8, MW9, and MW10 in FIG. 1. Motors MW1–MW10 are respectively drive connected to wheels W1–W10. Circuit LC further includes a clock or pulse generator 142, a line shift register circuit 144, and a print command gate circuit 146. Each of the motor control circuits 140 and 140*a–i* controls the application of pulses supplied by clock 142 for driving its associated print wheel motor in one direction or the other. The line shift register circuit 144 sequences the printing of each line on a label or the like. When wheels W1–W10 are properly positioned for printing out a given line of print (up to 10 characters of print per line in this embodiment), gate circuit 146 supplies a command signal to control circuit 31 for operating printer 30 to print out the line of print.

Clock 142 may be of any suitable free running pulse generator, and in this embodiment preferably has a positive going output pulse (0 to 5 volts) with a suitable frequency range.

As shown in FIG. 2, the output of clock 142 is routed by parallel lines to the motor control circuits 140 and 140*a–i*. Likewise, line shift register circuit 144 and gate circuit 146 are connected to each of the 10 control circuits 140 and 140*a–i*.

The 1 output terminals of registers 62 and 72 are connected only to the control circuit 140 for wheel W1 so that information stored in registers 62 and 72 is read out only by the control circuit 140 for wheel W1. The 1 output terminals of registers 63 and 73 are connected only to the control circuit **140*a* for wheel W2 so that the information stored in registers 63 and 73 of storage unit SU-2 is read out only by the control circuit 140*a* for wheel W2. The 1 output terminals of registers 64 and 74 are connected only to the control circuit 140*b* for wheel W3 so that the information stored in registers 64 and 74 of storage unit SU-2 is read out only by the control circuit 140*b* for wheel W3. The 1 output terminals of registers 65 and 75 are connected only to the control circuit 140*c* for wheel W4 so that the information stored in registers 65 and 75 of storage unit SU-2 is read out only by the control circuit 140*c* for wheel W4. The 1 output terminals of registers 66 and 76 are connected only to the control circuit 140*d* for wheel W5 so that the information stored in registers 66 and 76 of storage unit SU-2 is read out only by the control circuit 140*d* for wheel W5. The 1 output terminals of registers 67 and 77 are connected only to the control circuit 140*e* for wheel W6 so that the information stored in registers 67 and 77 of storage unit SU-2 is read out only by the control circuit 140*e* for wheel W6. The 1 output terminals of registers 68 and 78 are connected only to the wheel control circuit 140*f* for wheel W7 so that the information stored in registers 68 and 78 is read out only by circuit 140*f* for wheel W7. The 1 output terminals of registers 69 and 79 are connected only to the wheel control circuit 140*g* for wheel W8 so that the information stored in registers 69 and 79 of storage unit SU-2 is read out only by the control circuit 140*g* for wheel W8. The 1 output terminals of registers 70 and 80 are connected only to the wheel control circuit 140*h* for wheel W9 so that the information stored in registers 70 and 80 of storage unit SU-2 is read out only by the circuit 140*h* for wheel W9. Finally, the 1 output terminals of registers 71 and 81 are connected only to the wheel control circuit 140*i* for wheel W10 so that the information stored in registers 71 and 81 of storage unit SU-2 is read out only by the control circuit 140*i*** for wheel W10.

In addition to reading out the information in storage unit SU-2, each of the wheel control circuits 140 and **140*a–i*** is connected to storage unit SU-1. As a result, each of the print wheel control circuits is operative to read out the information stored in an associated relay decade of storage unit SU-1 in addition to the two associated registers in storage unit SU-2. Read-out of the information stored in storage unit SU-1 also is in parallel as will become more apparent later on.

Since all of the read-out and wheel control circuits 140 and **140*a–i* are substantially identical, only the wheel control circuit for wheel W10 will be described in detail. Thus, as best shown in FIG. 7, the read-out and wheel control circuit for wheel W10 comprises a driver 154 for motor MW10, a translator 156, a five-stage BCD count-down counter 158, a counter loading AND gate circuit 160, and AND gate enabling circuit 164, a wheel direction control circuit 166, a divide-by-four circuit 168**, and other logic to be described in detail later on.

Each of the print wheel drive motors MW1–MW10 may be of any suitable, conventional form such as the Superior Electric manufactured Slo Syn Model SS250 which is of the reversible, stepping type having four input terminals to which pulses are applied for stepping the motor in one direction or the other as generally indicated on page 271 of the previously mentioned Digital Logic Handbook. Driver 154 may be of any suitable, conventional form for providing the passage of pulses to be applied to the input terminals of motor MW10. One example of a suitable driver is shown on page 112of the previously mentioned Digital Logic Handbook.

Figure 7:
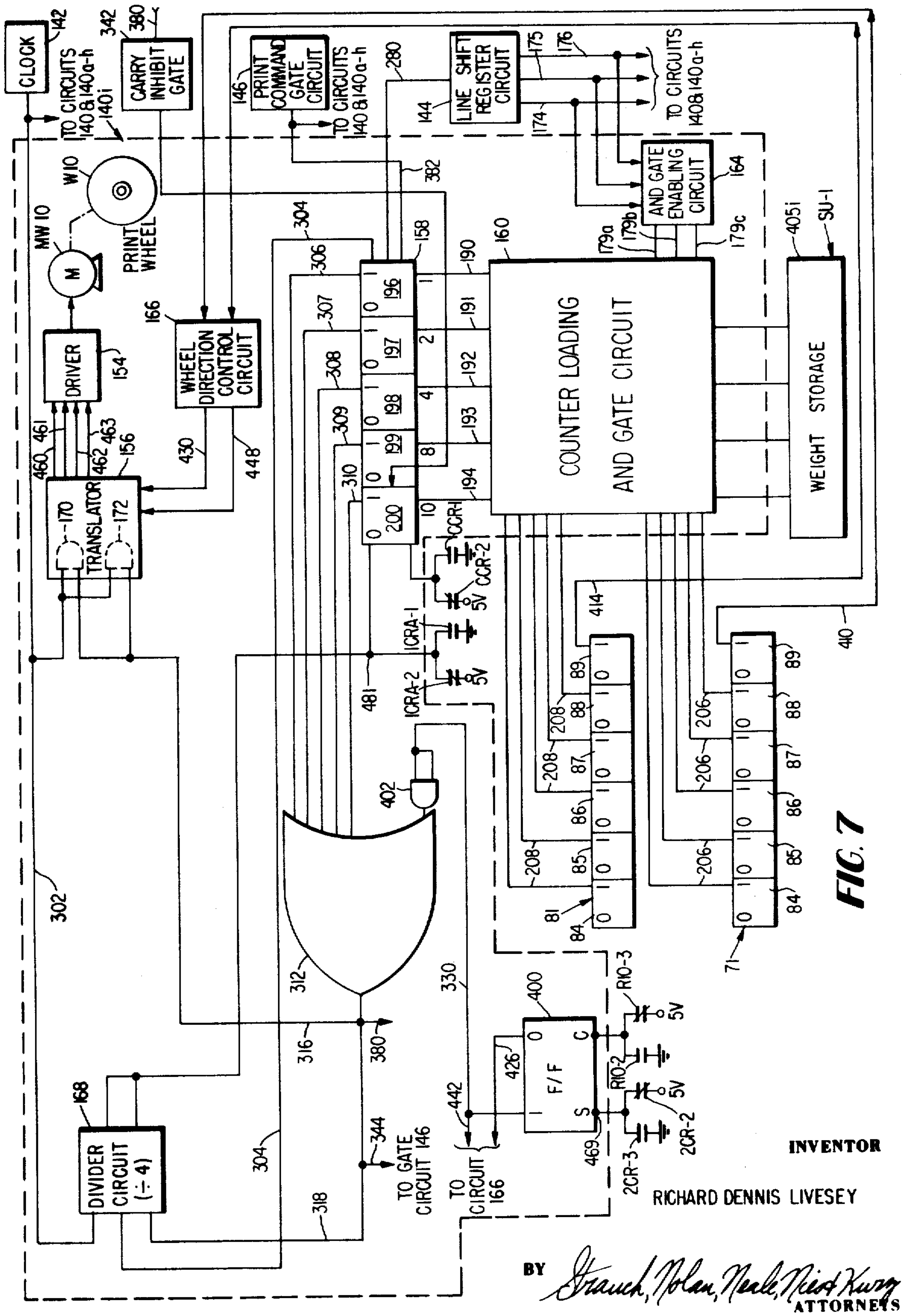
FIG. 7 is a circuit diagram of one of the print wheel motor control circuits shown in FIG. 2.

As shown in FIG. 7, the input terminals of driver 154 are connected to the output terminals of translator 156. Since the type of stepping motor mentioned above has four coils, there will be four leads connecting translator 156 to driver 154. Translator 156 has a forward drive or clockwise input AND gate 170 and also a reverse drive or counterclockwise input AND gate 172, both of which are connected to the output of clock 142. Translator 156 is responsive to the clock pulses for providing the pulse sequences that drive the motor MW10, and the direction in which motor MW10 is stepped will be determined by the signals supplied by direction control circuit 166 to translator 156. One suitable form of translator will be described later on. Motor MW10 requires 200 steps or 200 clock pulses to complete one revolution, and since wheel W10 has 40 printing positions, four clock pulses will be required for stepping wheel W10 one printing position or from one character to the next.

In general, gate circuit 160 provides for the gated transfer of information stored in stages 84–88 of registers 71 and 81 and in unit SU-1 to counter 158 in a sequence determined by circuit 144. As will be described in greater detail shortly, a count is shifted by operation of circuit 31 through the register portion of line shift register circuit 144 to apply 5-volt signals sequentially to signal lines 174, 175, and 176 as shown in FIG. 7. The signals on lines 174–176 are gated through circuit 164 to sequentially apply enabling signals to gate circuit 160 over read-out lines indicated at **179*a*, 179*b*, and 179*c* in FIG. 7. These enabling signals determine the sequence in which the information stored in register 71, register 81, and the associated relay decade of storage unit SU-1 will be loaded into counter 158**.

Figures 8, 24:
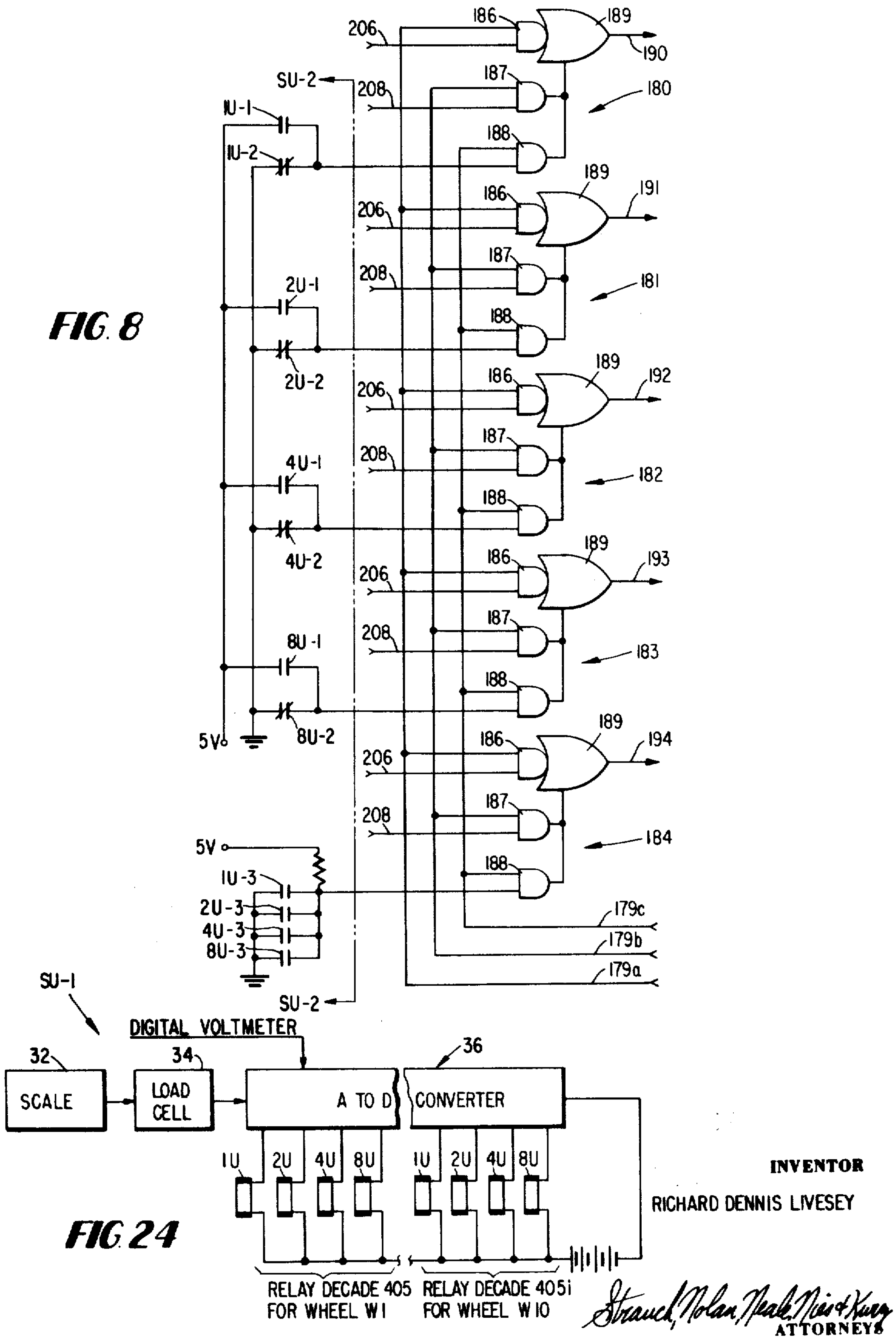
FIG. 8 is a circuit diagram of the counter loading AND gate circuit shown in FIG. 7.
FIG. 24 is a diagram showing part of the circuit for the weight storage unit.

As shown in FIG. 8, the counter loading AND gate circuit is suitably made up of five AND expansion gate networks indicated at 180, 181, 182, 183, and 184. Each of the networks 180–184 may be of the K123 type shown on page 87 of the previously mentioned Digital Logic Handbook.

Each of the networks 180–184 has three AND gates 186, 187, and 188 and one OR gate 189 connected in such a fashion that an AND condition of binary 1s at the input of any one of the AND gates 186–188 enables gate 189 so as to provide a binary 1 at the output of gate 189. Any other signal condition at the inputs of each of the AND gates 186–188, such as a binary 1 and a binary 0 or two binary 0's, will inhibit gate 189 with the result that the output of gate 189 will be provided with a binary 0. Reference is made to the truth tables in the previously identified Digital Logic Handbook.

Networks 181–184 are the same as network 180, like reference numerals being applied to designate like parts in networks 181–184. The logic of networks 181–184 is therefore the same as that just described for network 180.

Still referring to FIG. 8, counter loading lines 190, 191, 192, 193, and 194 respectively connect the OR gate outputs of networks 180, 181, 182, 183 and 184 in parallel relation to the counter loading terminals of the five counter flip-flop stages respectively indicated at 196, 197, 198, 199 and 200 in FIG. 7.

With continued reference to FIGS. 7 and 8, one input terminal of each of the AND gates 186 in networks 180–184 is connected to line 179a, one input terminal of each AND gate 187 in networks 180–184 is connected to line 179b, and one input terminal of each AND gate 188 in networks 180–184 is connected to enabling line 179c. Read-out lines indicated at 206 in FIGS. 7 and 8 connect the 1 output terminals of stages 84–88 in register 71 in parallel relation to the AND gates 186 in networks 180–184 respectively. Similarly, read-out lines indicated in 208 in FIGS. 7 and 8 connect the 1 output terminals of stages 84–88 in register 71 in parallel relation to AND gates 187 in networks 180–184 respectively.

The other input terminal of gate 188 in network 180 is connected through a set or normally open contacts 1U-1 to the positive terminal of a 5-volt d.c. power source and also through a set or normally closed contacts 1U-2 to ground. Similarly, the other input terminal of gate 188 in network 181 is connected through a set of normally open contacts 2U-1 to the positive side of the 5-volt source and also through a set of normally closed contacts 2U-2 to ground. The other input terminal of gate 188 in network 82 is connected through a set of normally open contacts 4U-1 to the positive side of the 5-volt source and also through a set of normally closed contacts 4U-2 to ground. The other input terminal of gate 188 in network 83 is connected through a set of normally open contacts 8U-1 to the positive side of the 5-volt source and also through normally closed contacts 8U-2 to ground. The remaining input terminal of gate 188 in network 184 is connected by parallel normally open contacts 1U-3, 2U-3, 4U-3, and 8U-3 to ground.

As shown in FIG. 24, a relay 1U operates contacts 1U-1 through 1U-3, a relay 2U operates contacts 2U-1 through 2U-3, a relay 4U operates contacts 4U-1 through 4U-3, and a relay 8U operates contacts 8U-1 through 8U-3. Relays 1U, 2U, 4U and 8U form one relay decade 405i in storage unit SU-2. One terminal of each of the relays 1U, 2U, 4U, and 8U is connected to a common battery terminal. The other terminals of relays 1U, 2U, 4U, and 8U are connected to the digital volt meter 36 which is a conventional analog to digital converter such as the type manufactured by the Dana Corporation. With this type of converter, circuits are complete so that relay 1U will be energized if the digital output is a binary 1 at the weight-of-one position, relay 2U will be energized if the digital output is a binary 1 at the weight-of-two position, relay 4U will be energized if the digital output is a binary 1 at the weight-of-four position, and relay 8U will be energized if the digital output is a binary 1 at the weight-of-eight position. Relays 1U, 2U, 4U, and 8U will be de-energized if the digital output is binary 0 for their respective weights.

Assume that the digital output of the converter is 0000 (representing a decimal zero). Relays 1U, 2U, 4U, and 8U will therefore be de-energized to apply zero potential to gates 188 in networks 180–183. Thus gates 188 in networks 180–183 will not conduct when a 5-volt signal is applied to line 179c. The output at each of the lines 190–193 will therefore be a binary 0, assuming that a binary 0 is at each of the lines 179a and 179b. Gate 188 in network 184, however, will not be grounded, and it will conduct to apply a binary 1 to line 194 when a binary 1 is applied to line 179c. For any one of the decimal digits 1–9, at least one of the relays 1U, 2U, 4U, and 8U will be energized. As a result, zero potential will be applied to gate 188 in network 184 as a consequence of having closed one or more of the contacts 1U-3, 2U-3, 4U-3, and 8U-3. The signal condition on line 194 will therefore be a binary 0 for any one of the decimal numbers 1–9.

Assume now that the data word 00010 (representing the decimal number 2) is supplied by the converter. Relay 2U will therefore be energized, and relays 1U, 4U, and 8U will be de-energized. Contacts 2U-1 and 2U-3 will therefore be closed, and contacts 2U-2 will open. As a result, gate 188 in network 181 will conduct a 5-volt signal when a binary 1 is applied to line 179c. Gates 188 in networks 180 and 182–184 will not conduct, for zero potential is applied to one of their input terminals. Thus the data word on lines 190–194 will be 00010.

The digital output of the analog-to-digital converter may be erased as soon as the load on scale 32 is removed. Alternatively, the output may be memorized to be retained after the load is removed from the scale. In such a case it is necessary to clear the converter in order to store new weight information.

With the foregoing circuitry, it will be appreciated that when an enabling signal, namely a binary 1, is applied on line 179a, the data word in register 71 will be read out of storage and loaded into the proper stages of counter 158. Similarly, when an enabling signal, namely a binary 1, is supplied on line 179b, the data word in register 81 will be read out of storage and loaded into the proper stages in counter 158. Also, when an enabling signal namely a binary 1, is supplied on line 179c, the weight information in the relay decade 405i of storage unit SU-1 will be read out and loaded into the proper stages in counter 158. The read-out of the information stored in storage units SU-1 and SU-2, as well as the loading of counter 158, is in parallel.

As will be described in detail later on, when a data word is loaded into counter 158, the output of the counter causes an enabling signal to be applied to gates 170 and 172 for gating the clock pulses into translator 156. Depending upon the value of the direction control data bit corresponding to the data work in counter 158, translator 156 will energize driver 154 to step motor MW10 in one direction or the other. Clock 142 is continuously running and in addition to applying pulses to AND gates 170 and 172 also applies pulses to the divider circuit 168 which produces one output pulse for every four input pulses.

The counter output resulting from loading a data word into counter 158 also enables the output pulses from circuit 168 to be applied back to the counter countdown loading terminal in the form of subtraction pulses. Since motor MW10 requires four clock pulses to move one character position in this embodiment, it is necessary to divide the clock pulses by four so that counter 158 will count-down one count for each step of motor MW10 from one character position to the next.

Before a data word is loaded into counter 158, the counter will be at zero (i.e., all binary 0's in stages 196–200). Upon counting down from the data word loaded into it, counter 158 will therefore reach zero when print wheel W10 has been stepped to a position for printing the character corresponding to the data word from which the countdown was made. Upon reaching zero, the output of counter 158 inhibits the passage of clock pulses through AND gates 170 and 172. Motor MW10 will therefore stop to stop print wheel W10 at its proper printing position.

Figure 9:
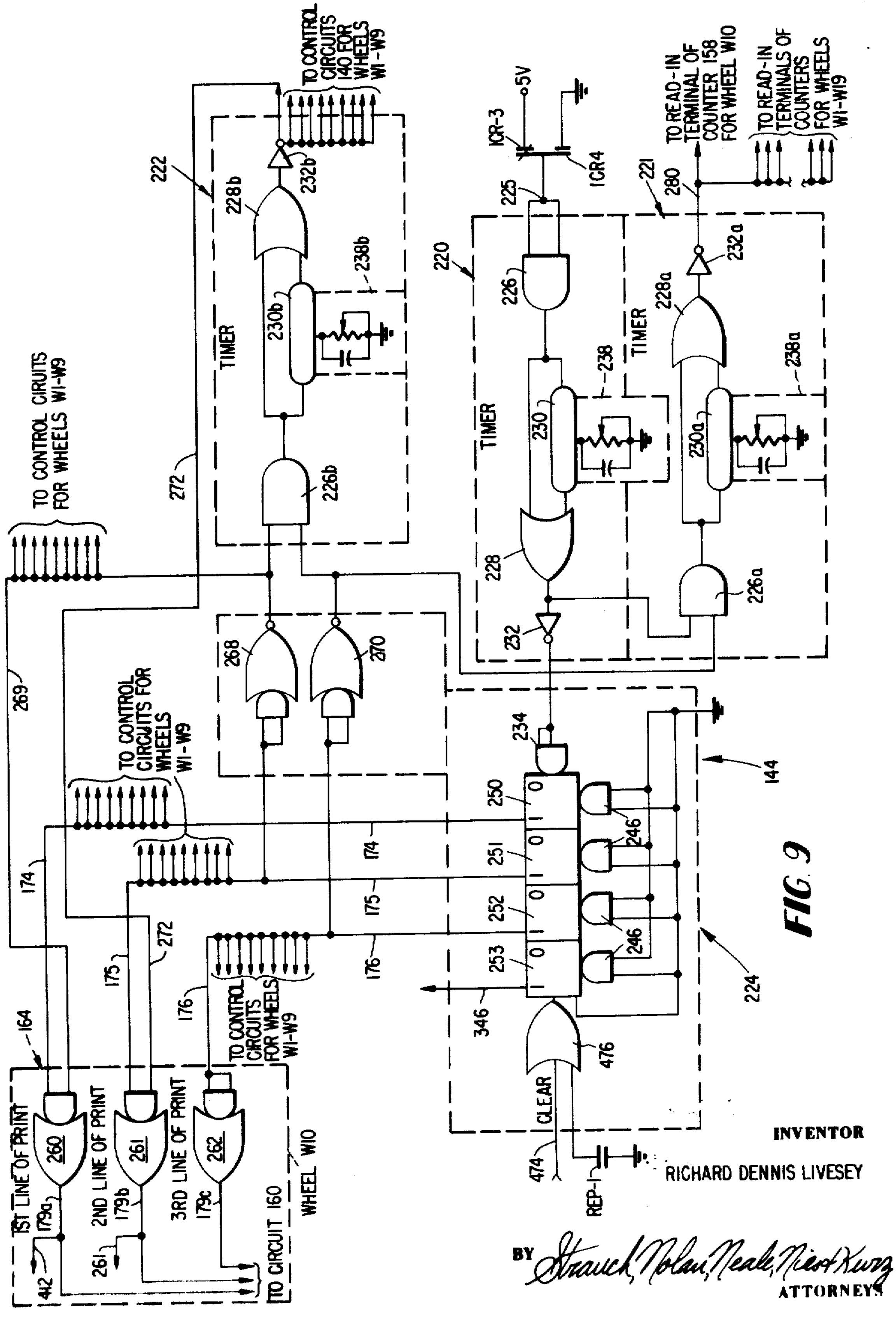
FIG. 9 is a circuit diagram of the line shift register circuit shown in FIGS. 2 and 7.

Referring to FIG. 9, line shift register circuit 144 comprises three timer networks 220, 221, and 222, and a four-stage shift register 224. Each of the timer networks 220–222 may be of any suitable delay type for supplying a delayed pulse in response to a step input. Networks 220–222 may be the type K303 shown on page 101 of the previously identified Digital Logic Handbook. Shift register 224 also may be of conventional form having four flip-flop stages such as that shown on page 99 of the previously mentioned Digital Logic Handbook.

Still referring to FIG. 9, network 220 has an input loading terminal 225 connected to both input terminals of an input AND gate 226. The output of gate 226 is divided into two current paths, with one current path being directly connected to one input terminal of an OR gate 228 and the other current path being connected through the timer circuit 230 to the other input terminal of gate 228. The output of gate 228 is connected through an inverter 232 to an input register loading AND gate 234 of register 224. A suitable capacitor and potentiometer timer control 238 may be provided for timer circuit 230. This timer control may be the type K376 described on pages 104 and 105 of the previously identified Digital Logic Handbook. When a step input is applied to loading terminal 225, an inverted output (i.e., the compliment of the input) is provided for at the output terminal of inverter 232 in a known manner.

Timer networks 221 and 222 may be of the same form as timer network 220. Accordingly, like reference numerals suffixed by the letter *a* have been applied to designate the components of timer network 221, and like reference numerals suffixed by the letter *b* have been applied to designate the components of timer 222.

With continued reference to FIG. 9, register 224 has the usual series of input loading AND REP 246 for loading the four flip-flop register stages in parallel. These flip-flop stages of register 224 are indicated at 250, 251, 252, and 253. AND gates 246 are connected to ground so that as pulses are serially applied to gate 234, stages 250–253 will successively be switched from a 0 state to a 1 state in a known manner. Thus, assuming that register is initially cleared so that a binary 0 is provided at each of the 1 output terminals of stages 250–253, the first pulse applied to gate 234 will change the state on the 1 output terminal of stage 250 from a binary 0 to a binary 1. The next pulse applied to gate 234 advances the count to the next stage to thus change the state at the output terminal of stage 251 from a binary 0 to a binary 1. Now the 1 output terminals of stages 250 and 251 each will be provided with a binary 1, while the states at the 1 output terminals of stages 252 and 253 remain unchanged (i.e., at binary 0). The third pulse applied to gate 234 changes the state at the 1 output terminal of stage 252 from a binary 0 to a binary 1 so that the output of each of the stages 250, 251, and 252 will now be a binary 1. The fourth pulse applied to gate 234 changes the state at the 1 output terminal of stage 253 from a binary 0 to a binary 1. Now the outputs of all four stages will be a binary 1.

As will be described in greater detail shortly, stage 250 provides the signal for loading the counters 158 in all of the control circuits 140 and **140*a*–140*i* for printing out a first line of print, stage 251 provides the signal for loading the counters 158 in all of the control circuits 140 and 140*a*–140*i* for printing out the second line of print, and stage 252 provides the signal for loading counters 158 in all of the circuits 140 for printing out the third line of print. Stage 253 provides a signal condition for signalling that the printing of the label has been completed. In brief, the 1 output terminals of stages 250, 251, and 252 provide the enabling and inhibiting information for each of the counter loading gate circuits 160 in the circuitry for wheels W1–W10**.

Still referring to FIG. 9, the AND gate enabling circuit 164 comprises three AND gate expanders 260, 261, and 262. Each of the expanders 260–262 may be of the K123 type shown on page 83 of the previously identified Digital Logic Handbook. When an AND condition of binary 1s is applied to the AND gate input or loading terminals of each of the expanders 260–262, a binary 1 is provided at the output of each of the expanders. Any other signal condition applied to the AND gate input or loading terminals of each expander provides a binary 0 at the output of the expander. This logic is shown on page 87 of the previously mentioned Digital Logic Handbook.

As shown in FIG. 9, the 1 output terminal of stage 250 is connected by line 174 to one of the input or loading AND gate terminals of expander 260. The 1 output terminal of stage 251 is connected to an inverter 268, and the output of inverter 268 is connected by a line 269 to the other input or loading AND gate terminals of expander 260. The 1 output terminal of stage 251 is also directly connected by line 175 to one of the input or loading AND gate terminals of expander 261. The output terminal of inverter **232*b* is connected by a line 272 to the other loading or input AND gate terminal of expander 261. The 1 output terminal of stage 252 is connected by line 176 to both of the loading or input AND gate terminals of expander 262. The output terminal of inverter 268 is connected to one input terminal of gate 226*b*, and the 1 output terminal of stage 252 is connected through another inverter 270 to the other input terminal of gate 226*b*. The output terminals of expander 260–262 are respectively connected to lines 179*a*, 179*b*, and 179*c***.

When register 224 has been cleared a binary 0 is provided at each of the 1 output terminals of stages 250–253. Expanders 260, 261, and 262 will therefore be disabled since a binary 0 will be provided on each of the lines 174, 175, and 176. As a result, a binary 0 will be applied to each of the lines **179*a*, 179*b*, and 179*c*, and all of the gates in the counter loading AND gate circuits 160 for each printing wheel will consequently be disabled to thus prevent the information stored in units SU-1 and SU-2 from being read out and loaded into the counters 158 of control circuits 140 and 140*a*–140*i***.

When a label is introduced into printer 30 and the information to be printed is stored in units SU-1 and SU-2, circuit 31 is selectively activated in a manner to be described in detail later on to change the level of the input signal applied to terminal 225 of circuit 144. As a result, a pulse is applied by network 220 to register 224 to switch the flip-flop in stage 250 and thereby change the state on line 174 from a binary 0 to a binary 1. Since states of stages 251 and 252 are unchanged, the signal conditions of each of the lines 175 and 176 will still be a binary 0. Exapnders 261 and 262 therefor will not be enabled when the first pulse is loaded into register 224.

The signal condition on line 175, however, is also applied to the input of inverter 268, and since the state of this signal condition is still a binary 0 the output provided by inverter 268 and applied to expander 260 will be a binary 1. Thus, expander 260 becomes enabled to provide a binary 1 on line 179*a* when the first pulse is applied to the cleared register to change the state of stage 250 from a binary 0 to a binary 1. Stage 250 remains in this state until register 224 is cleared.

By providing a binary 1 on line 179*a*, all of the gates 186 in each counter loading AND gate circuit 160 are enabled. Thus for wheel W10, the data word stored in register 62 will be read out.

As shown in FIG. 9, one input terminal of AND gate 226*a* is connected to the output terminal of OR gate 228, and the other input terminal of gate 226*a* is connected to the output terminal of inverter 270. The output terminal of inverter 232*a* is connected by a signal line 280 (See FIGS. 9 and 10) to the AND gate read-in terminals of counter 158 for wheel W10. The output terminal of inverter 232*a* is also connected to the corresponding read-in terminals of the other counters for wheels W1–W9. The signal lines providing these connections to the counters for wheels W1–W9 are also indicated at 280.

When a binary 1 is provided at the output terminal of inverter 232*a*, the data information will be read into the associated counter 158. It will be recalled that there is one circuit 160 and one counter 158 in each of the ten control circuits 140 and 140*a–i*.

The register shifting change in signal level that is produced at terminal 225 by circuit 31 is from a high or a 5-volt level to a low or a 0-volt level. In response to this change in signal level a delayed positive going pulse will be conducted through gate 228. Since gate 228 is connected to gate 226*a*, the positive going pulse will be applied to the input of gate 226*a* as well as providing the change in signal level for shifting register 224.

When the state of stage 250 is changed to a binary 1 by the first line-shift signal level change at terminal 225, the state at the output terminal of stage 252 still will be a binary 0, and hence, the output of inverter 270 will be a binary 1. Thus, for the duration of the pulse conducted through gate 228, an AND signal condition will be applied to AND gate 226*a*. Therefore, for the duration of each positive going register-shifting pulse at the output terminal of gate 228, a binary 0 will be provided on each of the lines 280. When this positive going register-shifting pulse is terminated, the signal state on lines 280 will change from a binary 0 to a binary 1.

When a binary 1 is applied to lines 280, the counter-loading AND gates of each counter 158 will be enabled to read in the data bits gated through the associated circuit 160 and applied to lines 190–194. The counter-loading AND gates are indicated at 282 in FIG. 10.

Thus for wheel W10, the data word stored in register 71 will be loaded into counter 158 after the register shifting pulse at the output of inverter 232 is terminated. This pulse will be terminated when a relay 1CR (FIG. 14) is de-energized as will be explained in detail later on. After the character represented by this data word is printed out in the first line of print, relay 1CR is re-energized in a manner to be described in detail later on to again change the signal level at input terminal 225 from 5 volts to zero potential. (It will be noted that when printing wheel W10 is rotated to advance its blank home space away from the platen printing position, relay 1CR is de-energized to reset the signal level at terminal 225 to 5 volts. This also will be explained later on.)

In response to the second high-to-low signal level change at terminal 225, timer network 220 produces its second register-shifting pulse for advancing the count in register 224 to the next stage, namely stage 251. Now, a binary 1 will be provided on line 175 in addition to the binary 14on line 174. The states of stages 252 and 253 at this time will remain unchanged with the result that a binary 0 will still be provided on line 176 and at the 1 output terminal of stage 253. The binary 0 on line 176 will keep expander 262 disabled to thereby prevent the information in unit SU-1 from being gated through circuit 160 and read into counter 158.

As a result of applying a binary 1 at the 1 output terminal of stage 251, a binary 0 will be provided at the output of inverter 268. Expander 260 will therefore be disabled, and the signal state on line 179*a* will change from a binary 1 to a binary 0 to disable gates 186 in networks 180–184. Thus for wheel W10 the data word stored in register 71 cannot be read into counter 158 for printout in the second line of print.

By changing the signal state at the output of inverter 268 from a binary 1 to a binary 0, AND gate 226*b* is disabled with the result that inverter 232*b* will apply a binary 1 to line 272. This signal together with the binary 1 on line 175 applies a binary 1 to line 179*b*. As a result, gates 187 in circuit 160 will be enabled to read out the data word stored in register 81 for wheel W10, and when the register-shifting pulse is terminated, the counter gates 282 will again be enabled in the previously described manner to load the read-out data word into counter 158.

After the printing of the character represented by the data word read out of register 81, circuit 31 again changes the signal voltage level at input terminal 225, and timer 230 will therefore supply a third delayed pulse which changes the state of stage 252 from a binary 0 to a binary 1. A binary 1 is consequently applied over line 176 and conducted through expander 262 and over line 179*c*. Gates 188 in circuit 160 will now be conditioned to conduct the data bits stored in the associated relay bank of unit SU-1. When the third pulse supplied by timer 230 terminates, data read out of unit SU-1 will be loaded into counter 158.

By providing a binary 1 on line 176, the signal state at the output of inverter 270 will change from a binary 1 to a binary 0. A binary 0 will therefore be supplied over line 272 to disable expander 261, thereby changing the state of the signal on line **179*b* from a binary 1 to a binary 0. Thus for wheel W10, the data word in register 81 cannot be loaded into counter 158 for printout in the third line of print. Expander 260 remains disabled by virtue of the binary 0 that is supplied at the output of inverter 268**.

Thus when the state of stage 252 is changed from a binary 0 to a binary 1, a binary 1 will be provided on line **179*c*, and a binary 0 will be on each of the lines 179*a* and 179*b*. Therefore only the information stored in SU-1 is read out and loaded into counter 158 in response to the third pulse supplied by timer 230**.

It will be appreciated that the read-out of information and the loading of the counters for the other control circuits 140 and **140*a–h*** is the same as that just described for wheel W10.

Figures 10, 11:
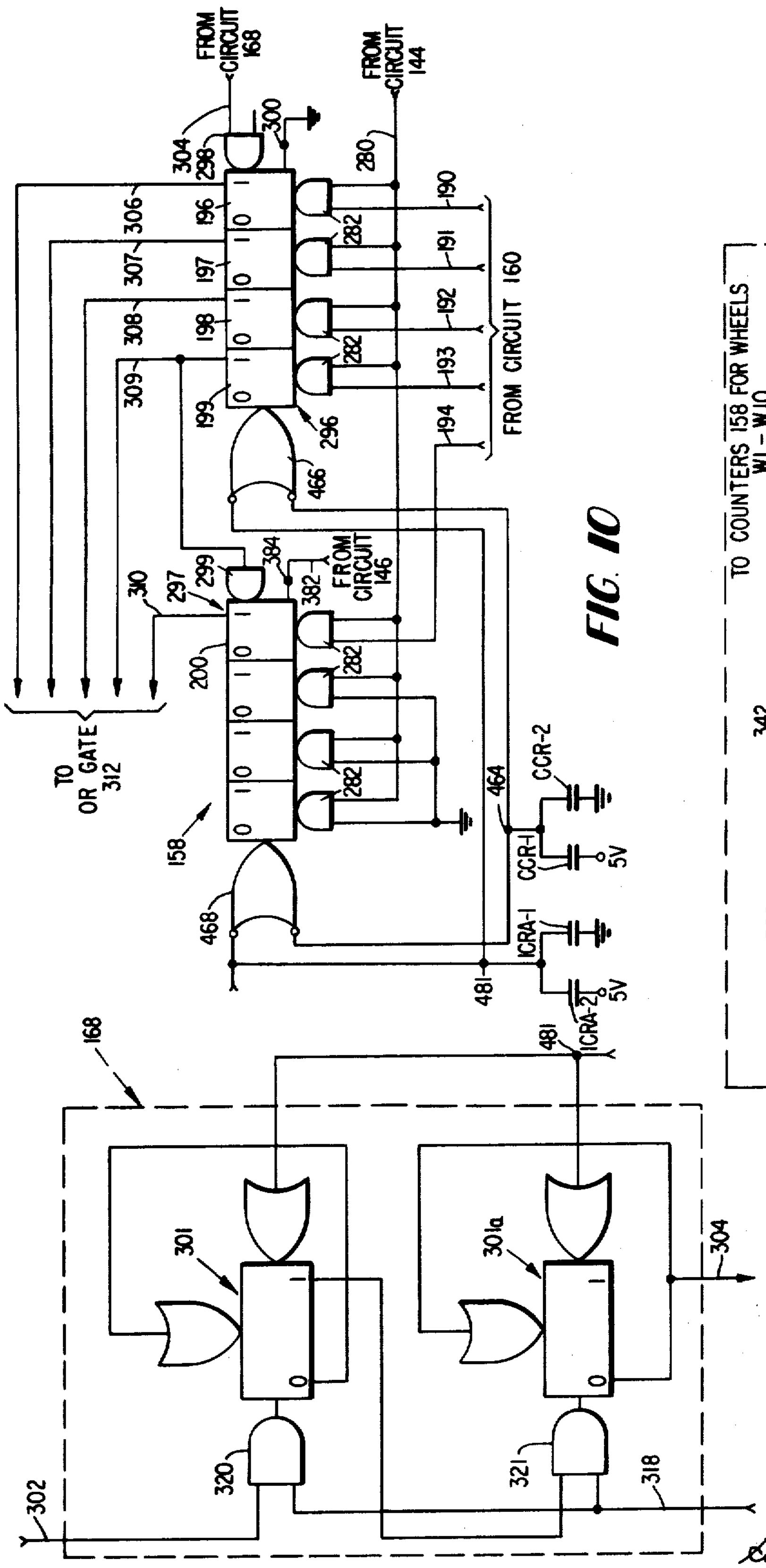
FIG. 10 is a circuit diagram of the counter shown in FIG. 7.
FIG. 11 is a circuit diagram of the divide-by-four circuit shown in FIG. 7.

Referring to FIG. 10, counter 158 may be of any suitable form to provide the five flip-flop stages 196–200. When counter 158 is cleared, a binary 0 is provided on each of the output terminals of stages 196–200. Each of the flip-flop stages 196–200 is set to provide a binary 1 on its 1 output terminal when a binary 1 is conducted through its associated input AND gate 282. Counter 158 may be made up by cascading two BCD up/down four stage counter units as shown in page 97 of the previously identified Digital Logic Handbook. The two counter units are indicated at 296 and 297 in FIG. 10.

As shown, stages 196–199 are in unit 296, and stage 200 is in unit 297. The last three stages in unit 297 are not utilized in this embodiment. Consequently, the counter-loading AND gate input terminals for these last three stages are connected to ground so that the states of these stages will always be a binary 0. Counting pulses are supplied to AND gates 298 and 299 in units 296 and 297 respectively. To cascade units 296 and 297, the 1 output terminal of stage 199 (the "8" output) is connected to gate 299 to establish both carry and borrow propagation.

For the up/down type of counter shown on page 97 of the previously mentioned Digital Logic Handbook, the direction of counting is established by the signal at terminal 300 (See FIG. 10) high for up counting and low for down counting. In this embodiment, terminal 300 is grounded so that counter 158 will only countdown when clock pulses are supplied to gate 298. The counter is loaded by reading in the data bits in parallel, and the countdown will therefore be from the data word that has been read into the counter.

The clock pulse divider circuit 168 (See FIGS. 7 and 11) may be of any suitable form such as a two-stage binary circuit having two flip-flops 301 and **301*a* connected as a divide-by-four binary counter. Each flip-flop may be of the K202 type shown on page 94 of the previously identified Digital Logic Handbook. Thus for every four clock pulses transmitted over signal line 302 to the input of circuit 168, one pulse will be produced at the output of circuit 168 and transmitted by a signal line 304 (See FIGS. 7 and 10) to input AND gate 298 of counter 158. When a binary number is contained in counter 158, the counter 158 will count-down one digit for every four clock pulses applied to translator 156** and hence for every step made by printing wheel W10.

As shown in FIG. 7, the 1 output terminals of stages 196–200 are respectively connected in parallel by signal lines 306, 307, 308, 309 and 310 to an OR gate 312. The output of OR gate 312 is connected by a signal line 316 to the input AND gates 170 and 172 of translator 156. The output of gate 312 is also connected by another signal line 318 to the input AND gates 320 and 321 (See FIG. 11) of stages 301 and **301*a* in the divide-by-four circuit 168. Signal line 302 connects clock 142 to AND gate 320, and the 1 output terminal of stage 301 is connected to gate 321. OR gate 312 provides the enabling and inhibiting information for conducting and inhibiting the clock pulses to translator 156**.

Since the coded representations of all of the characters listed in Tables A and B have at least one binary 1, then when any one of the data words representing the listed characters is loaded into counter 158, a binary 1 will be provided on at least one, but not all of the signal lines 306–310. Thus when any one of the character-representing data words is loaded into counter 158 gate 312 will provide a binary 1 on signal lines 316 and 318.

For example, assume that counter 158 has been loaded with the binary number 10001 (representing either the letter P or the letter T). As a result, stages 196 and 200 will be switched to the 1 state, and stages 197–199 will remain in a 0 state, assuming, of course, that counter 158 was cleared prior to the read-in of the binary number. Thus, each of the signal lines 306 and 310 will transmit a binary 1, and each of the signal lines 307–309 will be provided with a binary 0. A binary 1 will therefore be conducted by gate 312 and applied to signal lines 316 and 318.

By providing a binary 1 on line 316, gates 170 and 172 are enabled to conduct the clock pulse train into translator 156. Motor MW10 will therefore be stepped from its home position (i.e., where the blank home space is at the platen printing position), and the direction of motor rotation will depend upon the direction control signal supplied by circuit 166.

By providing a binary 1 on line 318, the divider circuit input AND gates 320 and 321 are enabled so that clock pulses will be conducted into stage 301 and output pulses from stage 301 will be conducted into stage **301*a*. As a result, circuit 168 will apply one output pulse to signal line 304 for every four clock pulses conducted through gate 320. Counter 158** will therefore begin to count down from the data word which has been loaded into it.

As long as counter 158 is counting down towards zero it will be appreciated that there will be a binary 1 on at least one of the 1 output terminals of stages 196–200 with the result that until counter reaches a zero count (i.e., all of the stages 196–200 switched to a zero state) a binary 1 will be provided on signal lines 316 and 318. Clock pulses will consequently continue to be conducted by gates 170 and 172, and motor MW10 will continue to step until the count contained in counter 158 reduces to zero.

When counter 158 has counted down to zero, it is clear that print wheel W10 will have been advanced to its position for printing the character represented by the data word originally loaded into the counter. For example, assume that the binary 10001 is loaded into counter 158, and assume that the associated direction control bit applied over register line 55 is a binary 0. Circuit 166 will command translator 156 to step motor MW10 in a clockwise or forward direction from its home position in response to the clock pulses conducted through gate 170. Motor MW10 will continue to step in a clockwise direction as long as counter 158 is counting down.

When the count in counter 158 reaches zero, the signal state on each of the signal lines 306–310 will be a binary 0. There will also be a binary 0 on a signal line 330 (See FIG. 7) which also is connected to the input side of OR gate 312. Line 330, as will be described in greater detail shortly, supplies the enabling information for returning wheel W10 to its home position after the desired character has been printed. Until printing occurs, the signal on line 330 will be a binary 0.

Thus, when the count in counter 158 reaches zero, a condition of all binary 0's will be applied to gate 312. Gate 312 will therefore be disabled to remove the enabling signal from signal lines 316 and 318. As a result, gates 170 and 172 will be disabled to inhibit the clock pulses, and for the example previously considered, printing wheel W10 will be stopped at a position to print out the letter P. By providing a binary 0 on signal line 318, gates 320 and 321 in the divider circuit 168 also will be disabled. As a result, counter count-down pulses will be inhibited, and counter 158 will thereby stop counting at zero.

It will be appreciated that printing wheels W1–W9 are advanced to their printing positions in the same manner as that just described for wheel W10. For each printing wheel the countdown of counter 158 in the associated control circuits 140 and 140a–140g indicates that the printing wheel has been advanced to a position for printing out the character corresponding to the data word from which the countdown was made. Thus, wheels W1–W10 are set and ready to print when their associated counters 158 are at or have counted back to zero.

Figure 12C:
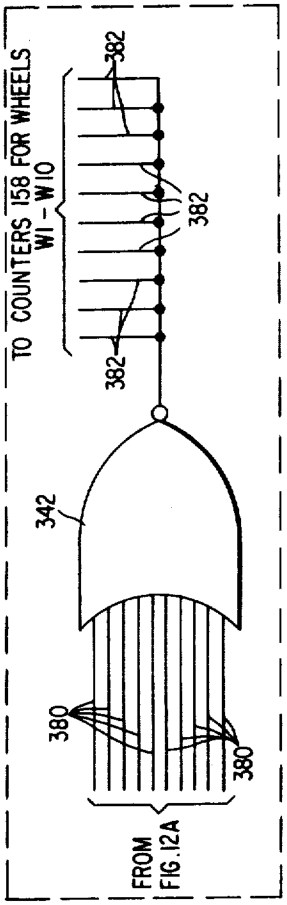
FIG. 12C is a circuit diagram of carry-inhibit gate shown in FIG. 2.
Figure 12A:
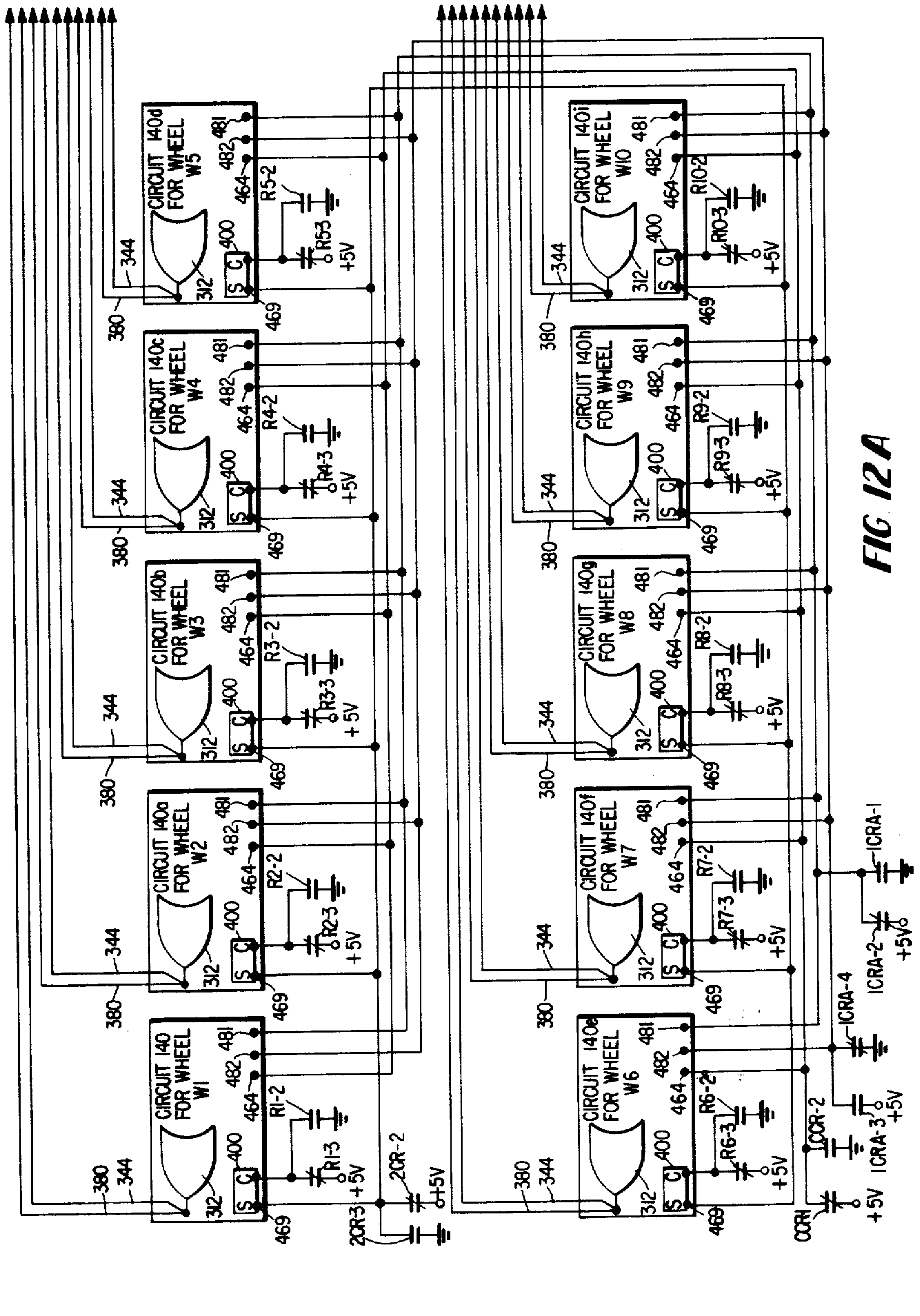
FIG. 12A illustrates some details of the connections to the 10 print wheel motor control circuits shown in FIG. 2.
Figure 12B:
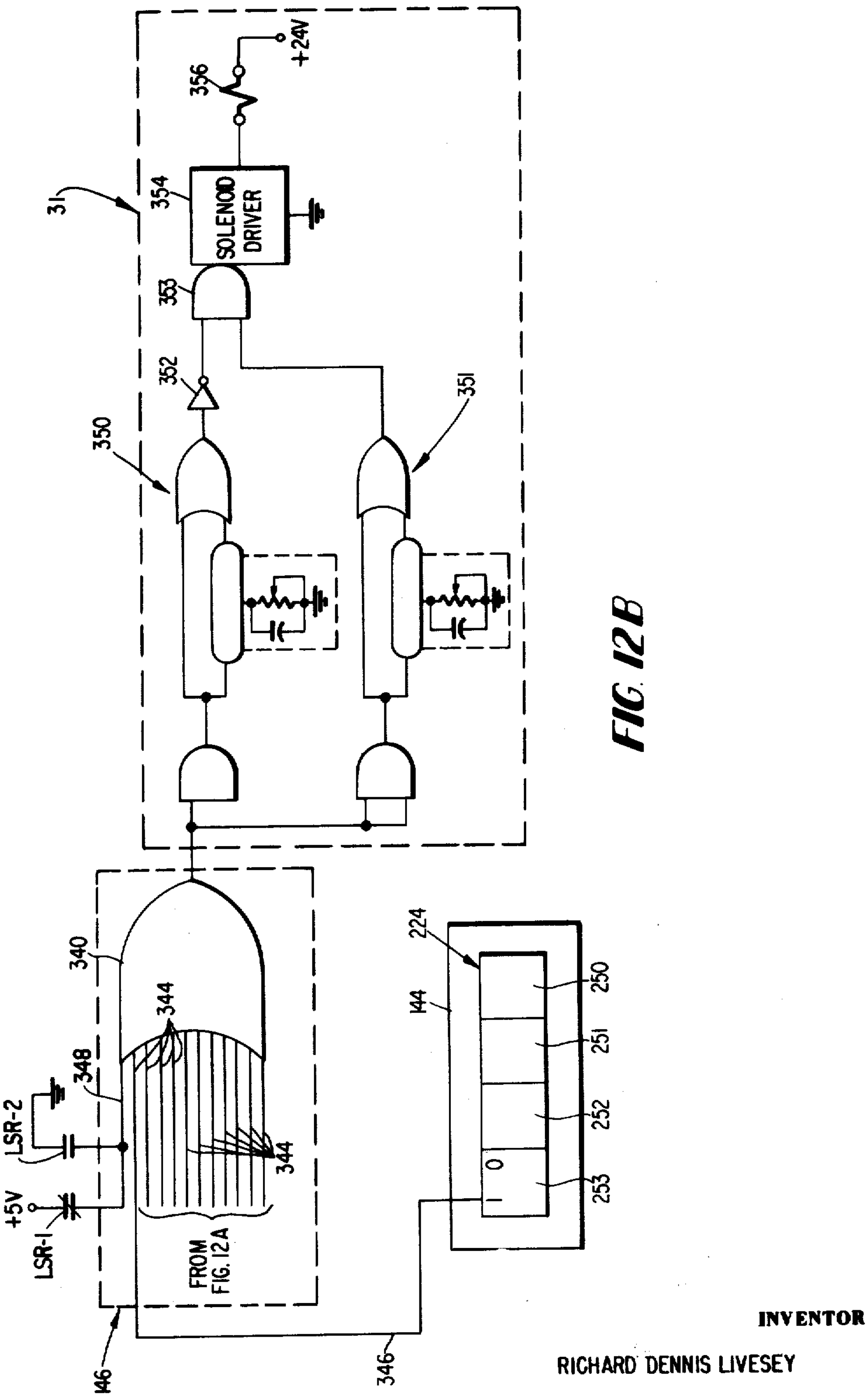
FIG. 12B illustrates the counters-to-zero print command gate circuit as well as a portion of the sequencing and control circuit shown in FIG. 2.

Gate circuit 146, as shown in FIG. 12B, provides the logic for supplying a print command when all of the counters 158 in the 10 print wheel control circuits 140 and 140a–i have counted back to zero. For this purpose, circuit 146 comprises a non-inverting OR gate 340. Signal lines 344 (See FIGS. 7, 12A, and 12B) connects the output terminal of all of the gate 312 in circuits 140 and 140a–i to the input side of gate 340.

In addition to the 10 inputs mentioned above, the 1 output terminal of register stage 253 (in line shift register 224) is connected by a signal line 346 to the input side of gate 340. Finally, a signal line 348 connects a 12th input terminal of gate 340 through a set of normally closed contacts LSR-1 to the positive terminal of a 5-volt d.c. power source and also through a set of normally open contacts LSR-2 to ground. Contacts LSR-1 and LSR-2 are operated by a relay LSR (See FIG. 14).

Still referring to FIG. 12B, a pair of delay timers 350 and 351 are connected in parallel to the output terminal of gate 340. Timers 350 and 351 may be of the K303 type shown on page 101 of the previously identified Digital Logic Handbook.

The output of timer 350 is connected through an inverter 352 to one input terminal of an AND gate 353, and the output of timer 351 is connected in a non-inverted state directly to the other input terminal of gate 353. When gate 353 conducts, it supplies a signal for activating a solenoid driver 354. The output of driver 354 is connected to one terminal of a solenoid 356 which operates platen 360 in a manner to be described in detail later on. The other terminal of solenoid 356 is connected to the positive terminal of a 24-volt d.c. power source. Thus, when driver 354 is activated, solenoid 356 will be energized, and when solenoid 356 is energized, platen 360 is raised to print out a line of print. Driver 354 is activated by conducting a 5-volt signal through gate 353. Timers 350 and 351, inverter 352, gate 353, driver 354 and solenoid 356 form a part of circuit 31.

Timer 350 is set for a shorter time delay than timer 351. For example, timer 350 may be set for a 0.1 second delay, and timer 351 may be set for a 0.15 second delay. When the signal level at the output terminal of gate 340 is 5 volts the output of inverter 352 will be 0 volts, and the non-inverted output of timer 351 will be 5 volts. Gate 353, therefore, will not conduct, and solenoid 356 will not be energized. When the signal level at the output terminal of gate 340 changes from a high to a low (i.e., from a binary 1 to a binary 0), the output of timer 350 will step up to 5 volts after the 1-second delay. At this time the output of timer 351 is still 5 volts. Gate 353 will therefore conduct a 5-volt signal, and solenoid 356 will be energized. 0.5 seconds after the output at inverter 352 increased to 5 volts, timer 351 will time out. As a result the output of timer 351 will change to zero potential. Gate 353 will therefore stop conducting, and the energizing pulse for solenoid 356 will consequently be terminated. In this manner, solenoid 356 will be pulsed each time the output of gate 340 changes from a high to a low. When solenoid 356 is energized, it raises platen 360 to print out the characters at the printing positions of the wheels.

As long as a binary 1 is provided on any one of the signal lines 344, 346, and 348, gate 340 will conduct a 5-volt signal, and the presence of a binary 1 at the output of gate 340 prevents energization of driver 354. As a result, solenoid 356 will not be energized until the signal level at the output of gate 340 changes from a high to a low by changing the signal state on each of the lines 344 to a binary 0 and also by changing the signal state on each of the lines 346 and 348 to a binary 0.

Since each signal line 344 is connected to the output terminal of its associated OR gate 312, the signal state on each line 344 will change to a binary 0 when the associated counter 158 is at or has counted back to zero. Thus when all 10 of the counters 158 for wheels W1–W10 are at or have counted down to zero, a binary 0 will be applied to each of the lines 344.

Figure 14:
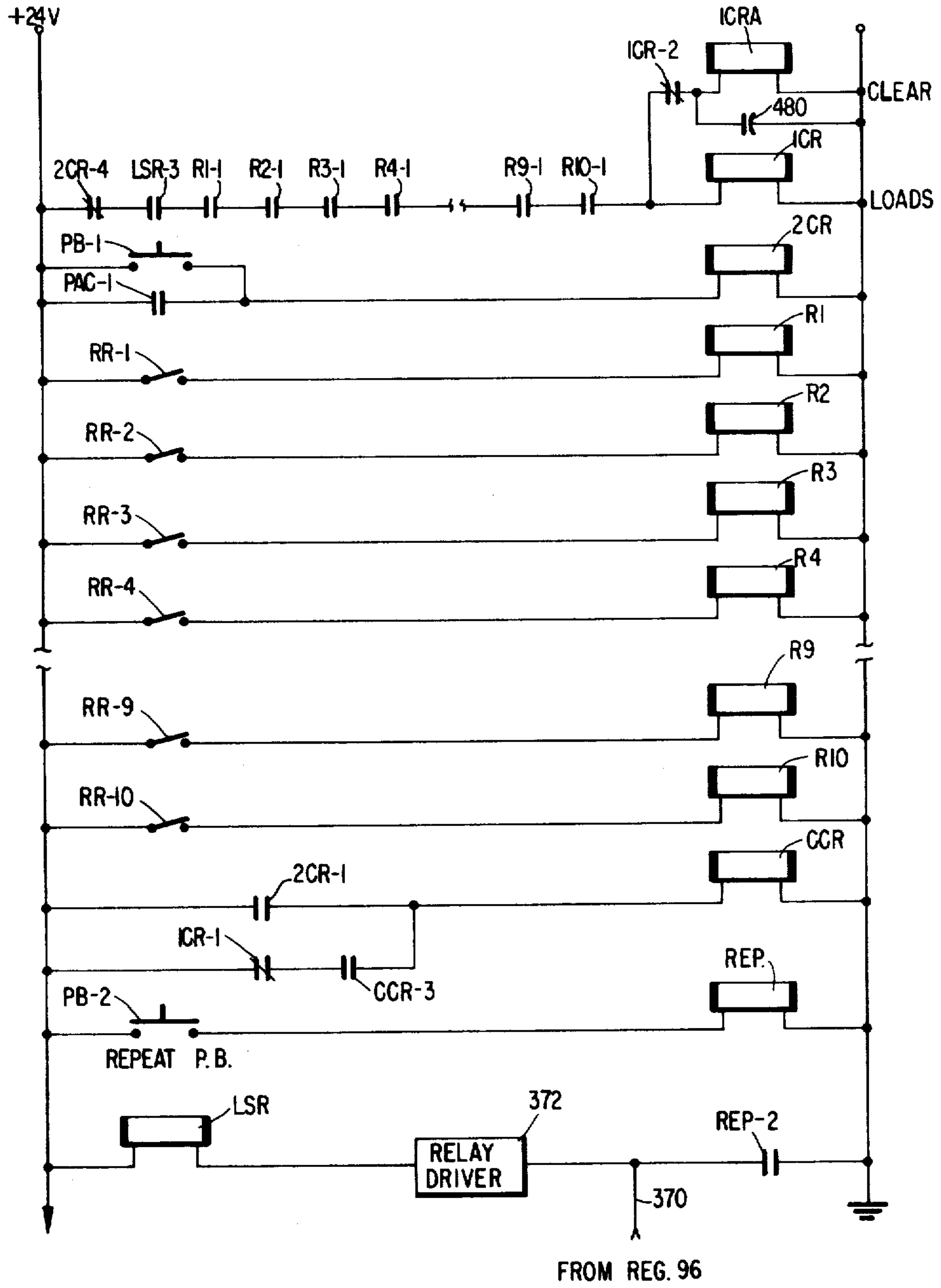
FIG. 14 is a circuit diagram of a further portion of the sequencing and control circuit shown in FIG. 2.

Referring to FIGS. 6 and 14, the 1 output terminal of stage 120 in register 96 is connected by a signal line 370 to a suitable relay drive 372. The operating winding of relay LSR has its terminals respectively connected to the output of driver 372 and to the positive terminal of the 24-volt d.c. power source. Thus, when the state of stage 120 is changed from a binary 0 to binary 1, signifying that register 96 has shifted to its last stage, relay LSR is energized to open contacts LSR-1 and to close contacts LSR-2. The signal state on line 348 will therefore change from a binary 1 to a binary 0, for line 348 will now be grounded.

It will be recalled that stage 253 in the line shift register 224 (See FIG. 9) will not be switched to the 1 state until after the third and final line of print has been printed out by wheels W1–W10. A binary 0 will therefore be provided on signal line 346 during printing of the three lines of print.

From the foregoing it will be appreciated that when all of the counters 158 are at or have counted down to zero solenoid 356 will be pulsed if the third and final line of print has not been printed and if relay LSR has been energized. In summary, therefore, it is apparent that when stage 250 is switched to the 1 state, the counters 158 in the 10 control circuits 140 and **140*a–i* will be loaded with the information stored in registers 62–71 of storage unit SU-2. The loaded counters will then start counting down toward zero, and print wheels W1–W10 will be rotated toward their positions for printing out those characters that correspond to the data words which were loaded into the counters. When counters 158 reach zero, solenoid 356 will be pulsed, for at this time relay LSR is energized and stage 253 is still in a cleared state and thus provides a binary 0 on signal line 346. By pulsing solenoid 256, the first line of print, namely the information stored in registers 62–71** will be printed.

Circuit 31 is then re-activated to reset wheels W1–W10 to their home positions and to switch stage 251 to the 1 state. The counters 158 for wheels W1–W10 will now be loaded with the information stored in registers 72–81, and the second countdown will begin for advancing wheels W1–W10 to their positions for printing out the information contained in registers 72–81 in a second line of print. When the loaded counters 158 again reach zero, solenoid 356 will be pulsed again, for stage 253 is still in the 0 state. Thus, the second line of print is printed by wheels W1–W10.

Now, circuit 31 is again activated for returning wheels W1–W10 to their home positions and for switching stage 252 to its 1 state. As a result, the information stored in unit SU-1 will be loaded into counters 158, and the loaded counters will begin to count-down for the third time. Wheels W1-W10 will thereby be positioned for printing out the information stored in unit SU-1 in a third line of print. When the loaded counters 158 count-down to zero for a third time, solenoid 356 will again be pulsed, for stage 253 still has not been switched to its 1 state. Thus, the information stored in unit SU-1 will be printed out in a third line.

After the third line of printing has been completed, circuit 31 is again activated to change the signal level at input terminal 225, and this time, stage 253 will be switched to its set state, thereby providing a binary 1 on signal line 346. As a result, gate 340 will conduct a binary 14 to prevent further energization of solenoid 356 until after register 224 has been cleared.

Referring to FIGS. 12A and 12C, the output terminals of the OR gates 312 in all 10 of the control circuits 140 and **140*a–i* are connected in parallel to the input side of an inverting OR gate 342 by signal lines indicated at 380. The inverting output terminal of gate 342 is connected by signal lines 382 to the direction control terminal 384 (See FIG. 10) in each counter unit 297. Thus, when any one of the counters 158 is not at zero, a binary 0 will be transmitted over each signal line 382 and applied to the terminals 384 for all 10 of the counters 158. Each stage 200 in the 10 counters is therefore able to count-down. When all of the counters 158 are at or have counted down to zero, a binary 0 will be applied to each signal line 380 with the result that the output of gate 342 will change from a binary 0 to a binary 1. Thus, each stage 200** will not accept any carry from the previous stage when the counter is loaded with the next data word.

As best shown in FIG. 7, a flip-flop 400 is provided in each control circuit 140 and **140*a–i* for resetting wheels W1–W10 after solenoid 356 has been pulsed to print out a line of information. Flip-flop 400 may be of any suitable form, such as the type K202 shown on page 94 of the previously identified Digital Logic Handbook. The 1 output terminal of flip-flop 400 is connected to both input terminals of an AND gate 402, and the output of gate 402 is connected to one of the input terminals of OR gate 312**.

In a manner to be described in detail later on, circuit 31 clears each flip-flop 400 to provide a binary 0 at the 1 output terminal when all of the print wheels W1–W10 have been reset to their home positions in preparation for being repositioned to print out a new line of information. Each flip-flop 400 will not be set to provide a binary 1 on line 330 until after the platen 360 is moved down following the printing of a line of information. Until printing occurs, therefore, a binary 0 will be provided on line 330.

If any one of the print wheels W1–W10 is rotated to move its blank home space away from the platen printing position, the associated flip-flop 400 will be set by circuit 31. After the line of characters is printed, this state of flip-flop 400 provides the condition that conducts clock pulses for resetting the print wheel to its home position after the printing operation. For example, assume that print wheel W10 was advanced to print the letter P. After the letter has been printed by pulsing solenoid 356, circuit 31, as will be described in detail later on, sets the flip-flop 400 in circuit **140*i* to provide a binary 1 on the one output terminal of the flip-flop. The signal state at the output terminal of gate 312 will therefore become a binary 1 even though counter 158** is at zero.

Figure 16:
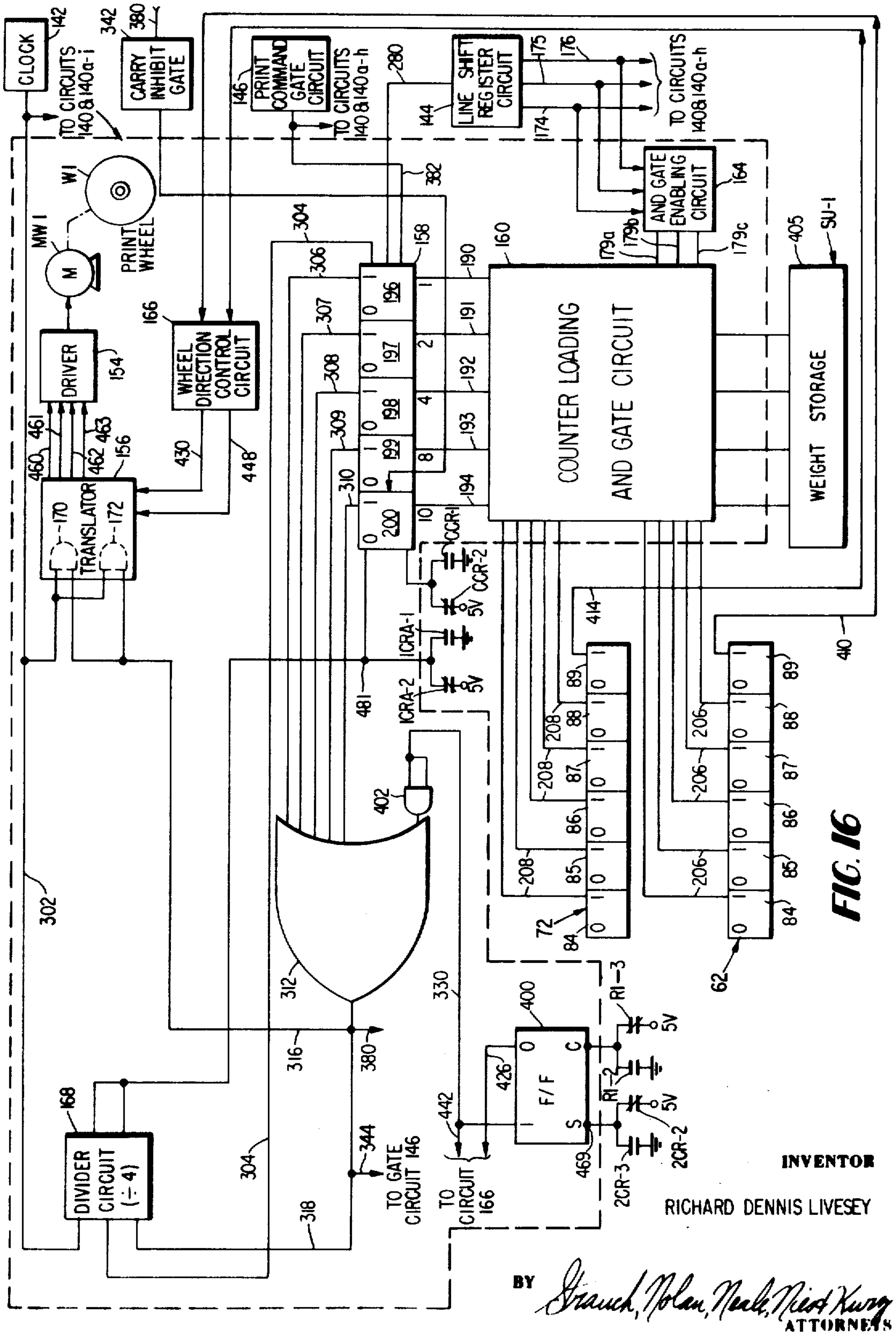
FIG. 16 is a circuit diagram of another print wheel motor control circuit shown in FIG. 2.

As previously explained, all of the print wheel control circuits 140 and **140*a–i* are the same, and all of the connections to clock 142 and circuits 31, 144, and 146 are the same. Also operation of circuits 140 and 140*a–i* are identical, the only difference being the connections to storage units SU-1 and SU-2. For example, FIG. 16 shows the details of circuit 140 for wheel W1. Since circuit 140 is the same as circuit 140*i* shown in FIG. 7, like reference characters have been used to designate like circuits components in circuit 140. As shown the counter loading AND gate circuit 160 for wheel W1 is connected to read out the data words and direction control bits in registers 62 and 72. Circuit 160 is also connected to a different relay decade 405 in storage unit SU-1 to read out the binary number representing the lowest order in the weight-indicating decimal number. The counter loading AND gate circuits for the other nine print wheel control circuits 140*a–i* are respectively connected to different relay decades indicated at 405*a*, 405*b*, 405*c*, 405*d* , 405*e*, 405*f*, 405*g*, 405*h*, and 405*i* (See FIG. 2**) in unit SU-1.

Figure 15:
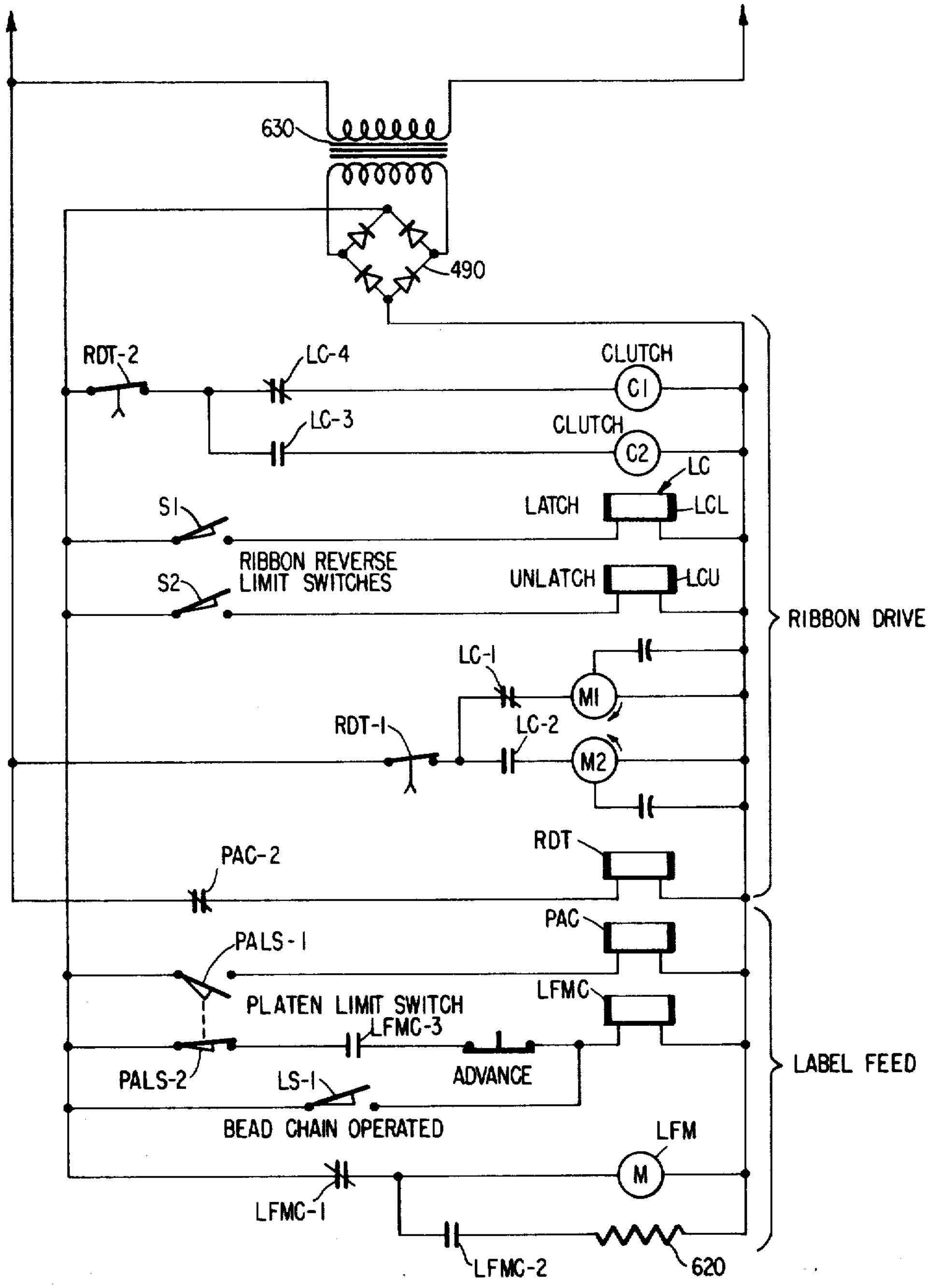
FIG. 15 is a circuit diagram of still another portion of the sequencing and control circuit shown in FIG. 2.

Referring to FIGS. 14 and 15 the recording system is conditioned for operation by momentarily depressing a spring loaded pushbutton switch PB1 (FIG. 14). As will now appear, depression of switch PB1 ensures that wheels W1–W10 will be at their home positions before information is inserted into data source DS-2. Depression of switch PB1 momentarily energizes a relay 2CR (FIG. 14) which is connected in series with switch PB1 between ground and the positive terminal of the 24-volt d.c. power source.

Energization of relay 2CR closes a set of normally open contacts 2CR-1 (FIG. 14) to energize a counter clearing relay CCR. As shown in FIGS. 10 and 12A, relay CCR has a set of normally closed contacts CCR-1 connected between the positive terminal of the 5-volt d.c. power source and a terminal point 464 in each of the 10 control circuits 140 and 140*a–i*. Relay CCR also has a set of normally open contacts CCR-2 (See FIGS. 7 and 10) connected between ground and terminal point 464. In each control circuit, terminal point 464 is connected to the clearing OR gate 466 in counter unit 296 and also to the clearing OR gate 468 in counter unit 297. Thus when relay CCR is energized to open contacts CCR-1 and to close contacts CCR-2 the 10 counter units 296 and the 10 counter units 297 in the print wheel control circuits 140 and 140*a–i* are cleared. A binary 0 will therefore be provided on each of the lines 306–310 in each of the print wheel control circuits. Thus upon energization of relay CCR all 10 of the counters 158 are cleared so that the state of each of the counter stages 196–200 will be a binary 0.

Relay CCR, upon being energized, also closes another normally open set of contacts CCR-3 (FIG. 14). By closing contacts CCR-3, a holding circuit is provided for maintaining relay CCR energized through a set of normally closed contacts 1CR-1 after relay 2CR is de-energized. Contacts 1CR-1 are operated by relay 1CR (See FIG. 14).

Energization of relay 2CR closes a set of normally open contacts 2CR-3 (See FIG. 12A) and opens a set of normally closed contacts 2CR-2 (FIG. 12A). Contacts 2CR-3 are connected between ground and the set terminal 469 of each flip-flop 400 in circuits 140 and 140*a–i*. Contacts 2CR-2 are connected between the positive terminal of the 5 volt-d.c. power source and each set terminal 469. If any one of the wheels W1–W10 does not have its blank home space at the platen printing position, pulsing of relay 2CR sets the associated flip-flop 400 to provide a signal for enabling clock pulses to rotate the print wheel for returing the blank home space to the platen printing position. Assume, for example, that the blank home space of wheel W10 is not at the platen printing position when relay 2CR is pulsed. Flip-flop 400, in response to the change in signal level at its set terminal 469 will switch to the 1 state to provide a binary 1 on line 330. This 5-volt signal is conducted by gate 402 and by gate 312 to apply a binary 1 on line 316. As previously explained the binary 1 on line 316 enables gates 170 and 172 for conducting clock pulses into translator 156. Motor MW10 will therefore be driven in a direction determined by the signals on lines 448 and 430 until the blank home space on print wheel W10 reaches the platen printing position. Counter 158, however, will not be counting, for the clear terminal of each of the counter units 196 and 197 will be grounded through contacts CCR-2. Thus, if the blank home space of the print wheel is not already at the platen printing position, the printing wheel will be driven to advance its blank home space to the platen printing position upon momentary energization of relay 2CR.

If any of the other print wheels W1 through W9 is not at its home position, it will be reset to its home position upon energization of relay 2CR in the same manner as just described for wheel W10.

When wheels W1–W10 are reset to their home positions (i.e., all blank home spaces at the platen printing position) they respectively close limit switches RR-1, RR-2, RR-3, RR-4, RR-5, RR-6, RR-7, RR-8, RR-9, and RR-10 (See FIG. 14). Switches RR-1 through RR-10, upon closing, respectively energize relays R1, R2, R3, R4, R5, R6, R7, R8, R9, and R10. The manner in which switches RR-1 through RR-10 are closed will be described later on.

To stop print wheels W1–W10 at their home positions, relays R1–R10, as shown in FIG. 12A, are respectively provided with normally open contacts R1-2, R2-2, R3-2, R4-2, R5-2, R6-2, R7-2, R8-2, R9-2, R10-2 and also with normally closed contacts R1-3, R2-3, R3-3, R4-3, R5-3, R6-3, R7-3, R8-3, R9-3, and R10-3. Contacts R1-2 and R1-3 are connected to the clear terminal of flip-flop 400 in the control circuit 140 for wheel W1, contacts R2-2 and R2-3 are connected to the clear terminal of flip-flop 400 in the control circuit 140*a* for wheel W2, contacts R3-2 and R3-3 are connected to the clear terminal of flip-flop 400 in the control circuit 140*b* for wheel W3, contacts R4-2 and R4-3 are connected to the clear terminal of flip-flop 400 in the control circuit 140*c* for wheel W4, contacts R5-2 and R5-3 are connected to the clear terminal of flip-flop 400 in the control circuit 140*d*, for wheel W5, contacts R6-2 and R6-3 are connected to the clear terminal of flip-flop 400 in the control circuit 140e for wheel W6, contacts R7-2 and R7-3 are connected to the clear terminal of flip-flop 400 in the control circuit 140*b* for wheel W7, contacts R8-2 and R8-3 are connected to the clear terminal of flip-flop 400 in the control circuit 140*g* for wheel W8, contacts R9-2 and R9-3 are connected to the clear terminal of flip-flop 400 in the control circuit 140*h* for wheel W9, and contacts R10-2 and R10-3 are connected to the clear terminal of flip-flop 400 in the control circuit 140*i* for wheel W10.

The normally closed contacts R1-3, R2-3, R3-3, R4-3, R5-3, R6-3, R7-3, R8-3, R9-3 and R10-3 are connected to the positive terminal of the 5-volt d.c. power source, and the normally open contacts R1-2, R2-2, R3-2, R4-2, R5-2, R6-2, R7-2, R8-2, R9-2, and R10-2 are connected to ground. With this circuitry it will be appreciated that when wheels W1–W10 have been reset to their home positions to energize their respective relays R1–R10, the flip-flops 400 in the control circuits for wheels W1–W10 will be cleared to change the signal state on each line 330 from a binary 1 to a binary 0. As a result, the state on each line 316 will change from a binary 1 to a binary 0 to inhibit the clock pulses.

For example, assume that all of the wheels W1–W10 are being driven toward their home positions and that wheel W10 is the first to reach its home position. Upon returning to its home position, wheel W10 closes switch RR-10 to energize relay R10 with the result that contacts R10-2 will open and contacts R10-3 will close. Flip-flop 400 in the circuit 140*i* will thus be switched to a cleared state to provide a binary 0 on line 330. Since counter 158 has already been cleared to provide a binary 0 on each of the signal lines 306–310, the state on line 316 will change from a binary 1 to a binary 0, thus disabling gates 170 and 172 to inhibit the clock pulses, thereby stopping drive motor MW10. Rotation of wheel W10 will therefore stop with its blank home space at the platen printing position. It will be noted that energization of relay R10 does not affect the conduction of clock pulses which continue to drive motor MW1–MW9. But as each of the remaining print wheels W1–W9 reaches its home position, it will energize its associated one of the relays R1–R9, and energization of relays R1–R9 will inhibit clock pulses respectively to print wheel motor MW1–MW9 in the same manner as just described for relay R10.

As long as each of the relays R1–R10 is energized the associated flip-flop 400 cannot be set to the 1 state by energization of relay 2CR. Assume, for example, that wheel W10 is at its home position when relay 2CR is pulsed. At this time, therefore, relay R10 will be energized through switch RR-10, and contacts R10-2 and R10-3 will respectively be closed and opened to apply a zero potential to the clear terminal of flip-flop 400 in circuit 140*i*. As a result, application of zero potential to the set terminal of flip-flop 400 will not switch flip-flop 400 to the 1 state. A binary 0 will therefore remain on line 330 and, consequently, on line 316. The clock pulses are therefore inhibited, and motor MW10 will not be rotated.

As shown in FIG. 14, relays R1–R10 are respectively provided with normally open contacts R1-1, R2-1, R3-1, R4-1, R5-1, R6-1, R7-1, R8-1, R9-1 and R10-1. When relays R1-R10 are energized (indicating that all of the print wheels W1–W10 are at their home positions), contacts R1-1, R2-1, R3-1, R4-1, R5-1, R6-1, R7-1, R8-1, R9-1 and R10-1 will close to partially complete a circuit for energizing relay 1CR and a further relay 1CRA. Relays 1CR and 1CRA, however, cannot be energized until relay 2CR is de-energized to close a set of normally closed contacts 2CR-4 (FIG. 14) and until relay LSR is energized to close normally open contacts LSR-3 (FIG. 14).

Preparatory to inserting information into the manual entry device 40, a switch, such as that indicated at 470 in FIG. 2 is closed to apply a register-clearing zero potential over signal lines 472 and 474. Line 472, as shown in FIGS. 2 and 6, is connected to the clear terminals of all the registers 62–81 and 101–120 in storage unit SU-2. Line 474, as shown in FIG. 9, is connected through OR gate 476 to the clearing or reset terminal of register 224. Thus, each of the stages in registers 96, 224 and 62–81 will be cleared to a zero state to provide a binary 0 at each of the 1 output terminals of the register stages when switch 470 is momentarily closed.

When information is now inserted into device 40, converted into the previously described BCD code, and stored in storage unit SU-2 in the previously described manner, the count in shift register 96 will be shifted to the last stage 120 to thus energize relay LSR as already explained. As will now appear energization of relay LSR sets the system in operation.

By energizing relay LSR, normally open contacts LSR-3 (FIG. 14) close, and a circuit will therefore be completed for simultaneously energizing relays 1CR and 1CRA, provided, or course, that relay 2CR has been de-energized by releasing pushbutton PB1 and that wheels W1–W10 are at their home positions.

As shown in FIG. 14, relay 1CRA is energized through a set of normally closed contacts 1CR-2 of relay 1CR. Thus, energization of relay 1CR will interrupt the energizing circuit for relay 1CRA, but relay 1CRA will remain energized for the short time required to discharge a capacitor 480 which is in parallel with the operating winding of relay 1CRA and which will discharge through the winding of relay 1CRA when contacts 1CR-2 open. Thus, relay 1CRA will be pulsed and relay 1CR will remain energized.

As shown in FIG. 12A, relay 1CRA has a set of normally open contacts 1CRA-1 connected between ground and a terminal 481 in each of the 10 control circuits 140 and 140*a–i* for wheels W1–W-10. Relay 1CRA also has a set of normally closed contacts 1CRA-2 connected between each of the terminals 481 and the positive terminal of the 5-volt d.c. power source. As shown in FIG. 10, each terminal 481 is connected to OR gates 466 and 468. Thus, when relay 1CRA is pulsed to momentarily close contacts 1CRA-1 and to momentarily open contacts 1CRA-2, all of the stages in each counter 158 will be cleared if they have not been previously cleared by the operation of relay contacts CCR-1 and CCR-2 in the previously described manner.

In each of the control circuits 140 and 140*a–i* terminal 481, as shown in FIG. 11, is connected to the clear terminals of the two flip-flop stages in the divide-by-four circuit 168. Thus, by pulsing relay 1CRA both stages of each circuit 168 will be cleared in preparation for supplying divided clock pulses to its associated counter 158.

By energizing relay 1CR, contacts 1CR-1 will open to de-energize relay CCR. De-energization of relay CCR closes contacts CCR-1 and opens contacts CCR-2 to thus apply a 5-volt signal through the OR gates 466 and 468 of each counter 158 in the 10 print wheel control circuits. Each of the counters 158 will now be conditioned to be loaded with the information read out of storage unit SU-2 for the first line of printing.

As shown in FIG. 9, relay 1CR has a set of normally open contacts 1CR-4 connected between terminal 225 and ground and also as set of normally closed contacts 1CR-3 connected between terminal 225 and the positive terminal of the 5-volt d.c. power source. Thus, when relay 1CR is energized to open contacts 1CR-3 and to close contacts 1CR-4 the resulting change in the signal level at terminal 225 causes timer network 220 to produce a signal for switching the state of register stage 250 from a binary 0 to a binary 1. As a consequence, a binary 1 will be provided on line 174 and, as previously described, the 10 counter loading gate circuits 160 for wheels W1–W10 will be enabled to read out the information in registers 62–71 for loading into the counters 158 in the 10 print wheel control circuits.

Upon read-out of the information from storage unit SU-2, each counter 158 will contain one of two storage conditions. The first is the presence of a binary 0 in each of the five operative stages 196–200. The second is the presence of a binary 1 in at least one of the stages 196–200 of the counter.

If the first of the foregoing conditions exists in one of the counters 158, a binary 0 will be provided at the output terminal of the associated OR gate 312. Clock pulses for driving the associated print wheel motor will therefore be inhibited, and the associated print wheel will remain at its home position.

If the second of the storage conditions exists in the counter 158, then a binary 1 will be provided at the output terminal of the associated OR gate 312, and clock pulses will consequently be conducted for driving the associated print wheel motor in a direction determined by the signal conditions on lines 448 and 430.

Assume that the data word 10001 has been loaded into the counter 158 for wheel W10. As a result, a not-zero condition will be applied to the input of OR gate 312. Clock pulses will therefore be conducted to drive motor MW10 in either a clockwise or counter-clockwise direction depending upon the value of the direction control bit supplied by stage 89 in register 71. If the direction control bit is a binary 0, wheel W10 will be driven in a clockwise direction so that it will be positioned to print out the letter P.

The moment that wheel W10 is advanced away from its home position, switch RR-10 will open to de-energize relay R10. De-energization of relay R10 opens contacts R10-1 to de-energize relay 1CR. De-energization of relay R10 also opens contacts R10-2 and closes contacts R10-3. As a result a 5-volt signal will be applied to the clear terminal of the flip-flop 400 in the control circuit for wheel W10. De-energization of relay 1CR opens contacts 1CR-4 and closes contacts 1CR-1, 1CR-2, and 1CR-3. By opening contacts 1CR-4 and by closing contacts 1CR-3, the 5-volt signal will again be applied to terminal 225 in preparation for the next shifting operation in register 224.

When those counters 158, which were not at zero, have counted back to zero, solenoid 356 will be pulsed in the previously described manner to operate platen 360 for printing out the information read into the counters. In the previous example, print wheel W10 will print the letter P. This completes the first line of printing.

Upon de-energization of solenoid 356, platen 360 will move down to momentarily close a platen limit switch PALS-1 (See FIG. 15). A second switch PALS-2 (FIG. 15) is ganged to switch PALS-1 so that it will open when switch PALS-1 closes and close when switch PALS-1 opens. As a result of opening switch PALS-2 momentarily, a label feed mechanism will momentarily be driven to advance the label in printer 30 to the next printing line in a manner to be described in detail later on.

By momentarily closing switch PALS-1, a relay PAC (FIG. 15) is pulsed with current derived from a suitable 24-volt d.c. power source indicated at 490 in FIG. 15. By pulsing relay PAC a set of normally open contacts PAC-1 are momentarily closed to pulse relay 2CR.

By momentarily energizing relay 2CR, contacts 2CR-1 will close momentarily to complete an energizing circuit for relay CCR. As a result of energizing relay CCR, contacts CCR-3 will close to complete a holding circuit for relay CCR through contacts 1CR-1. At this stage it will be recalled that relay 1CR has been deenergized as a result of having advanced one or more of the print wheels away from its home position.

By pulsing relay 2CR, contacts 2CR-3 will momentarily close, and contacts 2CR-2 will momentarily open. Each flip-flop 400 will therefore be switched to the 1 state if the signal applied to its clear terminal is 5 volts. The signal applied to the clear terminal of each flip-flop 400 will only be 5 volts if the associated print wheel has been advanced away from its home position. For example, assume that print wheel W10 has been advanced from its home position to print the letter P. Relay R10 will therefore be de-energized as a consequence of having opened switch RR-10. Therefore, contacts R10-2 will be open, and contacts R10-3 will be closed to thus apply the 5-volt signal to the clear terminal of the flip-flop 400 in the control circuit for wheel W10. If, on the other hand, wheel W10 was not advanced away from its home position, switch RR-10 remains closed and relay R10 therefore remains energized. As a result, contacts R10-2 will be closed, and contacts R10-3 will be open to apply a zero potential to the clear terminal of flip-flop 400 for wheel W10. Under this condition, the application of zero potential to the input AND gate for flip-flop 400 will not switch the flip-flop to its 1 state.

Thus, if wheel W10 has been advanced away from its home position, its associated flip-flop 400 will be switched to its 1 state to cause gate 312 to conduct a binary 1 for enabling AND gates 170 and 172. As a result, clock pulses will be conducted for returning print wheel W10 to its home position in the previously described manner. If, on the other hand, wheel W10 was not advanced from its home position, the zero potential at the clear terminal for the associated flip-flop 400 will prevent the flip-flop from switching to its 1 state. As a consequence, all of the inputs to gate 312 will be binary 0's. A binary 0 will therefore be provided on line 316 to inhibit the clock pulses. As a result, no clock pulses will be conducted for driving motor MW10, and print wheel W10 will remain in its home position.

Energization of relay CCR closes contacts CCR-2 and opens contacts CCR-1 to thereby apply zero potential to the clear terminals of all of the counters 158 in the 10 print wheel control circuits 140 and **140*a–i*. This prevents each counter 158** from counting when clock pulses are conducted for driving the print wheels back to their home positions.

When those print wheels which were advanced away from their home positions for printing out the first line of print have been reset to their home positions, relay 1CR will be reenergized and relay 1CRA will be pulsed in the manner previously described. It will be noted that relay 2CR does not remain energized with the result that by the time all of the wheels have returned to their home positions, relay 2CR will be de-energized, and contacts 2CR-4 will consequently be closed to provide the energizing circuits for relays 1CR and 1CRA. As a result of momentarily energizing relay 1CRA, all of the counters 158 will be cleared if they have not previously been cleared, and circuit 168 will also be cleared.

As a result of re-energizing relay 1CR, contacts 1CR-4 and 1CR-3 will again close and open respectively. Thus, the signal condition at input terminal 225 will again change to cause timer network 220 to supply a second pulse for shifting register 224. Now, stage 251 will be switched on to provide a binary 1 on line 175. As previously described, this signal condition enables the 10 counter loading circuits 160 for reading out the information stored in registers 72–81. This information will be read into the counters 158 of circuits 140 and 140*a–i*. The counters then start counting down, and the print wheels are again driven to their printing positions for printing out the second line of information. When all of the counters that were counting down have reached the zero reference level, a delayed signal will again be conducted by circuit 146 for pulsing print solenoid 356. Pulsing solenoid 356 raises platen 360 to its printing position to print out the second line of information.

Upon de-energization of solenoid 356, platen 360 moves down to again momentarily close limit switch PALS-1. Relay PAC will therefore be pulsed to momentarily close contact PAC-1. Relay 2CR will consequently be energized momentarily to re-energize relay CCR in the manner previously described. Also, the flip-flops 400 associated with those print wheels which have been driven away from their home positions will be set to the 1 state as a result of pulsing relay 2CR in the manner previously described. Thus, those wheels which are not at their home positions will be reset to their home position in preparation for printing out the third line of print.

When switch PALS-1 was closed momentarily for the second time, switch PALS-2 was also opened momentarily for the second time to thus actuate the label feed mechanism for advancing the label in printer 30 by one printing line.

With all of the print wheels W1–w10 again at their home positions, relay 1CR will be re-energized, and relay 1CRA will be pulsed as previously explained.

By re-energizing relay 1CR for the third time, timer network 220 will produce its third pulse for shifting register 224. As a result, stage 252 will be switched to the 1 state causing the 10 counter loading gate circuits 160 for wheels W1–W10 to read out the information stored in storage unit SU-1 and to load the read-out information into counters 158.

Upon loading the weight information into counters 158 each counter containing one or more binary 1's will begin to count-down, thereby enabling its associated print wheel to be advanced to position for printing out the weight information stored in unit SU-1. When all of the print wheels W1–W10 have been properly positioned for printing out the information stored in unit SU-1, all of the counters 158 will be at zero as previously described. As a result, circuit 146 will again pulse solenoid 356 for raising platen 360 to print out the stored weight information.

As the platen 360 comes down for the third time, it will again momentarily close limit switch PALS-1 and momentarily open switch PALS-2. By momentarily opening switch PALS-2 the label feeding mechanism is thereby activated for advancing the label in printer 30. By momentarily closing switch PALS-1 relay PAC is pulsed again to momentarily close contacts PAC-1. Relay 2CR is therefore pulsed to re-energize relay CCR. Also, each of the flip-flops 400 for the print wheels which have been driven away from their home positions will be set to the 1 state. These print wheels will therefore be reset to their home positions.

When all of the print wheels W1-W10 have been returned to their home positions, relay 1CR will be re-energized, and relay 1CRA will again be pulsed. Re-energization of relay 1CR again changes the signal level at input terminal 225 to cause timer network 220 to supply a fourth pulse to register 224. Now, stage 253 of register 224 will be switched to the 1 state to provide a binary 1 on signal line 346.

By providing a binary 1 on line 346, a binary 1 will be provided at the output of gate 340 even though all of the counters 158 are now at zero. Thus, a binary 0 will be provided at the output of inverter 352 to thus prevent re-energization of solenoid 356. Platen 360 will therefore not be actuated. The system will remain in this condition until registers 96 and 224 are cleared and new information is read into storage unit SU-2 or until a print repeat spring loaded pushbutton switch PB2 (FIG. 14) is depressed. If register 96 is cleared, relay LSR is de-energized. Contacts LSR-3 therefore open to de-energize relays 1CR and 1CRA. As a result, a 5-volt signal is again applied to terminal 225 in circuit 144.

By clearing register 224, the state of each of the stages 250–253, becomes a binary 0. By inserting new information into data source DS-2, stages 101–120 will be switched to the 1 state. By switching register stage 120 to the 1 state, relay LSR will be re-energized to again complete an energizing circuit to relays 1CR and 1CRA. By energizing relay 1CR, the signal level at terminal will change from a high to a low, and the printing system will recycle to print three lines of information in the manner previously described. Thus, the insertion of information resulting in the re-energization of relay LSR, furnishes the command to read out and print the information in storage units SU-1 and SU-2 in three lines.

In the previously described application of this invention paper rolls were successively weighed on scale 32, and the weight of each roll as well as associated information was printed on the labels fed through printer 30. The printed labels were then applied to their respective, weighed out rolls. In printing the labels for such paper rolls or other loads, a first roll is placed on scale 32 to thus insert the weight information into storage unit SU-1, and the associated information is inserted into unit SU-2 before or after the operator depresses switch PB1 to activate the recording system for printing out the stored information. Insertion of this information in unit SU-2 causes printer 30 to print out the information stored in units SU-1 and SU-2 in the previously described manner. The printed label is then removed from printer 30 and then applied to the weighed out paper roll. The operator then places the next roll on scale 32 and the weight of this roll is then stored in unit SU-1. He also inserts the associated information into manual entry device 40 for storage in unit SU-2 to print out the information on the next label which is then applied to the second weighed-out load.

If the operator wishes to reprint the stored information which has already been printed on the previous label, he momentarily depresses switch PB2 to momentarily energize a relay REP (See FIG. 14). Relay REP, as shown in FIG. 9, has a set of normally open contacts REP-1 connected between ground and one input terminal of OR gate 476. Energization of relay REB consequently clears register 224. Thus, stage 253, which had been switched to a binary 1 to inhibit energization of print solenoid 356, is now changed to a binary 0.

Relay REP has a second set of normally open contacts REP-2 (FIG. 14), which is connected between ground and the input of the relay driver for relay LSR. When relay REP is momentarily energized by depressing and releasing switch PB2, contacts REP-2 are momentarily closed to apply zero potential to the relay driver for relay LSR. Relay LSR will therefore be de-energized momentarily to momentarily interrupt the energizing circuit for relays 1CR and 1CRA. As a result, a new printing cycle will be initiated in the previously described manner to reprint the information in units SU-2 and SU-1, on a subsequent label.

Figure 13:
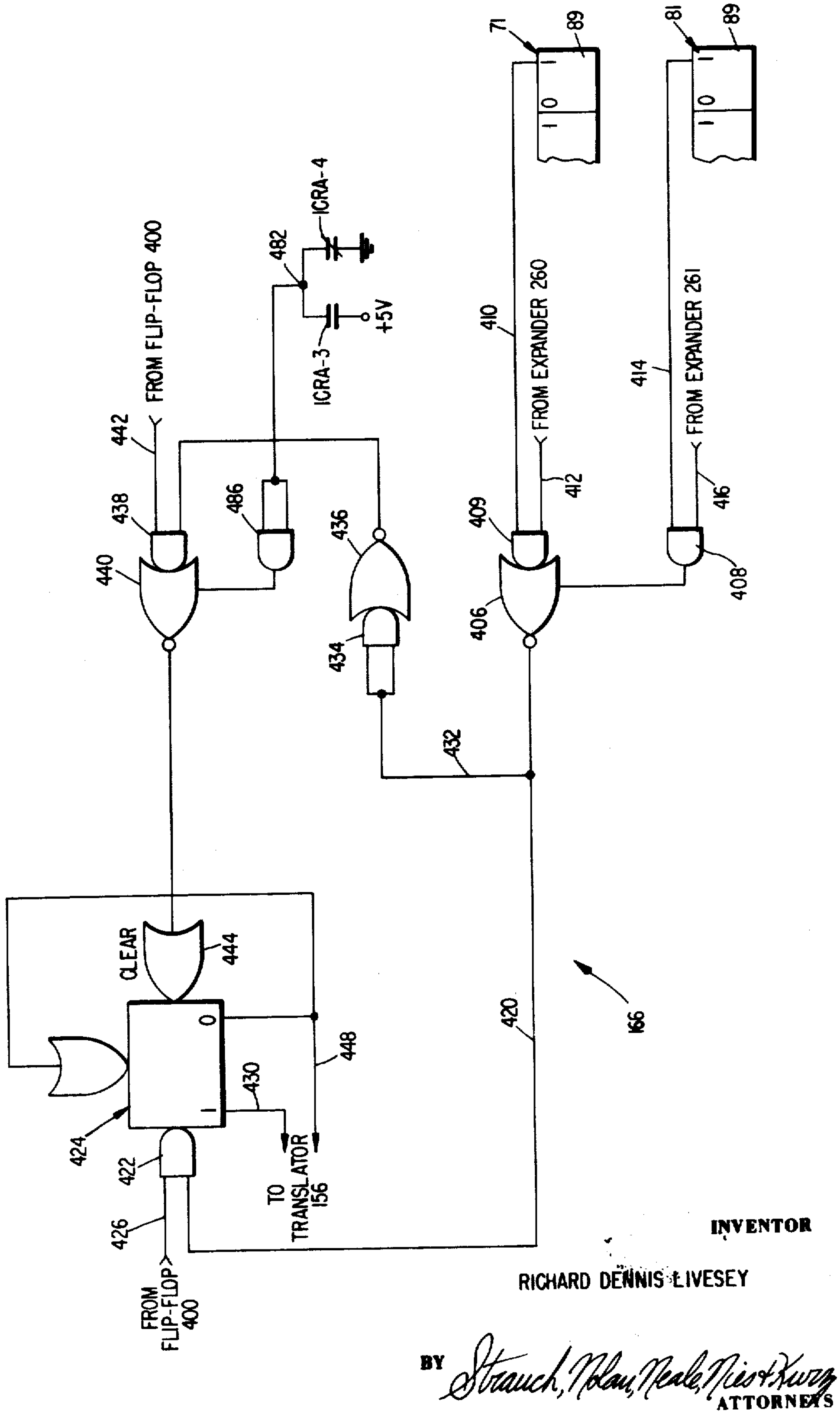
FIG. 13 is a circuit diagram of the direction control circuit shown in FIG. 7.

Referring now to FIG. 13, the wheel direction control circuit 166 comprises an inverting gate 406 which is connected to an AND gate expander 408. Inverting gate 406 has an input AND gate 409 and may be of the type K113 shown on page 88 of the previously identified Digital Logic Handbook. Expander 408 may be of the type K003 as shown on pages 84 and 88 of the above-mentioned Digital Logic Handbook.

For wheel W10, the 1 output terminal of stage 89 in register 71 is connected by a signal line 410 to one input terminal of gate 409. The other input terminal of gate 409 is connected by a signal line 412 to the output terminal of expander 260. The 1 output terminal of stage 89 in register 81 is connected by a signal line 414 to 1 input terminal of expander 408. The other input terminal of expander 408 is connected by a signal line 416 to the output terminal of expander 261.

According to the truth tables shown on page 88 of the previously identified Digital Logic Handbook, a binary 0 will be provided at the output terminal of gate 406 when 5-volt signals are provided over signal lines 410 and 412 to gate 409 or when 5-volt signals are provided over signal lines 414 and 416 to expander 408. For all other signal conditions at the input of either gate 409 or expander 408, the output of gate 406 will be a binary 1. Thus, when expander 260 is enabled to provide a binary 1 over line **179*a* for reading out the data word in register 71, a binary 1 will be applied over signal line 412 to the input of gate 409. If the direction control signal stored in stage 89 of register 71 is a binary 1, then a binary 1 will be applied over signal line 410. As a result, the output of gate 406 will be a binary 0. If, on the other hand, the direction control signal stored in stage 89 of register 71 is a binary 0, then the output of gate 406** will be a binary 1.

When expander 261 is enabled to provide a binary 1 on line **179*b* for reading out the data word in register 81, the output of gate 406 will be a binary 0 when the direction control bit stored in stage 89 of register 81 is a binary 1. Conversely, a binary 0 in stage 89 of register 81 will provide a binary 1 at the output of gate 406**.

With continued reference to FIG. 13, the output terminal of gate 406 is connected by a signal line 420 to one input terminal of an input AND gate 422 of a flip-flop 424. Flip-flop 424 may be of any suitable configuration such as the type K202 shown on page 94 of the previously identified Digital Logic Handbook. The output of gate 422 conducts the signal for setting flip-flop 424 to the 1 state or more specifically for providing a binary 1 at the 1 output terminal of the flip-flop. As shown, the other input terminal of gate 422 is connected by a signal line 426 to the 0 output terminal of flip-flop 400 in FIG. 7.

With continued reference to FIG. 13, the output terminal of gate 406 is also connected by a signal line 432 to both inputs or an input AND gate 434 for an inverter or inverting gate 436. Gate 436 may be of the same type as gate 406. The output terminal of gate 436 is connected to one input terminal of an AND gate 438 which forms a part of another inverter or inverting gate 440. Gate 440 may also be of the same type as gate 406. The other input terminal of gate 438 is connected by a signal line 442 to the 1 output terminal of flip-flop 400. The output terminal of gate 440 is connected to the input OR gate 444 which furnishes the signal for clearing flip-flop 424. The 1 output terminal and the 0 output terminal of flip-flop 424 are respectively connected by signal lines 430 and 448 to translator 156.

Referring back to FIG. 12A, relay 1CRA has a further set of normally open contacts 1CRA-3 connected to the positive terminal of the 5-volt d.c. power source and a terminal 482 in each of the 10 control circuits 140 and **140*a–i*. Relay 1CRA also has another set of normally closed contacts 1CRA-4 connected between each terminal 482 and ground. Terminal 482, as shown in FIG. 13 is in circuit 166 and is connected to both input terminals of an AND gate expander 486. The output of expander 486 is connected through gate 440 to the OR gate 444 for flip-flop 424. Thus, when relay 1CRA is pulsed, the output of gate 444 will change from 5 to 0 volts in each of the 10 control circuits for wheels W1–W10. Each flip-flop 424 in the 10 print wheel control circuits 140 and 140*a–i* will therefore be cleared to provide a binary 1 on line 448 and a binary 0 on line 430**.

The operation of the direction control circuit 166 will now be described, using circuit **140*i*** for wheel W10 as an example.

At the beginning of the cycle (i.e., before printing and with all print wheels at their home positions), flip-flop 424 will be cleared when relay 1CRA is pulsed. As a result, a binary 0 will be provided on line 430, and a binary 1 will be provided on line 448.

Assume now that the data bit stored in stage 89 of register 71 is a binary 0, thus calling for clockwise rotation of wheel W10. Before expander 260 is enabled to read out the data word in register 71, a binary 0 will be provided on line 412, and a binary 1 will consequently be on line 420. When a5-volt signal is conducted by expander 260 for reading out the data word in register 71, a binary 1 will be provided on line 412. Since a binary 0 is provided on line 410, the signal condition on each of the lines 420 and 432 will remain a binary 1. Since flip-lop 400 is cleared at this time to provide a binary 1 on line 426, then the signal voltage level at the input to flip-flop 424 will be maintained at 5 volts. As a result, flip-flop 424 will not switch to its set state, because a negative going signal change is required for switching flip-flop 424 as well as flip-flop 400.

A binary 0 on line 430 and a binary 1 on line 448 will cause translator 156 to step motor MW10 in a clockwise direction.

From the foregoing it is clear that flip-flop 424 will remain in its cleared state when a binary 0 is stored in stage 89 of register 71. After wheel W10 is advanced to its printing position, platen 360 is raised to print the first line of print as previously explained. Platen 360 then moves down to actuate switch PALS-1, and relay 2CR will be pulsed to set flip-flop 400 to the 1 state. As a result the signal on line 426 will change from 5 volts to zero potential. Flip-flop 424 will therefore be set to switch the signal conditions on lines 430 and 448. Thus a binary 0 will be provided on line 448, and a binary 1 will be provided on line 430. Translator 156 will now be commanded to reverse the direction of motor MW10, and when clock pulses are again conducted into translator 156, motor MW10 will now step in a counterclockwise direction until it reaches its home position, where its blank home space 37 is located at the platen printing position.

Assume now that a binary 1 is stored in stage 89 of register 71, thus calling for counterclockwise rotation of motor MW10. For this signal condition, a binary 1 will be provided on lines 420 and 432 before expander 260 is enabled to read out the data word in register 71. When expander 260 conducts a 5-volt signal to read out the stored data word, then the signal condition at the output of gate 406 changes from 5 volts to zero potential. As a result, flip-flop 424 will be switched to provide a binary 0 on line 448 and a binary 1 on line 430. Translator 156 will be commanded by these signal conditions to step motor MW10 in a counterclockwise direction when clock pulses are applied to gates 170 and 172. After printing takes place and platen 360 moves down, switch PALS-1 is actuated with the result that relay 2CR is pulsed to set flip-flop 400 to the 1 state. Now the signal on line 442 will change from 0 to 5 volts, and since inverter 436 is supplying a 5-volt signal, the signal condition conducted by gate 444 will change from a high to a low. Flip-flop 424 will therefore be switched to provide a binary 0 on line 430 and a binary 1 on line 448. Translator 156 will now be commanded by these signal conditions to reverse rotation of motor MW10 and thus drive it in a clockwise direction when clock pulses are supplied for resetting wheel W10 to its home position.

It will be appreciated that the direction control provided by the signal conditions on lines 414 and 416 is the same as that just described with respect to the signal conditions on lines 410 and 412.

Following the printing of the first two lines of print, it will be recalled that expanders 260 and 261 will be disabled when the weight information is read out of unit SU-1 for printing the third line of print. Thus, for the third line of print a binary 0 will be provided on each of the lines 412 and 416. As a result, a binary 1 will be provided at the output of gate 406 and applied to line 420 regardless of the signal conditions on lines 410 and 414.

For the third line of print, flip-flop 424 will therefore remain in its cleared state to thus provide a binary 0 on line 430 and a binary 1 on line 448. Translator 156 will therefore always be commanded to rotate wheel W10 in a clockwise direction for printing out the weight information in the third line of print. When flip-flop 400 is set to return the print wheel to its home position following the printing of the third line of print, the signal condition at the output of gate 422 will change from a high to a low, thus setting flip-flop 424 to switch the signal conditions on lines 430 and 448. A binary 0 will therefore be provided on line 448, and a binary 1 will be provided on line 430. When clock pulses are again conducted into translator 156 for returning wheel W10 to its home position, translator 156 will now be commanded to step motor MW10 in a counterclockwise direction.

The direction control circuits for the remaining wheels W1–W9 operate in the same manner as that just described for wheel W10.

Figure 13B:
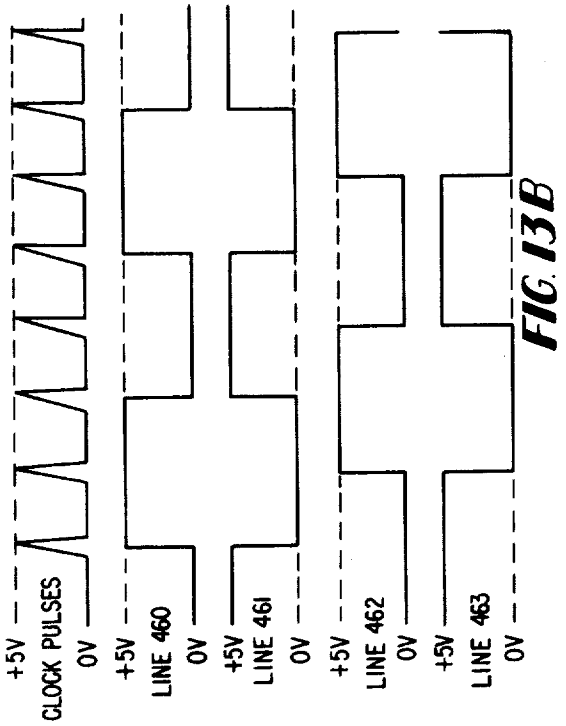
FIG. 13B shows the pulse sequencing produced by the translator to rotate the associated print wheel motor in a clockwise direction.
Figure 13C:
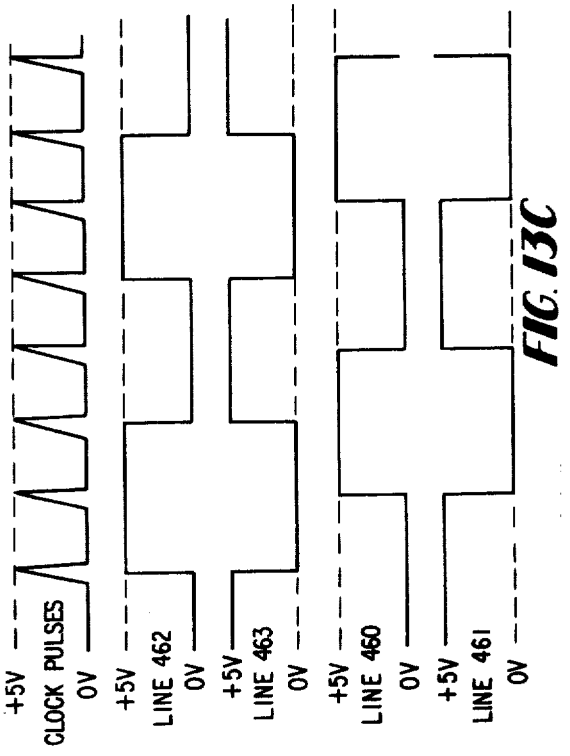
FIG. 13C shows the pulse sequencing produced by the translator to rotate the associated print wheel motor in a counterclockwise direction.
Figure 13A:
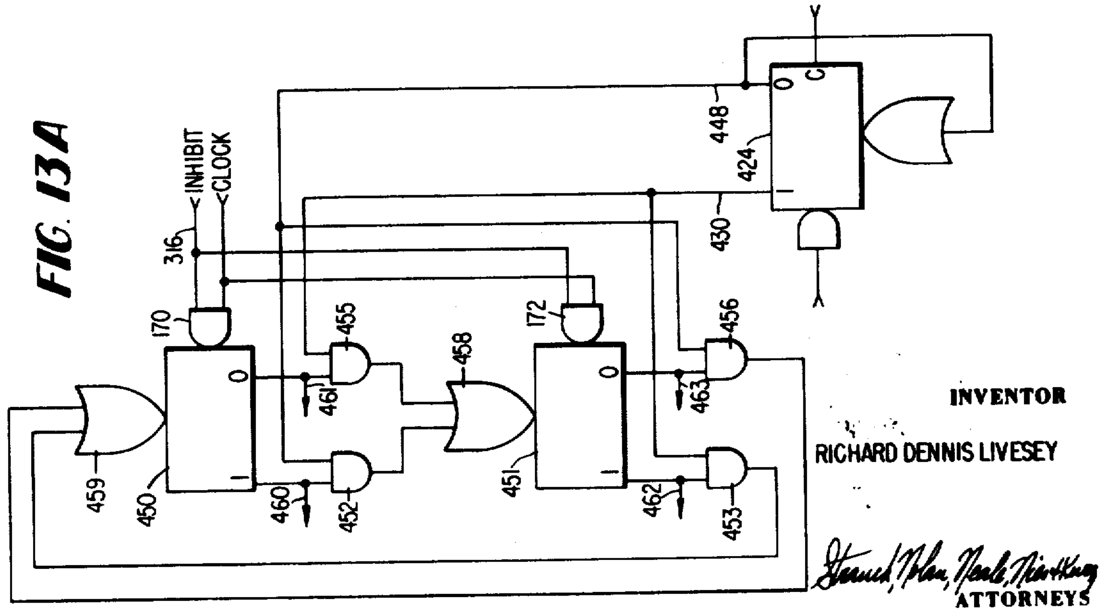
FIG. 13A is a circuit diagram of the translator shown in FIG. 7.

Referring now to FIG. 13A, translator 156 comprises a pair of flip-flops 450 and 451. The output of gate 170 is connected to the clear terminal of flip-flop 450, and the output of gate 172 is connected to the clear terminal of flip-flop 451. Line 430 is connected to one input terminal of an AND gate 453 and also to one input terminal of an AND gate 455. The other input terminal of gate 453 is connected to the 1 output terminal of flip-flop 451, and the other input terminal of gate 455 is connected to the 0 output terminal of flip-flop 450.

Still referring to FIG. 13A, line 448 is connected to one input terminal of an AND gate 452 and also to one input terminal of an AND gate 456. The other input terminal of gate 452 is connected to the 1 output terminal of flip-flop 450, and the other input terminal of gate 456 is connected to the 0 output terminal of flip-flop 451. The output terminals of gates 452 and 455 are connected to the input side of an OR gate 458 which, in turn, has its output terminals connected to the data input terminal of flip-flop 451. The output terminals of gates 453 and 456 are connected to the input side of an OR gate 459, and the output of gate 459 is connected to the data input terminal of flip-flop 450. The 1 and 0 output terminals of flip-flop 450 are respectively connected to lines 460 and 461, and the 1 and 0 output terminals are respectively connected to lines 462 and 463. Lines 460–463 are connected to driver 154 to provide the signals for the four windings in motor MW10. Flip-flops 450 and 451 may be of the K202 type shown on page 94 of the previously identified Digital Logic Handbook.

When a binary 0 and a binary 1 are respectively provided on lines 430 and 448, translator 156 will command driver 154 to rotate motor MW10 in a clockwise direction when clock pulses are applied to gates 170 and 172. Before the first clock pulse is conducted by gate 170, flip-flops 450 and 451 will be cleared. Thus a binary 0 is provided at the 1 output terminal of each flip-flop, and a binary 1 is provided at the 0 output terminal of each flip-flop. Since flip-flop 424 is cleared to provide a binary 1 on line 448, gate 456 will conduct a positive going data signal or a high to gate 459. The remaining gates 452, 453 and 455 will be disabled at this time. When the clock pulse is conducted through gate 170, flip-flop 450 will be set to the 1 state, thus applying a binary 1 to gate 452 and a binary 0 to gate 455. Flip-flop 451 will not switch states when the first clock pulse is conducted by gate 172 because there is a low at gate 458.

When flip-flop is switched to provide a binary 1 at gate 452, gate 452 conducts to change the signal level at the output of gate 458, from a low to a high. Thus the second clock pulse conducted by gate 172 will set flip-flop 451 to the 1 state to provide a binary 1 at gate 453.

As a result neither of the gates 453 and 456 will conduct, so that the output of gate 459 will be a low. When the third clock pulse is conducted into translator 156, flip-flop 450 will therefore reset to provide a binary 1 at its 0 output terminal.

When flip-flop 450 resets, neither of the gates 452 and 455 will conduct so that the output of gate 458 will be a low. This completes one cycle of operation of flip-flops 450 and 451, and the cycle is continually repeated as long as clock pulses are available and conducted into translator 156. The signal voltage conditions provided on lines 460–463 by this operation of flip-flops 450 and 451 is shown in FIG 13B. As shown flip-flop 450 will switch from one state to the other on the odd clock pulses, and flip-flop 451 will switch states on the even clock pulses. These voltage conditions will drive the print wheel motor in a clockwise direction.

When flip-flop 424 is set to provide a binary 1 on line 430, flip-flops 450 and 451 will be operated to provide the sequence of signal voltages to drive the print wheel motor is a counterclockwise direction. Thus, in response to the first clock pulse, gate 455 will conduct a positive going signal (note that both of the flip-flops 450 and 451 are initially cleared) to change the output of gate 458 from a low to a high. The other gates 452, 453 and 456 are disabled at this time. By changing the output of gate 458 from a low to a high, flip-flop 451 will switch from its set state when the first clock pulse is conducted into translator 156 and applied to gate 172. Therefore, a binary 1 will be provided at the 1 output terminal of flip-flop 451, and gate 453 will conduct a positive going signal to change the output of gate 459 from a low to a high. On the next clock pulse flip-flop 450 will switch to the set state to provide a binary 1 at its 1 output terminal. Gate 455 will therefore be disabled to change the signal condition at the output of gate 458 from a high to a low. Therefore, the third clock pulse conducted into translator 156 will reset flip-flop 451, placing a binary 1 at the 0 output terminal of the flip-flop. Gate 453 will therefore be disabled, and the signal condition at the output of gate 459 will change from a high to a low. Thus the fourth clock pulse will reset the flip-flop 450, and the cycle will be repeated as long as clock pulses are conducted into the translator 156. The signal voltage conditions produced on lines 160–163 by providing a binary 1 on line 430 is shown in FIG. 13C. As shown, flip-flop 451 will switch states on the odd clock pulses, and flip-flop 450 will switch states on the even clock pulses.

Figure 18:
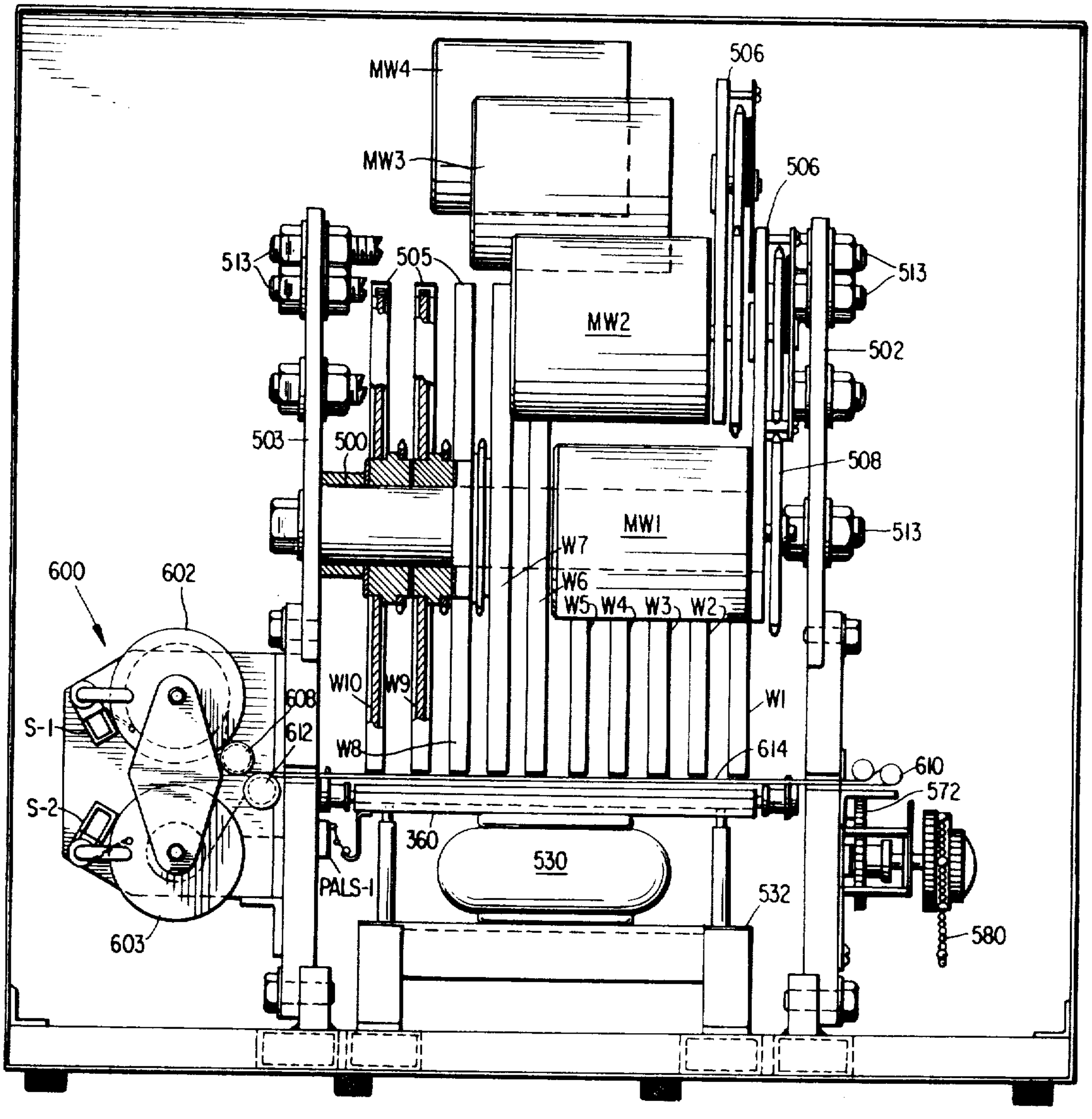
FIG. 18 is a partially sectioned front elevation of the printer shown in FIG. 17.

As best shown in FIG. 18, print wheels W1–W10 are journalled in axially aligned relation on a support shaft 500 in printer 30. Shaft 500 is fixed at opposite ends to parallel, rigid support plates 502 and 503, and wheels W1–W10 are disposed between plates 502 and 503 as shown. Mounted on the periphery of each wheel are a series of type sectors 505. The characters to be printed are formed on sections 505.

Figure 17:
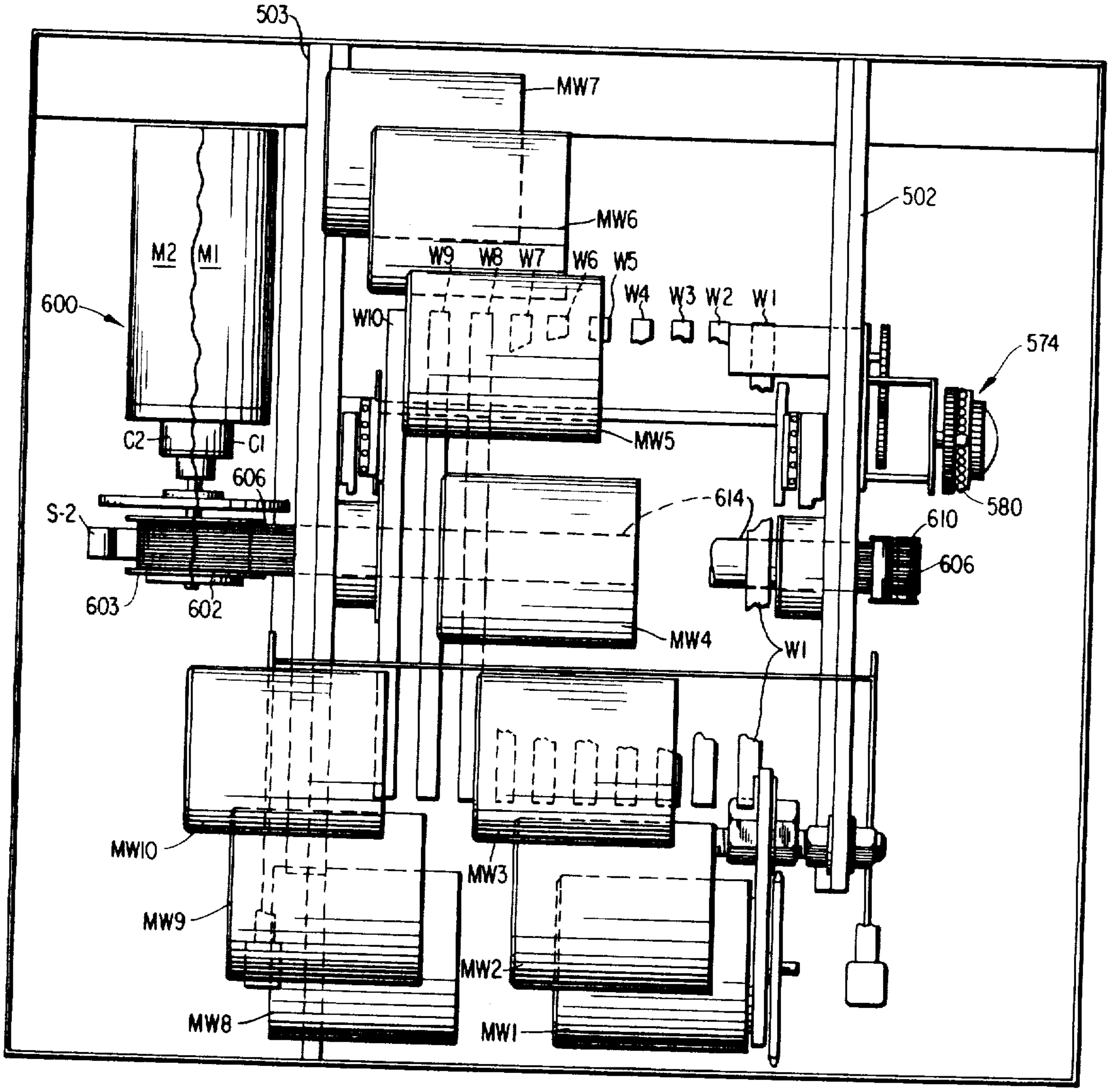
FIG. 17 is a plan view of the printer with the outer casing broken away to show interior details.
Figure 19:
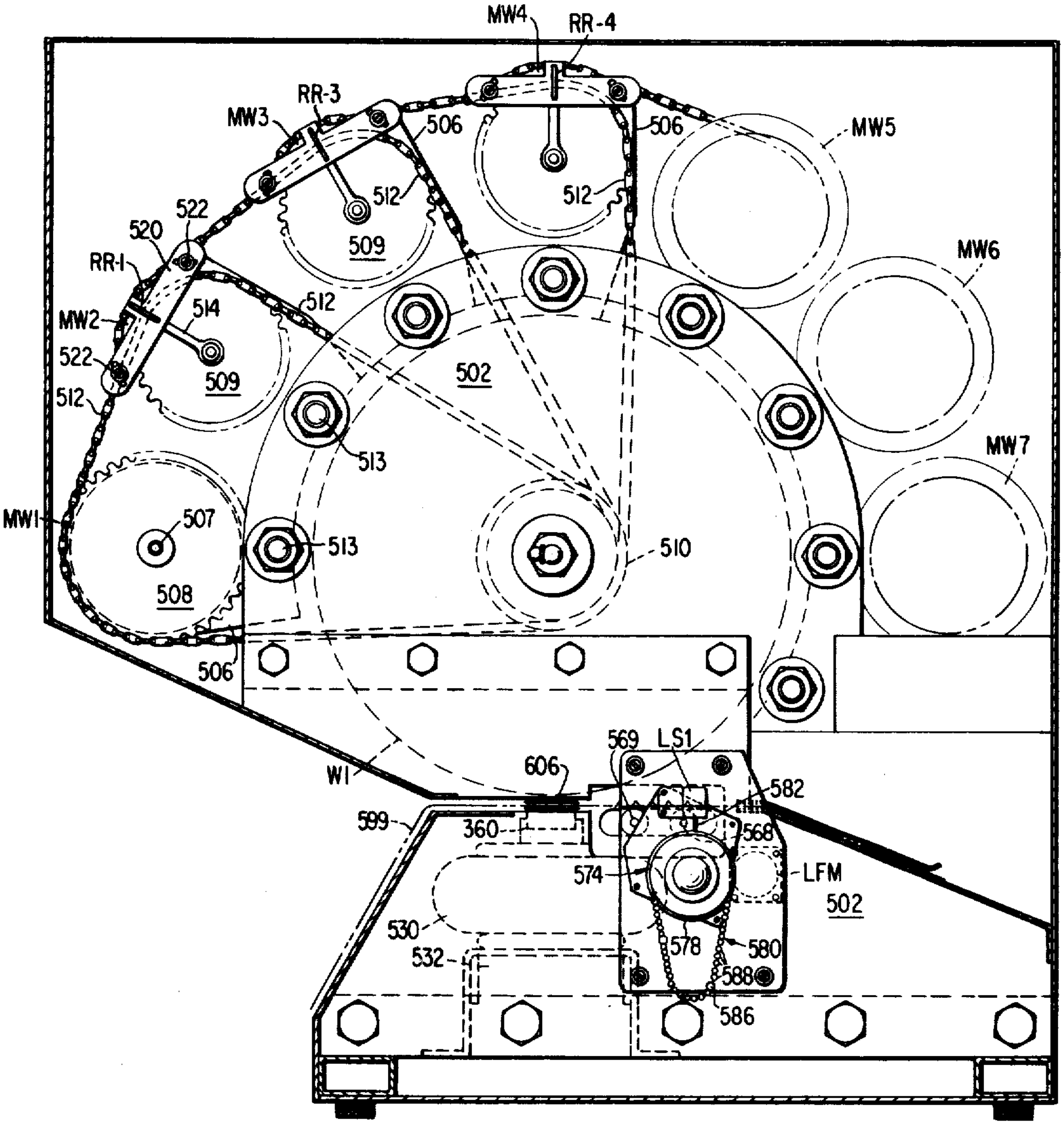
FIG. 19 is a side elevation of the printer shown in FIG. 17, with FIG. 19A being a fragmentary enlargement for the line finder assembly shown in FIG. 19.
Figure 19A:
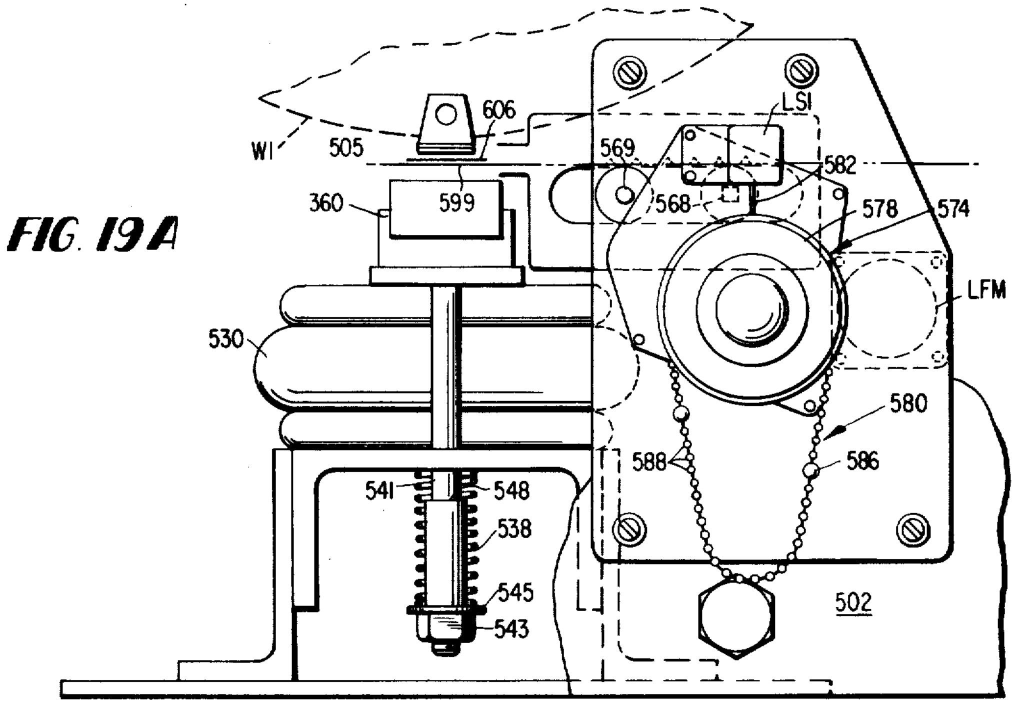

Motors MW1–MW7, as shown in FIGS. 17–19, are arranged in a stepped spiral path. Motors MW8–MW10 are arranged in a separate stepped, spiral path behind motors MW1–MW3. The rotational armature shaft axes of motors MW1–MW10 are parallel with each other and with the aligned rotational axes of wheels W1–W10.

Figure 21:
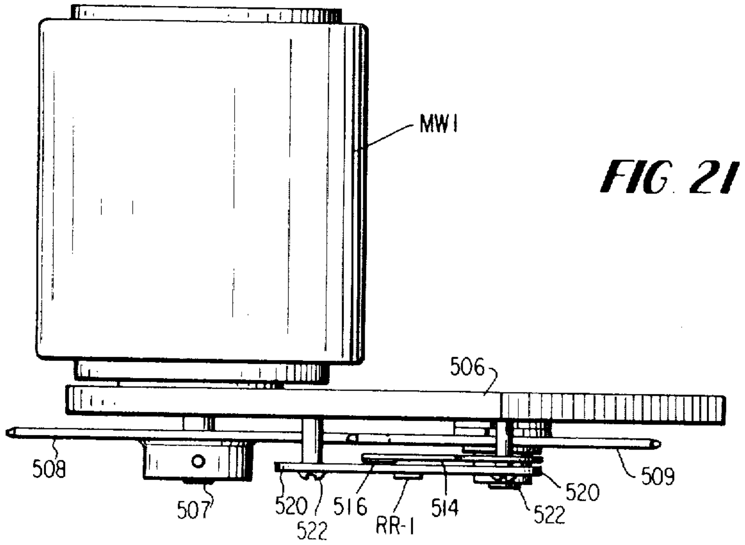
FIG. 21 is a plan view of the structure shown in FIG. 20.
Figure 20:
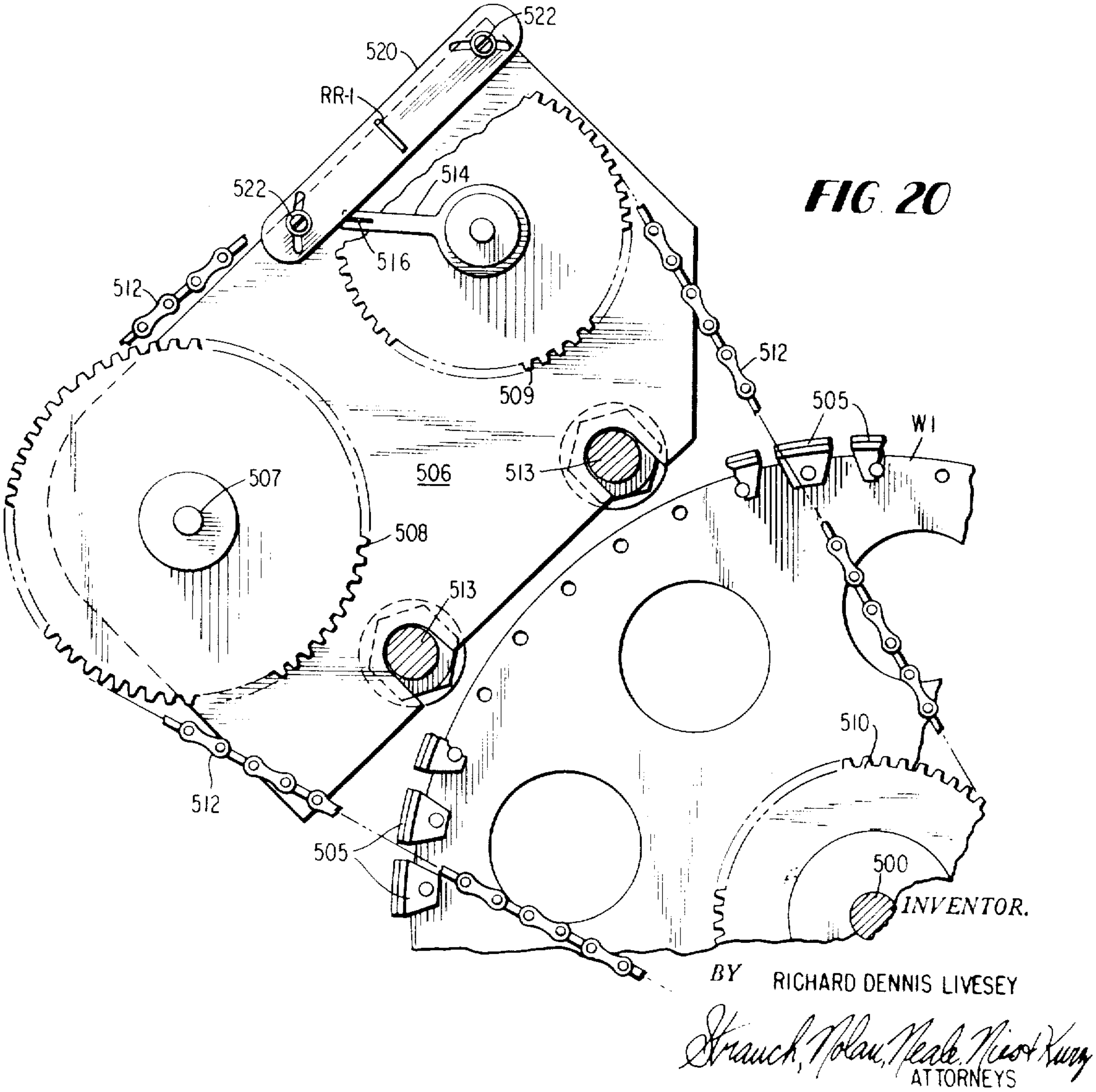
FIG. 20 is an enlarged, fragmentary view in elevation of one of the print wheel motor drives shown in FIGS. 17—19.

As shown in FIGS. 20 and 21, motor MW1 is mounted on a support plate 506 and has an armature shaft 507 extending through an aperture in plate 506. Plate 506 is rigidly secured to plates 502 and 503 by any suitable means such as nut and bolt assemblies indicated at 513. The drive train for imparting rotation to wheel W1 comprises three sprocket wheels 508, 509 and 510 and an endless drive chain 512. Sprocket wheel 508 is fixed on the armature shaft of motor MW1, sprocket wheel 509 is rotatably mounted on plate 506, and sprocket wheel 510 is fixed to the hub of wheel W1. Sprocket wheel 509 is rotatable about an axis that is parallel to that of sprocket wheels 508 and 510. Chain 512 is trained over sprocket wheels 508–510.

Fixed to sprocket wheel 509 is a radially extending arm 514 which carries a switch actuating permanent magnet indicated at 516. Magnet 516 is disposed at the end of arm 514 and is rotated along a path that passes in the proximity of switch RR-1 which is of the reed type. Rotation of sprocket wheels 509 and 510 are correlated by chain 512 so that when the blank home space on wheel W1 is rotated to the platen printing position, magnet 516 will close switch RR-1. It will be noted that the printing position is where the character or space on the printing wheel faces vertically downwardly.

The construction for supporting each of the motors MW2–MW10 on plate 502 is the same as that just described for motor MW1. Also, the drive trains operatively connecting motors MW2–MW10 respectively to wheels W2–W10 is the same as that described for motor MW1 and wheel W1. Accordingly, like reference characters have been applied to designate like parts in the motor support structures for motors MW2–MW10 and the drive trains for wheels W2–W10. Also, the construction for actuating each of the switches RR-2 through RR-10 (which are also of the reed type) is the same as that just described for switch RR-1, with like reference characters being applied to designate like parts. Thus each of the switches RR-2 through RR-10 is actuated by its associated permanent magnet 516 in the same manner just described for switch RR-1. It will be appreciated that as each magnet 516 moves out of the proximity of its associated switch, the switch will open. Thus each of the switches RR-1 through RR-10 will be closed only when its associated print wheel has been rotated to locate its blank home space at the printing position in the printer.

Still referring to FIGS. 20 and 21, switch RR-1 is fixed on a bracket 520 which is adjustably mounted on plate 506 by stud and nut assemblies 522. The studs of assemblies 522 extend through elongated, arcuate slots in bracket 520 so that when the nuts of assemblies 522 are loosened, bracket 520 may be swung about axis of sprocket wheel 509 to thus adjust the position of switch RR-1 relative to magnet 516. In this manner, the position of switch RR-1 may properly be adjusted to ensure that magnet 516 will actuate the switch when the blank space on the print wheel is at the printing position in the printer.

Switches RR-2 through RR-10 are adjustably mounted on their associated support plates 506 in the same manner just described for switch RR-1. Accordingly, like reference characters have been applied to designate the parts in the mounting structures for switches RRn2 through RR-10.

Preferably, the previously described motor support plates 506 are removably mounted on plate 502 independently of each other. Therefore, the motor and other parts supported by each plate 506 may be removed from printer 30 independently of the other print wheel motors and parts carried by each of the other motor support plates. As a result, repair of replacement of these printer parts is simplified.

Figure 22:
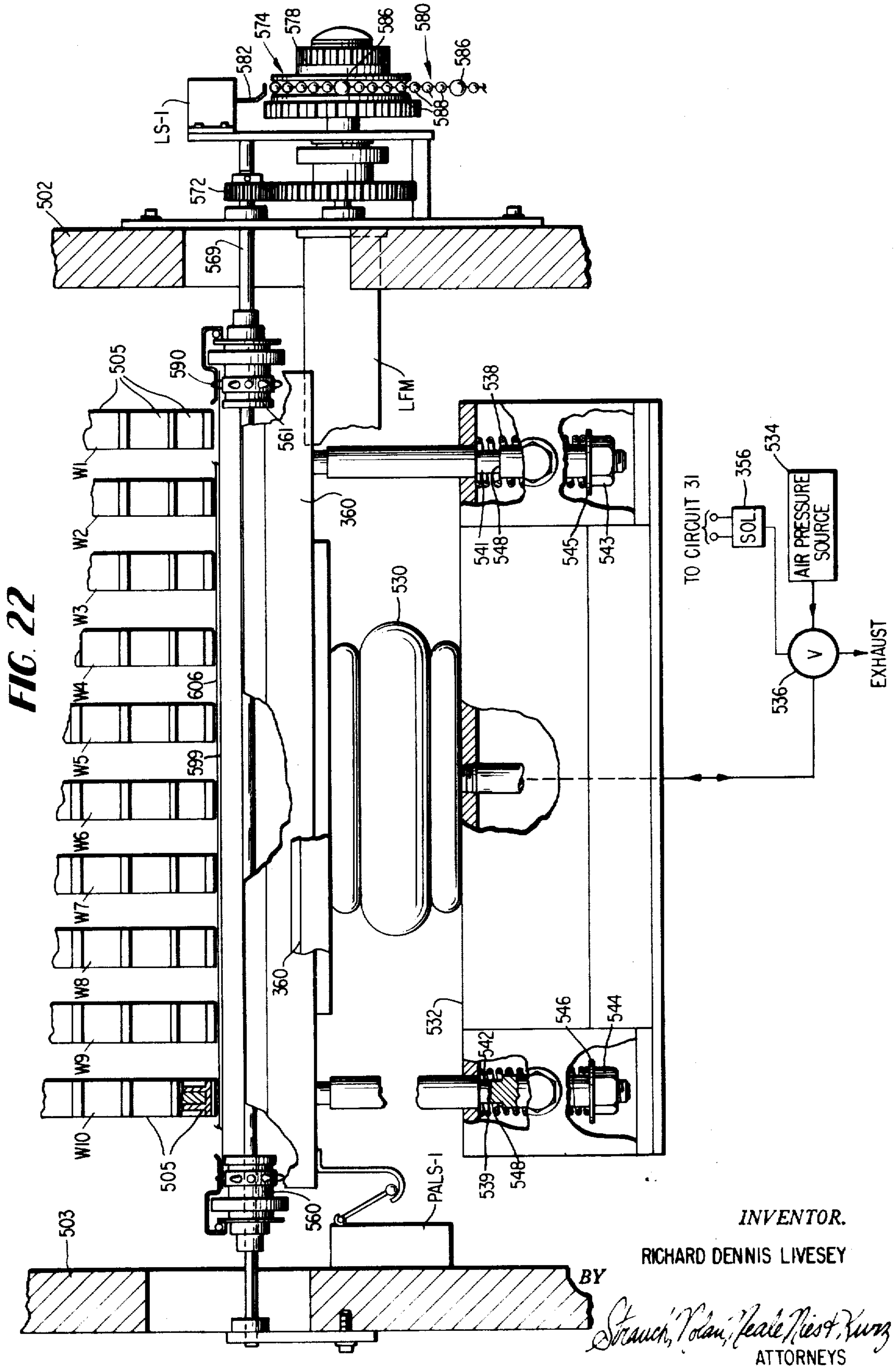
FIG. 22 is an enlarged, fragmentary view in elevation of the printer platen and the label feed mechanism shown in FIG. 18.

Referring to FIGS. 18 and 22, the print platen 360 is disposed horizontally below wheels W1–W10 so that only the vertically downwardly facing printing type aligning with a vertical axis will print when platen 360 is raised. Platen 360 is mounted on a suitable bellows 530, and bellows 530 is supported on a rigid base plate 532. Air pressure for expanding bellows 530 and thereby raising platen 360 to a printing position is supplied by a suitable source 534 (see FIG. 22) through a control valve 536. Valve 536 is operated by solenoid 356 and may be of any suitable conventional construction which is normally spring biased to a position to exhaust air from bellows 530 and which is actuated by energization of solenoid 356 to establish fluid communication between source 534 and bellows 530. Thus when solenoid 356 is de-energized, valve 536 will exhaust air from bellows 530, thus allowing a pair of coiled, compression springs 538 and 539 (FIG. 22) to bias platen 360 downwardly to its illustrated non-printing position. When solenoid 356 is energized, however, valve 536 supplies air under pressure to bellows 530, causing bellows 530 to expand along a vertical axis to raise platen 360 to its printing position against the bias of springs 538 and 539.

As best shown in FIG. 22, springs 538 and 539 respectively peripherally surround vertical guide rods 541 and 542 which are fixed at their upper ends to platen 360. Rods 541 and 542 slidably extend through apertures in base plate 532 and are threaded at their lower ends to respectively receive nuts 543 and 544. Spring 538 is axially compressed between the underside of base plate 532 and a washer 545 that is seated on nut 543. Spring 539 is axially compressed between the underside of base plate 532 and a washer 546 that is seated on nut 544.

As shown, rods 541 and 542 are parallel with each other and with the vertical expansion axis of bellows 530 which may be of the corrugated type. Rods 541 and 542 are spaced equidistantly on opposite sides of bellows 530, and the vertical axes of rods 541 and 542 and the vertical expansion axis of bellows 530 are contained in a common plane which also contains the rotational axes of wheels W1–W10. When pressurized air is exhausted from bellows 530, springs 538 and 539, which react against the underside of base 532, resilient ly urges platen 360 vertically downwardly to a non-printing position where the top surface of platen 360 is out of contact and spaced below the printing type on wheels W1–W10.

Still referring to FIG. 22, rods 541 and 542 are formed upwardly facing, annular shoulders 548 which act as stop faces and which seat against the underside of base plate 532 upon expansion of bellows 530 to thus limit the upward movement of platen 360. Seating engagement of shoulders 548 against the underside of base 532 prevents platen 360 from tilting away from a horizontal position under conditions where non-symmetrical forces are applied to platen 360 when it strikes the printing type on wheels W1–W10. This non-symmetrical force condition can occur if the blank home spaces on non-symmetrically disposed print wheels are rotated to the platen print-out position.

If the platen tilted under the influence of this non-symmetrical force condition, some of the printing type on the print wheel might not be struck by the label on platen 360 or the striking force might not be uniform for all of the printing wheels. Tilting of the platen, however, is avoided in the construction described above.

Figure 23:
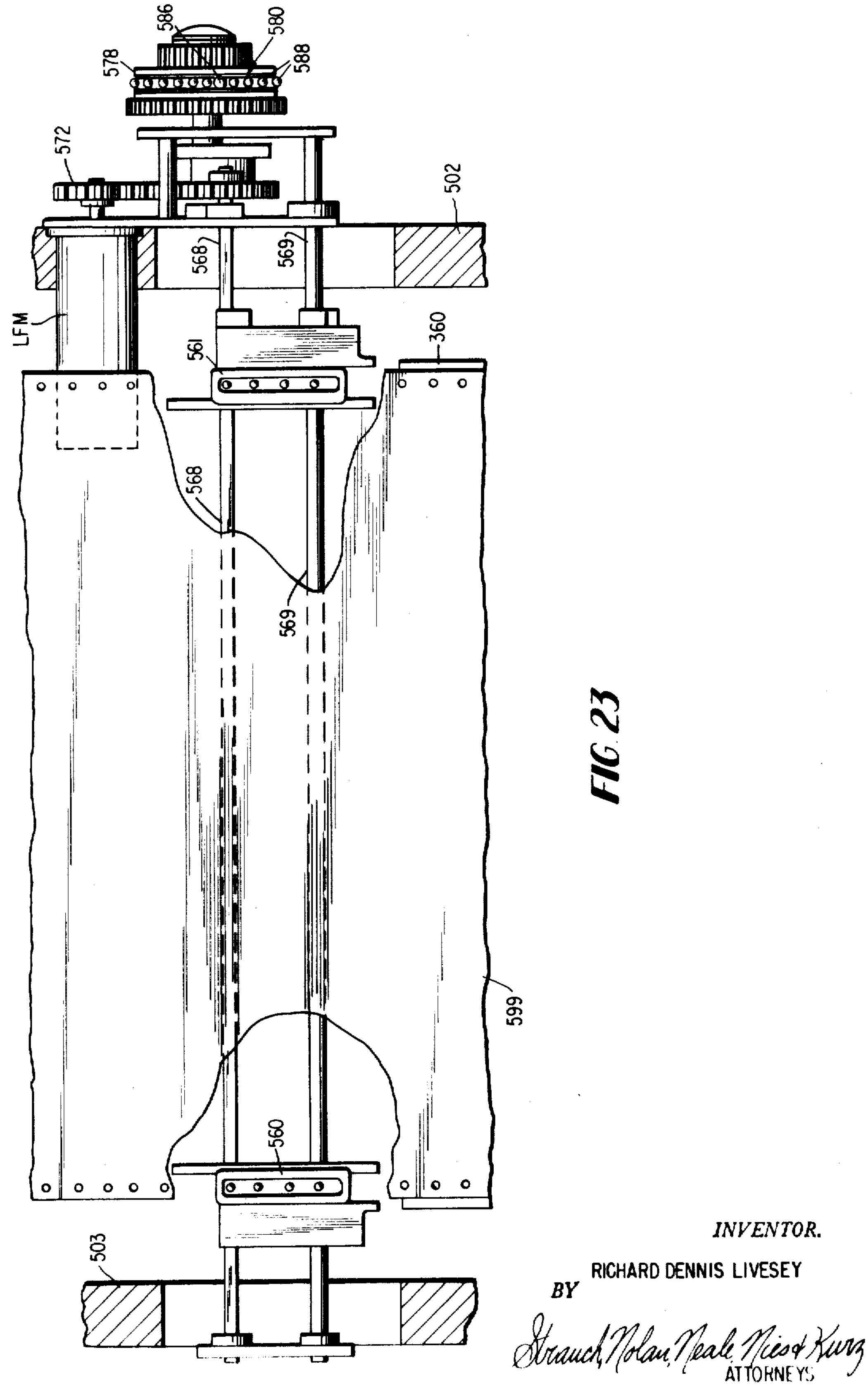
FIG. 23 is a fragmentary plan view of the label feed mechanism shown in FIG. 22.

As shown in FIGS. 22–24, the label feeding mechanism comprises a pair of parallel spaced apart caterpillar track assemblies 560 and 561 which are disposed on opposite sides of an inlet passage 562 in printer 30. Assembly 560 comprises an endless caterpillar track 564 trained around parallel spaced apart pulleys 565 and 566 which are respectively fixed on a pair of parallel spaced apart shafts 568 and 569

Assembly 561 is the same as assembly 560, like reference characters being applied to designate like parts. As shown, the pulleys 565 and 566 of assembly 561 are also fixed on shafts 568 and 569.

Shaft 568, as best shown in FIG. 22, is drive connected to a label feed motor LFM by a suitable gear train indicated at 572. As will be explained in greater detail shortly energization of motor LFM is controlled by a switch LS-1. Switch LS-1 is actuated by a line finder assembly 574 of suitable construction. Assembly 574 essentially comprises a pulley 578 and an endless beaded chain 580 looped over pulley 578. Pulley 578 is mounted on a shaft which also mounts an intermediate gear in drive train 572. Switch LS-1 is mounted with its actuator 582 directly over the portion of chain 580 that is trained over pulley 578. Chain 580 is formed by a series of diametrically enlarged, spaced apart beads 586 and a series of smaller diametered beads 588 strung between the larger beads 586. Actuator 582 is in the path of beads 586 so that is will be engaged by beads 586 as pulley 578 is rotated. Actuator 582, however, is positioned so that is will not be engaged by the smaller beads 588. Thus switch LS-1 will be actuated only the larger beads 586.

When motor LFM is energized it rotates shaft 568 to advance the catapiller tracks 564. Tracks 564 are provided with pins 590 which extend through perforations in the marginal side edges of the label or other sheet of paper inserted into passage 562. Thus, energization of motor LFM advances the label through passage 562 and between platen 360 and the array of print wheels W1–W10. Advantageously, a series of labels are serially joined by transverse perforations in a single sheet 599 so that the sheet will be inserted and advanced through printer 30 by operation of motor LFM.

As best shown in FIGS. 17 and 18 a ribbon drive mechanism 600 comprises a pair of motors M1 and M2 and a pair of ribbon spools 602 and 603. Energization of a clutch C1 drive connects motor M1 to spool 602, and energization of a clutch C2 drive connects motor M2 to spool 603. The opposite end portions of a suitable ribbon 606 are wound around spools 602 and 603 in the usual manner.

Ribbon 606 extends from spool 602 and passes under an idler pulley 608. From pulley 608, ribbon 606 horizontally passes between platen 360 and the array of printing wheels W1–W10 at right angles to the path along which the sheet of labels is advanced through the printer. The center line of ribbon 606 is contained in the vertical plane extending radially from the rotational axes of wheels W1–W10 and normally intersecting the top, flat printing surface of platen 360. On the opposite side of platen 360, ribbon 606 is trained around another idler pulley 610 and then passes horizontally back between platen 360 and the array of printing wheels W1–W10 to a region where it trains over a further idler pulley 612 and passes to spool 603. The label feed mechanism advances the sheet of labels between platen 360 and the tensioned horizontal ribbon portions indicated at 614. Thus when platen 360 is raised the printing type facing vertically downwardly will be printed on the label.

Energization of motor M2 advances ribbon 606 and energization of motor M1 reverses or rewinds the ribbon in a conventional manner. Each of the ribbon spools is free-wheeling in a direction opposite to the direction of rotation when its associated motor is energized.

As shown in FIG. 15, switch LS–1 is connected in series with a relay LFMC across the terminals of source 490. Thus each time one of the larger diametered beads 586 is advanced to engage actuator 582, switch LS-1 will close to energize relay LFMC.

Relay LFMC has a set of normally closed contacts LFMC-1 connected in series with the field windings of motor LFM and a set of normally open contacts LFMC-2 connected in series with a resistor 620. The circuit branch of contacts LFMC-2 and resistor 620 is in parallel with the field windings of motor LFM so that when contacts LFMC-2 close, resistor 620 will be shunted across the field windings of motor LFM to provide a dynamic braking effect for abruptly stopping rotation of motor LFM. As a consequence advancement of the sheet of labels in printer 30 is stopped abruptly. Thus whenever switch LS-1 is closed, relay LFMC will be energized to open contacts LFMC-1 and close contacts LFMC-2, thereby concomitantly de-energizing and braking motor LFM to ensure that advancement of the sheet of labels stops in correlated relation with the spacing of the enlarged beads 586 on chain 580.

It will therefore be appreciated that the spacing between adjacent beads 586 determines the spacing between lines of print on the label in printer 30. The number of smaller diametered beads 588 between the larger beads 586 may selectively be varied to thereby selectively vary the period during which motor LFM is energized and, consequently, the spacing between successive lines of print.

When relay LFMC is energized to stop motor LFM, it closes a further set of normally open contacts LFMC-3 which establishes a holding circuit through switch PALS-2 and a normally closed, spring loaded pushbutton switch PB3 to maintain relay LFMC energized. As shown relay LFMC, switch PB3, contacts LFMC-3, and switch PALS-2 are connected in series across the terminals of source 490, and switch LS-1 is in parallel with the circuit branch containing switches PALS-2 and PB3 and contacts LFMC-3.

As long as relay LFMC remains energized, motor LFM cannot be energized to advance the sheet of labels in printer 30. De-energization of relay LFMC is accomplished by opening either switch PALS-2 or switch PB3.

It will be recalled that when solenoid 356 is pulsed, valve 536 is actuated to momentarily supply pressurized air to bellows 530 for raising platen 360 to its printing position. Upon de-energization of solenoid 356, valve 536 is spring biased back to a position for exhausting the pressurized air in bellows 530 to atmosphere, thus enabling springs 538 and 539 to urge platen 360 downwardly to a position where it engages and momentarily closes switch PALS-1. As previously described, the momentary closing of switch PALS-1 initiates another printing cycle. At the same time, switch PALS-2 will open momentarily to de-energize relay LFMC.

De-energization of relay LFMC resets contacts LFMC-1 LFMC-2, and LFMC-3. By closing contacts LFMC-1 and opening contacts LFMC-2, motor LFM will be re-energized to advance the label sheet in printer 30 until the next diametrically enlarged bead 586 closes switch LS-1 to re-energize relay LFMC. Motor LFM will therefore de-energize to stop advancement of the label at the pre-selected position for printing the next line of print. It will be appreciated that beads 586 also are arranged to accommodate the spacing between the last line of print on one label and the first line of print on the next label in sheet 599.

As shown in FIG. 15, motor M1 is energized from an a.c. source 630 through normally closed time delay contacts RDT-1 and a set of normally closed contacts LC-1. Motor M2 is energized from source 630 through contacts RDT-1 and a set of normally open contacts LC-2. Contacts LC-1 and LC-2 are operated by a relay LC having a latching coil LCL and an unlatching coil LCU.

Coil LCL is energized by closing a ribbon limit switch S1. Switch S1 will be closed as long as there is sufficient supply of ribbon rolled on spool 602. When the supply of ribbon spool begins to deplete, switch S1 will open.

Coil LCU is energized by closing another ribbon switch S2. Switch 52 will close upon a predetermined accummulation of ribbon on spool 603.

Contacts RDT-1 are operated by a time delay relay RDT which is in series with a set of normally closed contacts PAC-2 of relay PAC. Thus when relay PAC is pulsed to initiate another printing cycle, the energizing circuit for relay RDT will be interrupted.

Before printing a given line of print and before relay PAC is energized to initiate the next printing cycle, relay RDT will be energized. As a result, contacts RDT-1 will be opened to prevent energization of motors M1 and M2.

Upon printing the line of print, relay PAC will be energized momentarily as previously described. Thus contacts PAC-2 will momentarily open to drop out relay RDT. Contact RDT-1 will close to energize either motor M1 or motor M2 depending upon the conditions of switches S1 and S2.

Assume that sufficient ribbon is on spool 602 to close switch S1. Coil CLC will therefore be energized, and coil LCU will be de-energized, for at this stage there is insufficient ribbon on spool 603 to close switch S2.

Energization of coil LCL closes contacts LC-2 and opens contacts LC-1 to energize motor M2 and prevent energization of motor M1. Energization of coil LCL also closes contacts LC-3 and opens contacts LC-4. By closing contacts LC-3, a circuit is completed through another set of normally closed contacts RDT-2 of relay RDT to energize clutch C2.

With clutch C2 and motor M2 energized, the ribbon will be advanced. When relay PAC de-energizes to close contacts PAC-2, relay RDT energizes, and after a short delay, contacts RDT-1 and RDT-2 open. By opening contacts RDT-1, motor M2 will be de-energized, and by opening contacts RDT-2, clutch C2 will be de-energized. Advancement of the ribbon will therefore stop.

Thus after each line of printing the ribbon will be advanced momentarily. As the supply of ribbon on spool 602 begins to deplete, switch S1 opens to de-energize coil LCL but contacts LC-2 and LC-3 will be latched closed and contacts LC-1 and LC-4 will be latched opened. These contacts will not be reset until coil LCU is energized. Thus, even though switch S1 has opened, the ribbon will continue to be advanced intermittently by the momentary energization of motor M2 and clutch C2 after completing each line of print.

When enough ribbon accummulates on spool 603, switch S2 will close to energize coil LCU. Contacts LC-1 through LC-4 will therefore be reset so that when contacts RDT-1 and RDT-2 close again, clutch C1 will be energized through contacts LC-4 and motor M1 will be energized through contacts LC-1. The direction of ribbon movement will now be reversed, and the ribbon will continue to move intermittently in the reverse direction until switch S1 is again closed. As soon as the reverse movement of the ribbon begins to deplete the supply of ribbon on spool 603, switch S2 will open to de-energize coil LCU, but contacts LC-1 and LC-4 remains closed and contacts LC-2 and LC-3 remain open until coil LCL is re-energized.

Figure 25:
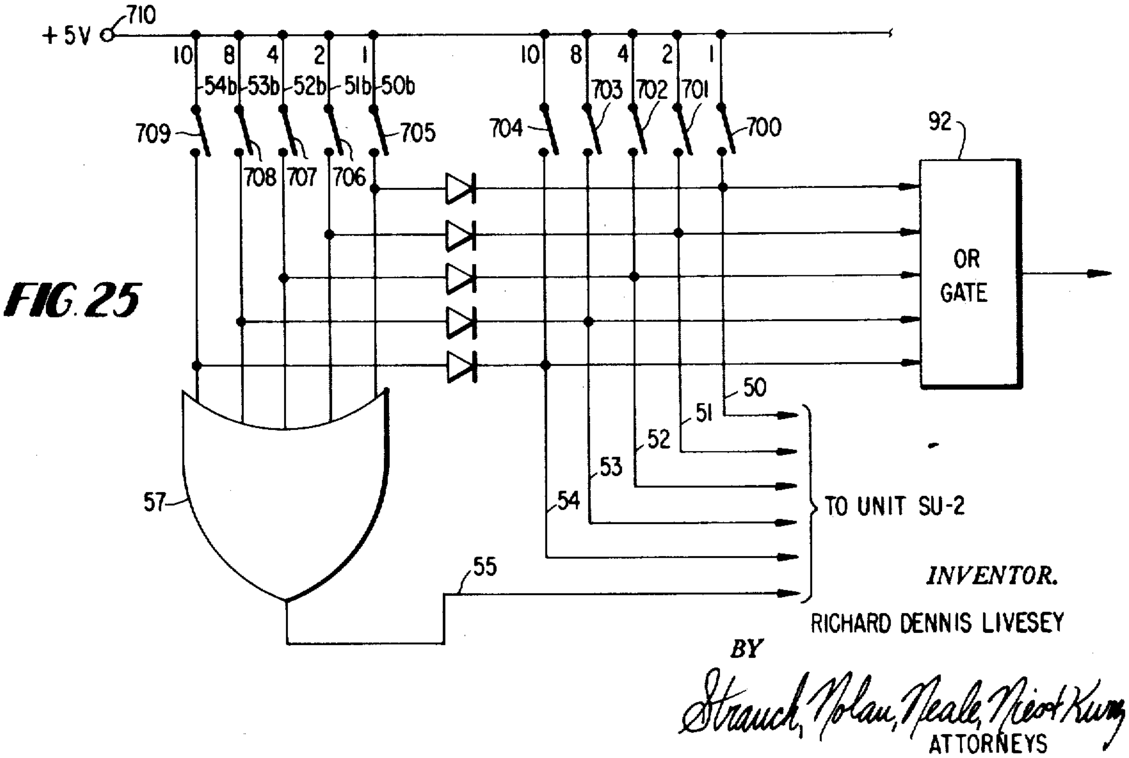
FIG. 25 is a modified, simplified circuit for use in place of the circuitry shown in FIG. 2 for data source DS-1.

Referring now to FIG. 25, the data entry device 40 together with circuits 42 and 44 may be replaced with a series of selectively operable on-off switches 700, 701, 702, 703, 704, 705, 706, 707, 708, and 709 which are respectively contained in lines 50–54 and **50*b*–54*b*. Switches 700–709 are each connected to the positive terminal 710 of a suitable 5-volt d.c. power source so that by closing each switch a 5-volt signal (i.e., a binary 1) will be supplied on a selected one or ones of the lines 50–54 and 50*b*–54*b***.

Based upon the BCD code shown in tables A and B of FIG. 5, the operator selectively closes predetermined ones of the switches 700–709 to provide the necessary signal condition for printing the desired character. Assume, for example, the character to be printed in the first line (by wheel W1) is the letter P. To accomplish this the operator closes only switches 700 and 704, leaving switches 701–703 and 705–709 open. Thus, the five-bit data word 10001 will be transferred by lines 50–54 to storage unit SU-2.

By leaving switches 705–709 open a binary 0 will be provided on line 55, and this signal condition, as previously explained, will cause the printing wheel to rotate in a clockwise direction to its printing position where it will print the letter P. As shown in FIG. 4, clockwise rotation of the printing wheel requires an angular displacement of less than 180° to bring the character P into its printing position.

Furthermore, its will be noted that, in a clockwise direction, all of characters in table A are less than 180° from the non-printing or blank character space indicated at 37 in FIG. 14. On the other hand, it will be noted that, in a counterclockwise direction, all of the characters in table B are less than 180° from the blank character space 37. Thus by starting the printing wheel from a position where space 37 is at the platen printing position and by correlating the direction control data bit on line 55 with the angular distance of the printing wheel character that is desired to be printed, each printing wheel will be rotated to its printing position only in that direction which is less than 180°. The second blank space (indicated at 712 in FIG. 4) is diametrically opposite space 37 so that in no case will each printing wheel be rotated to its printing position through an angle equal or greater than 180°. Therefore the total angular displacement of each printing wheel is being set up to print a desired character and reset to its home position after the character is printed will always be less than 360°.

Assume now that the next letter to be printed by wheel W2 is the letter A. To achieve this operation the operator closes switch 705 and leaves switches 700–704 and 706–709 open. The data work 00001 will therefore be applied to lines 50–54 for storage in unit SU-2. Having closed one or more of the switches 705–709, a binary 1 will be provided on line 55 to condition the recording system for rotating wheel W2 in a counterclockwise direction in the manner previously explained.

The invention may be embodied in other specific forms without departing from the spirit or essential characteristics thereof. The present embodiments are therefore to be considered in all respects as illustrative and not restrictive, and the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an apparatus for weighing a load and printing a record of information containing at least the weight of the weighed load, a line printer having a plurality of rotatably mounted type carriers with characters positioned on the peripheries of said carriers for making a printed record of the information and a like plurality of reversible electric motors, therebeing one motor associated with each of said carriers, and each motor being drive connected to its associated carrier for rotating its associated carrier in opposite directions, weighing means for measuring the weight of a load, and means operatively connected to said weighing means and said motors and electrically controlling the operation of said motors (a) to rotate predetermined ones of said carriers each in a predetermined direction from a predetermined starting position to a printing position where said carriers are set up to print the information and (b) to rotate the set ones of said carriers each in a direction that is reverse to said predetermined direction after the information is printed to return the set ones of said carriers each to its predetermined starting position in preparation for being set up to print a succeeding line of print.

2. The apparatus defined in claim 1 wherein the characters on each carrier for printing said information are spaced around periphery of each carrier through an angle exceeding 180°, and wherein said means controlling operation of said motors comprises signal-controlled electrical circuit means controlling the direction of motor rotation to cause each carrier to be rotated to a printing position for printing each of said characters in that direction which does not exceed an angular displacement of 180°.

3. The apparatus defined in claim 1 wherein said means controlling operation of said motors comprises electrical circuit means under the control of said printer and being responsive to the printing of a line of print by said printer to return the predetermined ones of said carriers to their starting positions.

4. In a recording apparatus, a power operated printer having at least one rotary type carrier with type representing a series of characters positioned around the periphery thereof through an angle exceeding 180°, a reversible electric motor drive connected to said carrier for rotating said carrier in opposite directions, data source means for supplying coded electrical signals that are representative of the desired characters to be printed, means for deriving a directional control signal only from said data source means, and means responsive to said coded and directional control signals for causing said motor to rotate said carrier to positions for printing said desired characters only in that direction which does not exceed an angular displacement of 180°.

5. The apparatus defined in claim 4 comprising means operating said motor to return said carrier to a selected starting position after each desired character is printed and before the carrier is rotated to its next printing position for printing a subsequent character.

6. In a recording apparatus, at least one rotary type carrier with type representing a series of characters positioned on the periphery of said carrier, means responsive to a character-representing, preselected coded digital signal for rotating said carrier to either one of two printing positions for printing either one of two characters represented by the same coded signal, means for supplying a predetermined signal, means responsive to said predetermined signal for determining the one of said two printing positions to which said carrier is rotated for printing the desired one of the two characters represented by the same coded signal, said means for determining the one of said two printing positions to which said carrier is rotated comprising direction-controlling electrical circuit means for rotating said carrier from a predetermined starting position in that direction which does not exceed an angular displacement of 180° and means for conditioning said electrical circuit means to return said carrier to said starting position after the desired character is printed by rotating said carrier in a direction that is reverse to the direction in which said carrier was rotated to print the desired character.

7. In a recording apparatus, a plurality of assemblies for printing desired characters in a line of print on a record medium, each of said assemblies comprising a rotatable printing wheel having type representing a series of characters positioned around the periphery thereof, an electric motor drive connected to said wheel for rotating said wheel, means for supplying a desired one of a plurality of different digital character-representing coded signals, with each coded signal condition representing a pair of characters that said wheel is capable of printing, means for supplying a further signal that is correlated with the coded signal supplied by said coded signal supplying means to distinguish the desired character to be printed from the undesired character in the character pair represented by the supplied coded signal, and electrical circuit means operatively connected to said motor, said coded signal supplying means and said means supplying said further signal for controlling operation of said motor to set said wheel to a desired printing position, said electrical circuit means comprising means responsive to the coded signal supplied by said coded signal supplying means for rotating said wheel to either one of two printing positions for printing either one of the two characters represented by the supplied coded signal condition, and means controlled by said further signal for determining the one of said two printing positions to which said wheel is rotated for printing the desired one of the two characters represented by the supplied coded signal.

8. The recording apparatus defined in claim 7 wherein the characters on said wheel are spaced around the periphery thereof through an angle exceeding 180°, wherein said motor is reversible to rotate said wheel in either direction, and wherein said further signal responsive means is responsive to the value of said further signal for controlling the direction of motor rotation to rotate said wheel to its printing position in that direction which has the shortest angular displacement from a predetermined starting position of the wheel.

9. The recording apparatus defined in claim 7 wherein said further signal responsive means controls the direction of motor rotation to rotate said wheel from a predetermined starting position to its printing position in a direction predetermined by the value of said further signal and wherein said electrical circuit means further includes means cooperating with said further signal responsive means for conditioning said motor to reset said wheel to said starting position after the line of characters is printed by rotating said wheel in a direction that is the reverse of said predetermined direction.

10. In a recording apparatus having at least one rotary type carrier with type representing characters on the periphery thereof, and a motor drive connected to said carrier for rotating said carrier to a printing position for printing a desired character on a record medium, a pulse generator for generating a train of periodic electrical pulses, means for receiving said periodic pulses and being responsive thereto for driving said motor to rotate said carrier to its printing position, and means controlling the passage of said periodic pulses to said receiving means comprising a counter, means for presetting said counter with a binary coded data word representing the character to be printed, said counter being set to count down from said data word to a predetermined reference value, and logic circuit means connected to said counter and being responsive to the count in counter (a) to enable the passage of said periodic pulses to said receiving means to drive said motor and thereby rotate said carrier as long as said counter is counting down towards said predetermined reference value and (b) to inhibit the passage of the periodic pulses to said receiving means when the count reaches said predetermined reference value for stopping rotation of said carrier.

11. The recording apparatus defined in claim 10 wherein said motor is controlled by said periodic pulse receiving means for rotating said carrier one character space in response to the application of a predetermined number of periodic pulses to said receiving means, said recording apparatus further comprising means operatively connecting said generator to said counter, said counter being controlled by said periodic pulses to count-down from the data word loaded into it one count in response to each of a predetermined number of generated periodic pulses to thereby correlate the counter countdown with the rotation of said carrier.

12. The recording apparatus defined in claim 11 wherein said counter is of the binary type having a series of bistable storage devices, wherein the data word loaded into the counter is in multibit binary form with each bit being entered into a predetermined one of said devices, and wherein said logic circuit means comprises first gating means operatively connected to said devices and being responsive to the states of said devices for supplying an enabling signal condition as long as said counter contains a binary number other than said predetermined reference value and for supplying a disabling signal condition when the countdown reaches said reference value, and second gating means responsive to the enabling signal condition supplied by said first gating means for passing said periodic pulses to said receiving means, said second gating means further being responsive to the disabling signal condition supplied by said first gating means for inhibiting the passage of periodic pulses to said receiving means.

13. The recording apparatus defined in claim 12 wherein said means operatively connecting said generator to said counter includes third gating means operatively connected to the output of said first gating means and being responsive to the signal conditions supplied by said first gating means to enable the transfer of periodic countdown pulses to said counter when said enabling signal condition is supplied by said first gating means and to inhibit the transfer of the periodic countdown pulses to said counter when said disabling signal condition is supplied by said first gating means.

14. The recording apparatus defined in claim 12 wherein said carrier is rotated to its printing position from a predetermined starting position, said recording apparatus further comprising bistable means operatively connected to said first gating means and being responsive to the displacement of said carrier from said starting position for conditioning said first gating means to re-supply said enabling signal condition after a printing operation takes place in which the desired character is printed by said carrier, said second gating means being responsive to said re-supplied enabling signal condition to re-apply said periodic pulses to said receiving means, and said receiving means being responsive to the re-applied periodic pulses to condition said motor for returning said carrier to said starting position in preparation for being set up to print another character.

15. The recording apparatus defined in claim 14 wherein said motor is reversible for rotating said carrier in either direction, said recording apparatus further comprising means for supplying a binary data bit having a predetermined value, and a control circuit operatively connected to said receiving means and said data bit supplying means for controlling the direction of motor rotation and being responsive to said data bit to rotate said carrier in one direction to its printing position when said bit is a binary 1 and to rotate said carrier in the opposite direction to its printing position when said data bit is a binary 0, said control circuit further being operatively connected to said bistable means and being responsive to the state of said bistable means to condition said motor for returning said carrier to its starting position in a direction that is opposite to the direction in which it was rotated from its starting position to its printing position.

16. In an apparatus for recording information incorporating the weight of a weighed load and other data, means providing a first source for containing the weight of the weighed load in coded electrical signal form, means providing a second source for containing the other data in coded electrical signal form, a line printing mechanism comprising a plurality of printing wheels each having type representing characters for printing the information, signal generating circuit means, means for conditioning said circuit means to supply a first predetermined signal condition, logic circuit means responsive to said first predetermined signal condition for reading out the information in a predetermined one of said sources, means operatively connected to said logic circuit means and being responsive to the read out information for setting up said wheels to printing positions for printing said information from said one source and to actuate said printing mechanism to print the information set up on said wheels in a line of print, means responsive to actuation of said printing mechanism for conditioning said signal generating circuit means to supply a second predetermined signal condition, said logic circuit means being responsive to said second predetermined signal condition to read out the information contained in the other of said sources, said means operatively connected to said logic circuit means being responsive to the read-out of the information from said other source for resetting said wheels to printing positions for printing the information from said other source and for actuating said printing mechanism to print the set up information in another line of print.

17. In a recording apparatus, a plurality of assemblies for printing characters in a line of print on a record medium, each of said assemblies comprising a rotary type carrier having type representing a series of characters disposed around the periphery thereof through an angle exceeding 180°, said carrier being rotatable to different printing positions for printing respective ones of the characters thereon, signal generating means for supplying an electrical direction control signal in the form of a binary bit, the value of which is determined by the position of the carrier character desired to be printed relative to a predetermined starting position, means responsive to said direction control signal for rotating said carrier from said starting position to each of said printing positions in that direction which does not exceed 180°, and means for returning the carrier from its printing position to said starting position in a direction that is reverse to the direction in which said carrier was rotated to its printing position.

18. In an apparatus for weighing a load and printing a record of information containing at least the weight of the weighed load, a line printer having a plurality of rotatably mounted type carriers with characters positioned on the peripheries of said carriers for making a printed record of the information and a like plurality of reversible electric motors, there being one motor associated with each carrier, and each motor being drive connected to its associated carrier for rotating its associated carrier in opposite directions, means providing a source of said information in the form of electrical signals and including means for measuring the weight of a load, electrical circuit means electrically connected to said source-providing means and to said plurality of motors for controlling operation of said motors and being responsive (a) to said signals to rotate predetermined ones of said carriers each in a predetermined direction from a predetermined starting position to a printing position where said carriers are set up to print the information provided by said source and (b) to a further signal to rotate the set ones of said carriers each in a direction that is reverse to said predetermined direction after the information is printed to return the set ones of carriers each to its predetermined starting position in preparation for being set up to print a succeeding line of print, and means under the control of said printer and being responsive to the printing of a line of print to produce said further signal.

19. The apparatus defined in claim 18 wherein the characters on each carrier for printing said information are spaced around periphery of each carrier through an angle exceeding 180°, and wherein said means controlling operation of said motors comprises signal-controlled electrical circuit means controlling the direction of motor rotation to cause each carrier to be rotated to a printing position for printing each of said characters in that direction which does not exceed an angular displacement of 180°.

20. In an alpha-numeric recording apparatus, first electrical signal storage means providing a first source of information to be printed, means for weighing a load and for storing the weight of said load in said first electrical signal storage means in binary coded signal form, second electrical signal storage means providing a second source of information to be printed, means for selecting other data associated with said load and for selectively storing the selected data in said second electrical signal storage means in binary coded signal form, a line printing device having a plurality of rotary printing wheels with type thereon for printing information in transverse lines on a record medium, and signal responsive means connected to said first and second sources and said printing device for sequentially reading out the information first from a predetermined one of said sources, positioning said wheels to print the information read out from said one source, reading out the information from the other of said sources after the information read out from said one source is printed, and repositioning said wheels to print the information read out from said other source.

21. In a recording apparatus, at least one rotary type carrier, printing type representing a series of characters and positioned on the periphery of said carrier, first means for supplying a desired one of a plurality of different electrical character-representing coded signals, with each coded signal representing a selected pair of said characters, second means having first and second circuits for making available coded signals that transferred thereto, means for transferring the signal supplied by said first means to said first circuit when it is desired to print a predetermined one of the selected pair of the characters represented by the coded signal and for transferring the coded signal supplied by said first means to said second circuit when it is desired to print the other one of the selected pair of characters represented by the coded signal, and third means connected to a selected one of said first and second circuits for providing a further signal and for providing said further signal with one value when a coded signal is made available by said selected one of said circuits and with a different value when no coded signal is made available by said selected one of said circuits, and means responsive to the coded signal made available by said second means and to said further signal for rotating said carrier to a position for printing the desired character.

22. The recording apparatus defined in claim 21 wherein the printing positions of the characters of each selected pair are respectively angularly spaced in opposite directions from a predetermined starting position of said carrier by angles not exceeding 180°, wherein means are provided for returning said carrier to said starting position after each desired character is printed, and wherein said third means includes a circuit that is under the control of said further signal for rotating said carrier to its printing position in that direction that does not exceed 180°.

* * * * *